United States Patent
Kim et al.

(10) Patent No.: US 12,212,772 B2
(45) Date of Patent: Jan. 28, 2025

(54) VIDEO TRANSMISSION METHOD, VIDEO TRANSMISSION DEVICE, VIDEO RECEPTION METHOD, AND VIDEO RECEPTION DEVICE

(71) Applicant: LG ELECTRONICS INC., Seoul (KR)

(72) Inventors: Chulkeun Kim, Seoul (KR); Eunyong Son, Seoul (KR); Yongjoon Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 130 days.

(21) Appl. No.: 17/916,736

(22) PCT Filed: Apr. 2, 2021

(86) PCT No.: PCT/KR2021/004112
§ 371 (c)(1),
(2) Date: Oct. 3, 2022

(87) PCT Pub. No.: WO2021/201642
PCT Pub. Date: Oct. 7, 2021

(65) Prior Publication Data
US 2023/0156212 A1  May 18, 2023

(30) Foreign Application Priority Data

Apr. 3, 2020  (KR) .................. 10-2020-0041082
Apr. 14, 2020  (KR) .................. 10-2020-0044978
Jun. 25, 2020  (KR) .................. 10-2020-0077665

(51) Int. Cl.
*H04N 19/50* (2014.01)
*H04N 19/132* (2014.01)
*H04N 19/159* (2014.01)

(52) U.S. Cl.
CPC .......... *H04N 19/50* (2014.11); *H04N 19/132* (2014.11); *H04N 19/159* (2014.11)

(58) Field of Classification Search
CPC ...... G06T 9/00; H04N 19/132; H04N 19/159; H04N 19/50; H04N 19/70; H04N 19/90
See application file for complete search history.

(56) References Cited

U.S. PATENT DOCUMENTS

2015/0189318 A1* 7/2015 Pace .................. H04N 19/543
375/240.08
2018/0101957 A1* 4/2018 Talathi .................. G06T 9/00
(Continued)

FOREIGN PATENT DOCUMENTS

CN     110738697 B  *  4/2023 .......... G06K 9/6247
KR     10-2019-0071611 A     6/2019
(Continued)

OTHER PUBLICATIONS

"Weighted Feature Pyramid Networks for Object Detection"—Li et al., 2019 IEEE Intl Conf on Parallel & Distributed Processing with Applications, Big Data & Cloud Computing, Sustainable Computing & Communications, Social Computing & Networking (ISPA/BDCloud/SocialCom/SustainCom). (Year: 2019).*
(Continued)

*Primary Examiner* — Mainul Hasan
(74) *Attorney, Agent, or Firm* — BRYAN CAVE LEIGHTON PAISNER LLP

(57) ABSTRACT

A video transmission method according to embodiments may comprise the steps of: encoding video data; and transmitting the video data. A video reception method according to embodiments may comprise the steps of: receiving video data; and decoding the video data.

14 Claims, 53 Drawing Sheets

(56) References Cited

U.S. PATENT DOCUMENTS

| | | | |
|---|---|---|---|
| 2019/0295228 A1* | 9/2019 | Liu | ............................ G06T 5/60 |
| 2020/0292608 A1* | 9/2020 | Yan | ......................... G06N 3/044 |
| 2021/0084290 A1* | 3/2021 | Cho | ........................ H04N 19/85 |

FOREIGN PATENT DOCUMENTS

| | | |
|---|---|---|
| KR | 10-2019-0089777 A | 7/2019 |
| KR | 10-2068576 B1 | 1/2020 |

OTHER PUBLICATIONS

Tsung-Yi Lin et al., "Feature Pyramid Networks for Object Detection", Computer Vision and Pattern Recognition, arXiv.org > arXiv:1612.03144, Dec. 9, 2016, 12 pages (See pp. 1-11).

* cited by examiner

FIG. 13

| MttSplitMode | mtt_split_cu_vertical_flag | mtt_split_cu_binary_flag |
|---|---|---|
| (SPLIT_TT_HOR) | 0 | 0 |
| (SPLIT_BT_HOR) | 0 | 1 |
| (SPLIT_TT_VER) | 1 | 0 |
| (SPLIT_BT_VER) | 1 | 1 |

FIG. 18

| cu_sbt_horizontal_flag | cu_sbt_pos_flag | trTypeHor | trTypeVer |
|---|---|---|---|
| 0 | 0 | 2 | 1 |
| 0 | 1 | 1 | 1 |
| 1 | 0 | 1 | 2 |
| 1 | 1 | 1 | 1 |

FIG. 19

| predModeIntra | trTypeHor | trTypeVer |
|---|---|---|
| INTRA_PLANAR, INTRA_ANGULAR31, INTRA_ANGULAR32, INTRA_ANGULAR34, INTRA_ANGULAR36, INTRA_ANGULAR37 | ( nTbW >= 4 && nTbW <= 16 ) ? 1 : 0 | ( nTbW >= 4 && nTbH <= 16 ) ? 1 : 0 |
| INTRA_ANGULAR33, INTRA_ANGULAR35 | 0 | 0 |
| INTRA_ANGULAR2, INTRA_ANGULAR4,...,INTRA_ANGULAR28, INTRA_ANGULAR30, INTRA_ANGULAR39, INTRA_ANGULAR41,...,INTRA_ANGULAR63, INTRA_ANGULAR65 | ( nTbW >= 4 && nTbW <= 16 ) ? 1 : 0 | 0 |
| INTRA_ANGULAR3, INTRA_ANGULAR5,...,INTRA_ANGULAR27, INTRA_ANGULAR29, INTRA_ANGULAR38, INTRA_ANGULAR40,...,INTRA_ANGULAR64, INTRA_ANGULAR66 | 0 | ( nTbW >= 4 && nTbH <= 16 ) ? 1 : 0 |

FIG. 20

| Transform Type | $T_i(j)$, $i, j = 0, 1, \ldots, N-1$ |
|---|---|
| DCT - II | $T_i(j) = \omega_0 \cdot \sqrt{\frac{2}{N}} \cdot \cos\frac{\pi \cdot i \cdot (2j+1)}{2N}$ where, $\omega_0 = \begin{cases} \sqrt{\frac{2}{N}} & i = 0 \\ 1 & i \neq 0 \end{cases}$ |
| DCT - VIII | $T_i(j) = \sqrt{\frac{4}{2N+1}} \cdot \cos(\frac{\pi \cdot (2i+1) \cdot (2j+1)}{4N+2})$ |
| DCT - VII | $T_i(j) = \sqrt{\frac{4}{2N+1}} \cdot \sin(\frac{\pi \cdot (2i+1) \cdot (j+1)}{2N+1})$ |

FIG. 23

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$

FIG. 25
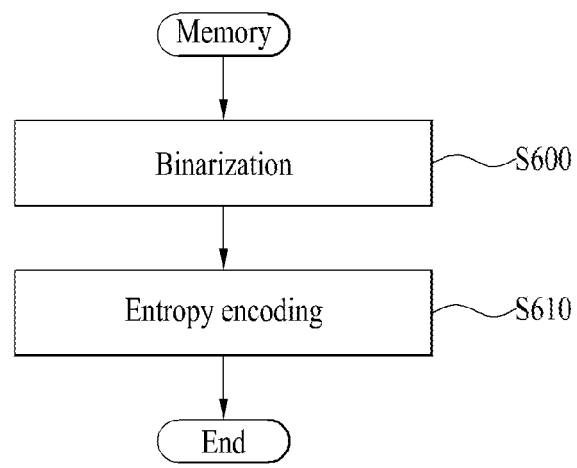
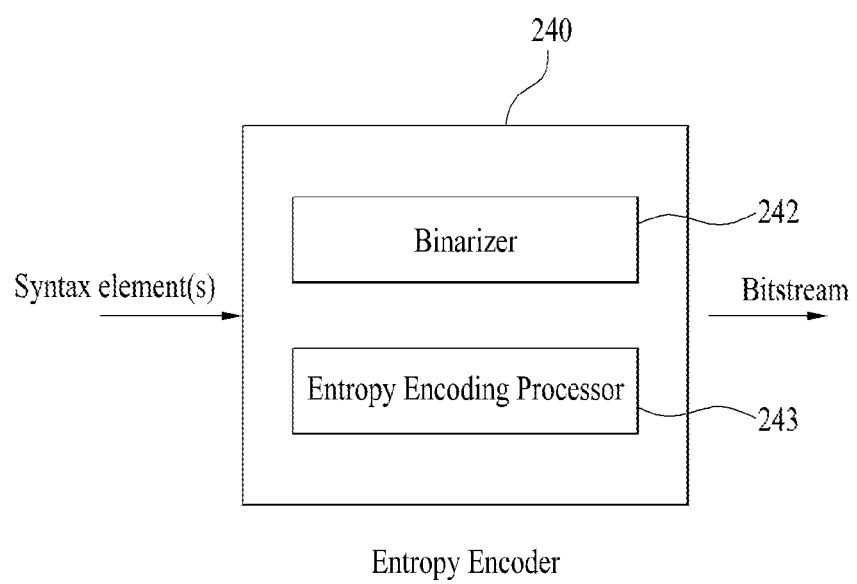

FIG. 26
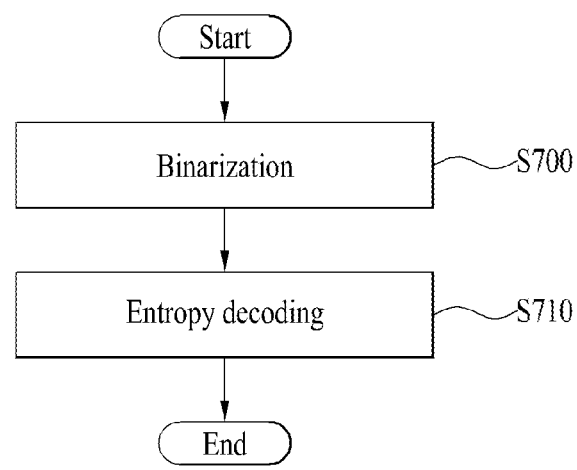
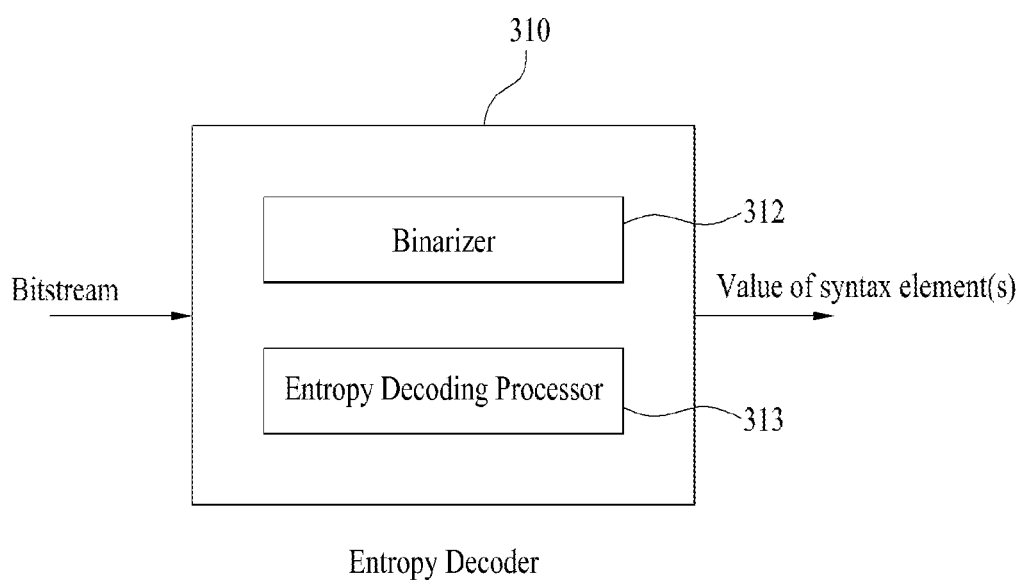
Entropy Decoder

FIG. 32
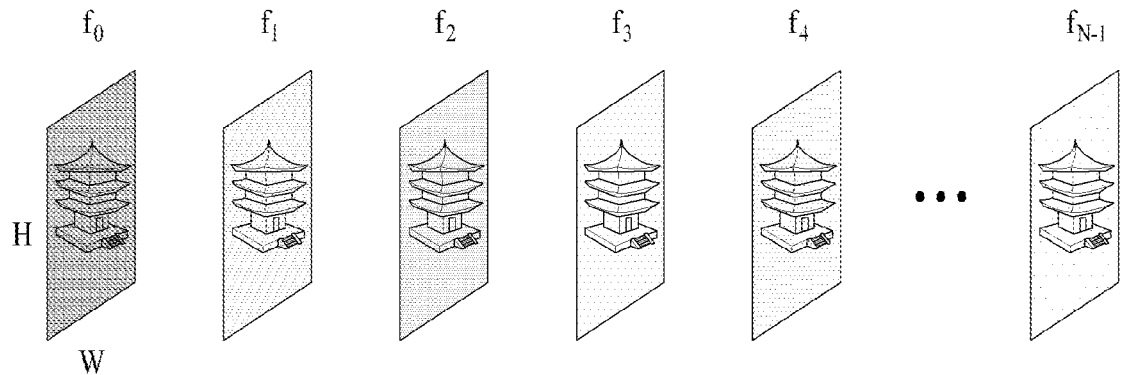
(1) Acquisition of feature map
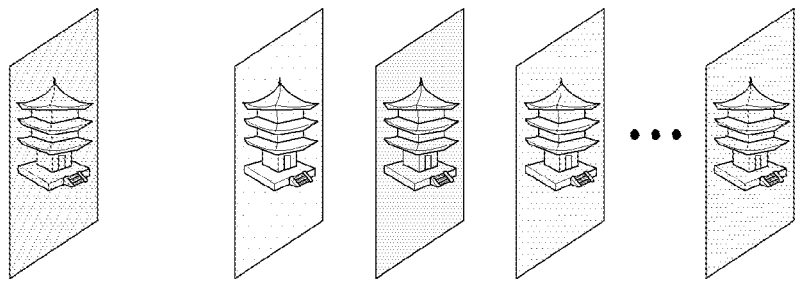
(2) Acquisition of mean value (μ) and principal components
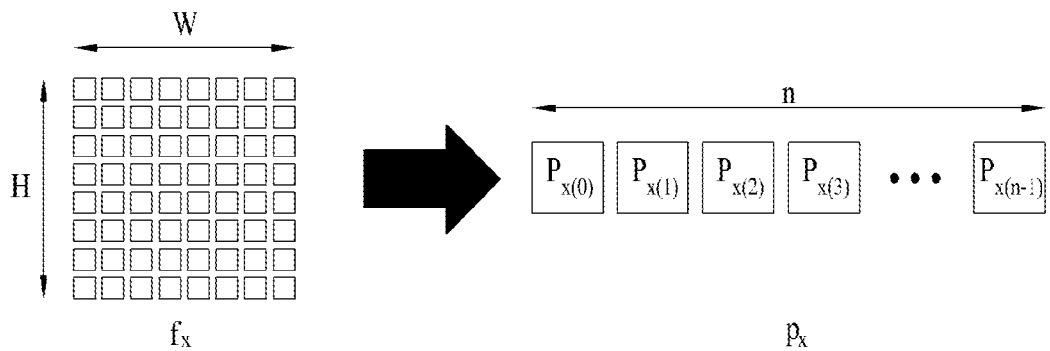
(3) Dimension reduction for feature map
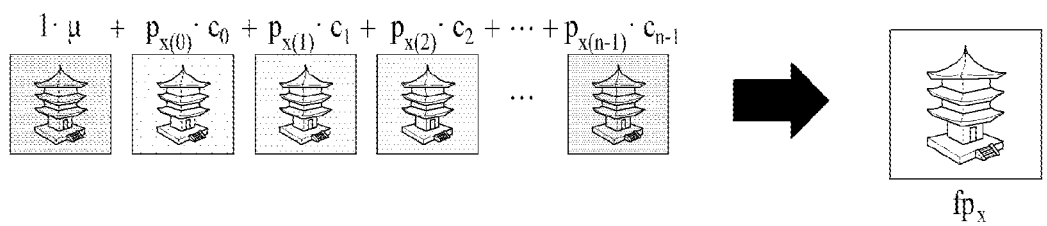
(4) Recovery of original dimension

FIG. 34

$$\text{Pred}_\chi = \mu + \sum_{i=0}^{n-1} p_{\chi(i)} \cdot c_i$$

FIG. 37

$$\text{Resid} = f - \text{Pred}$$

FIG. 38

```
feature_coding( ) {
    ...
    if ( FeaturePredMode == PCA) {
        PCA_Prediction_Data_coding (mean_feature, principal_components, projected)
        for ( i=0; i<num_feature_channel; i++ ) {
            skip_channel[i]
            if (!skip_channel[i])
                resid_data_coding(resid[i])
        }
    }
    ...
}
```

FIG. 40

```
feature_coding( ) {
    ...
    if ( FeaturePredMode == PCA) {
        Factor_Prediction_Data_coding (mean_feature, principal_components, projected)
        for ( i=0; i<num_feature_channel; i++ ) {
            skip_channel[i]
            if (!skip_channel[i])
                resid_data_coding(resid[i])}
        else if ( FeaturePredMode == Sparse)
        {
        Factor_Prediction_Data_coding (mean_feature, principal_components, projected)
        for ( i=0; i<num_feature_channel; i++ ) {
        skip_channel[i]
            if (!skip_channel[i])
        resid_data_coding(resid[i])
    }
```

FIG. 42

| Feature_coding_header | Indicates the header in the unit of sequence, group, or frame according to the factor coding unit. |
|---|---|
| Factor_coding | Indicates whether factor coding of the corresponding coding unit is performed. |
| If(Factor_coding)<br>{<br>  Factor<br>} | In case of factor coding, the information is parsed. |

(a)

| |
|---|
| feature_coding( ) { |
| ... |
|   if ( FeaturePredMode == PCA) { |
|     If(Factor_coding) { |
|       Factor_Prediction_Data_coding (mean_feature, principal_components, projected) |
|     } |
|     Else |
|     { |
|       Factor_Prediction_Data_coding ( projected) // This means that the previously received mean and component will be used |
|     } |
|     ... |
|   }... |
| } |

| Factor_prediction | Whether to apply factor extraction and encoding using temporal redundancy |
|---|---|
| Factor_prediction_method | Method applied to factor extraction and encoding using temporal redundancy |
| Factor_Refernece_List | Factor list for using temporal redundancy |
| Reference_Index | Information for signaling a factor used in the factor list |
| Factor_Prediction_Data_coding | Information for decoding factor |

(a)

```
feature_coding( ) {
    ...
    if ( FeaturePredMode == PCA) {
        If(Factor_coding)
        {
            if(Factor_prediction) {
                if(Factor_prediction_method == Factor){
                    Factor_Prediction_Data_coding (Factor_Refernce_List[Reference_Index]
                    ,mean_feature, principal_components, projected)
                }
            } else ....
        }
        Else
        {
            Factor_Prediction_Data_coding ( projected) // Reducing the amount of
            additional information sent andusing previously received information
        }
        ...
    }
}
```

```
feature_coding( ) {
    ...
    if ( FeaturePredMode == PCA) {
        pca_feature_num
        PCA_Data_coding (mean_feature, principal_components)
        for ( i=0; i<pca_feature_num; i++ ) {
            PCA_Coefficient_coding (Transformed_coeff)
        }
    }
    }
    ...
}
```

FIG. 49

```
feature_coding( ) {
    ...
    if ( FeaturePredMode == PCA_FPN ) {
        for ( j=0; j<feature_pyramid_num; j++ ) {
            PCA_Prediction_Data_coding (mean_feature, principal_components, projected)
            for ( i=0; i<num_feature_channel; i++ ) {
                skip_channel[i]
                if (!skip_channel[i])
                    resid_data_coding(resid[i])
            }
        }
    }
    ...
}
```

FIG. 51

```
feature_coding( ) {
    ...
    if ( FeaturePredMode == PCA_MultiRes) {
        pca_feature_num
        PCA_Data_coding (mean_feature, principal_components)
            for ( i=0; i<pca_feature_num; i++ ) {
                feature_width[i]
                feature_height[i]
                    PCA_Coefficient_coding (Transformed_coeff)
            }
    }
    ...
}
```

VIDEO TRANSMISSION METHOD, VIDEO TRANSMISSION DEVICE, VIDEO RECEPTION METHOD, AND VIDEO RECEPTION DEVICE

CROSS-REFERENCE TO PRIOR APPLICATIONS

This application is a National Stage of PCT/KR2021/004112, filed Apr. 2, 2021, (published on Oct. 7, 2021, as WO 2021/201642 A1), which claims priority to Korean Patent Application Nos. 10-2020-0041082, filed Apr. 3, 2020; 10-2020-0044978, filed Apr. 14, 2020; and 10-2020-0077665, filed Jun. 25, 2020, each hereby expressly incorporated by reference in its entirety.

TECHNICAL FIELD

Embodiments relate to video and/or image encoding and decoding schemes for efficiently compressing and processing video and/or images.

Embodiments relate to video and/or image encoding and decoding schemes for computational processing of video and/or images in the field of artificial intelligence.

Embodiments relate to video and/or image encoding and decoding schemes for computational processing of video and/or images in neural network applications.

BACKGROUND ART

In complex image processing, a method of compressing or reconstructing a video and/or an image is complicated and takes a long time.

A large amount of throughput is required for a video and/or image compression or reconstruction terminal to perform neural network-based video/image analysis.

DISCLOSURE

Technical Problem

An object of the embodiments devised to solve the above-mentioned problems is to provide a video transmission method, a video transmission device, a video reception method, a video reception device for efficiently encoding and transmitting, or receiving and decoding video and/or images.

An object of the embodiments is to provide a video transmission method, a video transmission device, a video reception method, and a video reception device for addressing encoding and/or decoding complexity and processing video and/or images with low latency.

Embodiments are not limited to the above-described objects, and the scope of the embodiments may be extended to other objects that can be inferred by those skilled in the art based on the entire contents of the present disclosure.

Technical Solution

In order to achieve the above object and other advantages, a video transmission method according to embodiments may include encoding video data and transmitting the video data. A video reception method according to embodiments may include receiving video data and decoding the video data.

Advantageous Effects

A video transmission method, a video transmission device, a video reception method, and a video reception device according to embodiments may efficiently compress and reconstruct video and/or images.

A video transmission method, a video transmission device, a video reception method, and a video reception device according to embodiments may effectively reduce the complexity required for computational processing of video and/or images in order to carry out a specific purpose.

A video transmission method, a video transmission device, a video reception method, and a video reception device according to embodiments may provide an efficient compression/reconstruction technique to a general-purpose neural network application field.

BRIEF DESCRIPTION OF THE DRAWINGS

The accompanying drawings, which are included to provide a further understanding of the disclosure and are incorporated in and constitute a part of this application, illustrate embodiments of the disclosure together with the description related to the embodiment(s). In the drawings:

FIG. 13 shows splitting modes according to embodiments;

FIGS. 18 and 19 show transform types according to embodiments;

FIG. 20 illustrates transform base functions according to embodiments;

FIGS. 22 and 23 illustrate a low-frequency non-separable transform (LFNST) process according to embodiments;

FIG. 25 illustrates a flowchart of entropy coding and a configuration of an entropy encoder according to embodiments;

FIG. 26 illustrates a flowchart of entropy decoding and a structure of an entropy decoder according to embodiments;

FIG. 32 illustrates a feature map main component analysis procedure according to embodiments;

FIG. 34 illustrates an operation of obtaining a predicted value for a feature value according to embodiments;

FIG. 37 illustrates a method of generating a residual by an encoder according to embodiments;

FIG. 38 illustrates feature coding-related information according to embodiments;

FIG. 40 illustrates information related to a linear factor model according to embodiments;

FIG. 42 illustrates a configuration of signaling information for factor reuse according to embodiments;

FIG. 44 illustrates a configuration of signaling information for factor extraction using temporal redundancy according to embodiments;

FIG. 46 illustrates signaling information for feature coding of multi-feature data according to embodiments;

FIG. 49 shows an example of signaling information for feature coding according to embodiments;

FIG. 51 illustrates signaling information for feature coding of multiple feature data having different resolutions according to embodiments;

BEST MODE

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
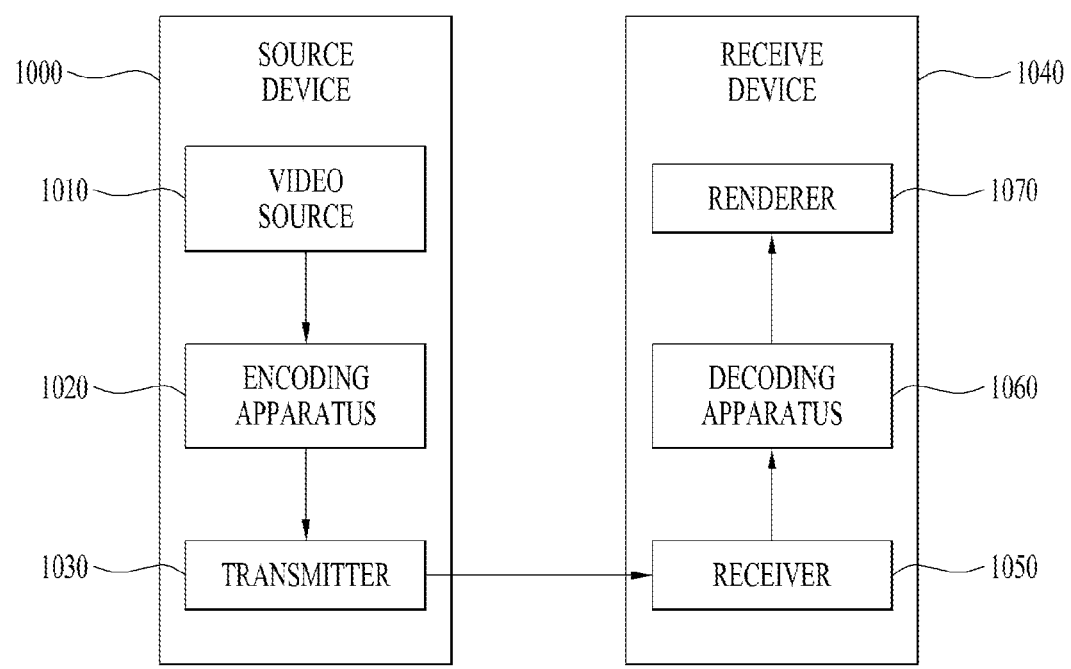
FIG. 1 illustrates a video transmission device and a video reception device according to embodiments.

FIG. 1 illustrates a video transmission device and a video reception device according to embodiments.

A video/image coding system including a video transmission device and/or a video reception device according to embodiments may include a first device (source device) 1000 and a second device (reception device) 1040. The source device may transmit encoded video/image information or data to the reception device through a digital storage medium or a network in the form of a file or streaming.

The source device 1000 is a video transmission device according to embodiments. According to embodiments, the source device 1000 may be referred to as an encoder. Each component included in the source device 1000 may be implemented as hardware, software, a processor, and/or a combination thereof.

The source device may include a video source 1010, an encoding device 1020, and a transmitter 1030.

The video source 1010 may acquire input data of the video transmission device. The video source according to embodiments may acquire a video/image through an operation of capturing, synthesizing, or generating a video/image. The video source may include a video/image capture device and/or a video/image generation device. The video/image capture device may include, for example, one or more cameras, and a video/image archive containing previously captured video/images.

The video/image generation device according to the embodiments may include, for example, a computer, a tablet, and a smartphone, and may (electronically) generate a video/image.

For example, a virtual video/image may be generated through a computer or the like. In this case, the video/image capture process may be replaced by the process of generating related data. Video/image synthesis and generation may be performed during the information processing process by AI (input information, information in the information processing process, and output information of AI). In this case, the information generated during the video/image capture process may be used as input information of AI.

The encoder 1020 may encode an input video/image. The encoding apparatus may perform a series of procedures such as prediction, transformation and quantization according to embodiments for compression and coding efficiency. The encoded data (encoded video/image information) may be output in the form of a bitstream. Details of the encoding operation will be described below. The encoder may be referred to as an encoding apparatus, a video/image encoding apparatus.

The transmitter 1030 may transmit the encoded data. The transmitter 1030 may be included in the encoding apparatus.

The transmitter 1030 may transmit encoded video/image information or data output in the form of a bitstream to the receiver 1050 of the reception device through a digital storage medium or a network in the form of a file or streaming. The digital storage medium may include various storage media such as USB, SD, CD, DVD, Blu-ray, HDD, and SSD. The transmitter may include an element for generating a media file through a predetermined file format and an element for transmission over a broadcast/communication network.

The reception device 1040 is a video reception device according to embodiments. According to embodiments, the reception device 1040 may be referred to as a decoder. Each component included in the reception device 1040 may be implemented as hardware, software, a processor, and/or a combination thereof.

The reception device may include a receiver 1050, a decoding apparatus 1060, and a renderer 1070.

The receiver 1050 may receive/extract the bitstream and transmit the bitstream to the decoding apparatus 1060. The receiver may be referred to as a receiver or the like. The receiver 1050 may be included in the decoding apparatus 1060.

The decoder 1060 may be referred to as a decoding apparatus, a video/image decoding apparatus, or the like. The decoding apparatus may decode a video/image by performing a series of procedures including dequantization, inverse transformation, and prediction corresponding to the operations of the encoding apparatus. Details of the decoding operation according to the embodiments will be described below.

The renderer 1070 may include a display. The display may be configured as a separate device or an external component. The renderer may render the decoded video/image. The rendered video/image may be displayed through the display.

The decoded video/image according to the embodiments may be used as input information not only for rendering but also for use in other systems. For example, it may be used as input information for tasks of AI. Examples of tasks of AI include face recognition, behavior recognition, and vehicle lane recognition.

The components illustrated in FIG. 1 may be abbreviated as methods/devices according to embodiments. The methods/devices according to the embodiments relate to video/image coding.

For example, a method related to a versatile video coding (VVC) standard and a video coding for machines (VCM) standard may be employed for video/image/picture coding according to the embodiments.

For the video/image/picture coding according to the embodiments, a method related to the essential video coding (EVC) standard, AOMedia Video 1 (AV1) standard, 2nd generation of audio video coding standard (AVS2), or a next-generation video/image coding standard (e.g., H.267 or H.268, etc.) may be employed.

Embodiments relate to various types of video/image/video coding. The embodiments may be performed in combination with each other unless otherwise stated.

Terms according to embodiments are defined below. Definitions of terms are to be construed within the scope equivalent to the meanings stated.

A video may represent a set of a series of images according to a time flow. An image may be information generated by AI. Input information, information generated in the information processing process, and output information may be used as images in the process of AI performing a series of tasks.

A picture may generally mean a unit representing one image in a specific time period.

A slice/tile is a unit constituting a part of a picture in coding. A slice/tile may include one or more coding tree units (CTUs). One picture may include one or more slices/tiles.

A tile may be a rectangular region of CTUs in a specific tile column and a specific tile row within a picture.

The tile column is a rectangular region of CTUs that has the same height as the picture, and may have a height described by syntax elements in a picture parameter set.

A tile row is a rectangular region of CTUs having a height described by syntax elements in a picture parameter set, and may have the same width as the picture.

A tile scan may be a specific sequential order of CTUs partitioning a picture within the CTUs that are consecutively arranged within a CTU raster scan in a tile. Tiles in a picture may be consecutively arranged in a raster scan of the tiles of the picture.

A slice may be an integer number of complete tiles. A slice may be consecutive complete CTU rows in a tile of a picture that may be included exclusively in a single NAL unit.

One picture according to embodiments may be divided into two or more subpictures. A subpicture may be a rectangular region of one or more slices in the picture.

A pixel or a pel may represent a minimum unit constituting one picture (or image). Also, "sample" may be used as a term corresponding to a pixel. A sample may generally represent a pixel or a value of a pixel. It may represent only a pixel/pixel value of a luma component, or represent only a pixel/pixel value of a chroma component. When there is a picture composed of a set of components having different characteristics and meanings, pixels/pixel value of generated components may be indicated by independent information about individual components or combination, synthesis or analysis thereof.

For example, in the RGB input, only the pixel/pixel value of R may be indicated, only the pixel/pixel value of G may be indicated, or only the pixel/pixel value of B may be indicated. For example, only the pixel/pixel value of the luma component synthesized using the R, G, and B components may be indicated. For example, only the pixel/pixel value of an image or information extracted from the R, G, and B components through analysis may be indicated.

A unit may represent a basic unit of image processing. The unit may include at least one of a specific area of a picture and information related to the area. One unit may include one luma block and two chroma blocks (e.g., cb and cr). A unit may be used interchangeably with terms such as a block or an area in some cases. In a general case, an M×N block may include a set (or array) of samples (or sample arrays) or transform coefficients configured in M columns and N rows. A unit may represent a basic unit containing information for performing a specific task.

Hereinafter, operations of the components according to the embodiments of FIG. 1 will be described.

Figure 2:
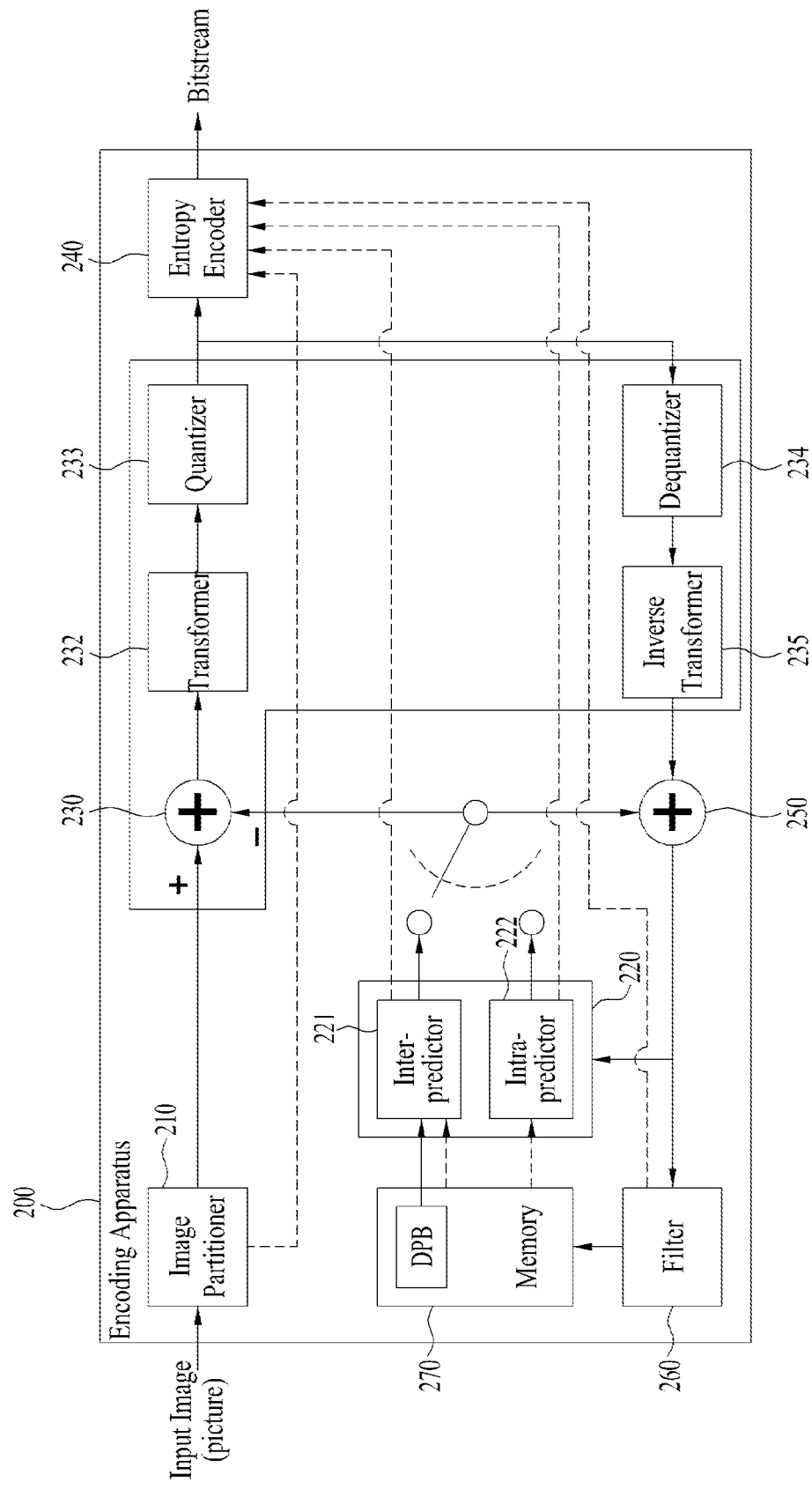
FIG. 2 illustrates an encoding apparatus according to embodiments.

FIG. 2 illustrates an encoding apparatus according to embodiments.

FIG. 2 shows the encoding apparatus 1020 of FIG. 1, which may be referred to as an encoder or the like.

FIG. 2 is a schematic block diagram of an encoding apparatus encoding a video/image signal.

The encoding apparatus 200 may include an image partitioner 210, a predictor 220, a residual processor 230, an entropy encoder 240, an adder 250, a filter 260, and a memory 270. The predictor 220 may include an inter-predictor 221 and an intra-predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, predictor 220, residual processor 230, entropy encoder 240, adder 250, and filter 260 may be configured by one or more hardware components (e.g., encoder chipsets or processors) according to an embodiment. In addition, the memory 270 may include a decoded picture buffer (DPB), and may be configured by a digital storage medium. The hardware components may further include the memory 270 as an internal/external component.

The image partitioner 210 may partition an image (or a picture or a frame) input to the encoding apparatus 200 into one or more processing units. For example, the processing unit may be called a coding unit (CU). In this case, the CU may be recursively split from a coding tree unit (CTU) or a largest coding unit (LCU) according to a quad-tree binary-tree ternary-tree (QTBTTT) structure. For example, one CU may be partitioned into a plurality of CUs of a lower depth based on a quad-tree structure, a binary-tree structure, and/or a ternary-tree structure. In this case, for example, the quad-tree structure may be applied first and the binary-tree structure and the ternary-tree structure may be applied later. Alternatively, the binary-tree structure may be applied first. The coding procedure according to the present disclosure may be performed based on a final CU that is not split anymore. In this case, the LCU may be used as the final CU based on coding efficiency according to characteristics of the image. When necessary, a CU may be recursively split into CUs of a lower depth, and a CU of the optimum size may be used as the final CU. Here, the coding procedure may include prediction, transformation, and reconstruction, which will be described later. As another example, the processing unit may further include a prediction unit (PU) or a transform unit (TU). In this case, the PU and the TU may be split or partitioned from the aforementioned final CU. The PU may be a unit of sample prediction, and the TU may be a unit for deriving a transform coefficient and/or a unit for deriving a residual signal from the transform coefficient.

The term "unit" may be used interchangeably with terms such as block or area. In a general case, an M×N block may represent a set of samples or transform coefficients configured in M columns and N rows. A sample may generally represent a pixel or a value of a pixel, and may indicate only a pixel/pixel value of a luma component, or only a pixel/pixel value of a chroma component. "Sample" may be used as a term corresponding to a pixel or a pel in one picture (or image).

The encoding apparatus 200 may generate a residual signal (residual block or residual sample array) by subtracting a prediction signal (predicted block or predicted sample array) output from the inter-predictor 221 or the intra-predictor 222 from an input image signal (original block or original sample array), and the generated residual signal is transmitted to the transformer 232. In this case, as shown in the figure, the unit that subtracts the prediction signal (predicted block or predicted sample array) from the input image signal (original block or original sample array) in the encoder 200 may be called a subtractor 231. The predictor may perform prediction for a processing target block (hereinafter referred to as a current block) and generate a predicted block including prediction samples for the current block. The predictor may determine whether intra-prediction or inter-prediction is applied on a current block or CU basis. As will be described later in the description of each prediction mode, the predictor may generate various kinds of information about prediction, such as prediction mode information, and deliver the generated information to the entropy encoder 240. The information about the prediction may be encoded and output in the form of a bitstream by the entropy encoder 240.

The intra-predictor 222 may predict the current block with reference to the samples in the current picture. The samples may be positioned in the neighbor of or away from the current block depending on the prediction mode. In intra-prediction, the prediction modes may include a plurality of non-directional modes and a plurality of directional modes. The non-directional modes may include, for example, a DC mode and a planar mode. The directional modes may include, for example, 33 directional prediction modes or 65 directional prediction modes according to fineness of the prediction directions. However, this is merely an example, and more or fewer directional prediction modes may be used depending on the setting. The intra-predictor 222 may determine a prediction mode to be applied to the current block, based on the prediction mode applied to the neighboring block.

The inter-predictor 221 may derive a predicted block for the current block based on a reference block (reference sample array) specified by a motion vector on the reference picture. In this case, in order to reduce the amount of motion information transmitted in the inter-prediction mode, the motion information may be predicted on a per block, sub-block, or sample basis based on the correlation in motion information between the neighboring blocks and the current block. The motion information may include a motion vector and a reference picture index. The motion information may further include information about an inter-prediction direction (L0 prediction, L1 prediction, Bi prediction, etc.). In the case of inter-prediction, the neighboring blocks may include a spatial neighboring block, which is present in the current picture, and a temporal neighboring block, which is present in the reference picture. The reference picture including the reference block may be the same as or different from the reference picture including the temporal neighboring block. The temporal neighboring block may be referred to as a collocated reference block or a collocated CU (colCU), and the reference picture including the temporal neighboring block may be referred to as a collocated picture (colPic). For example, the inter-predictor 221 may configure a motion information candidate list based on the neighboring blocks and generate information indicating a candidate to be used to derive a motion vector and/or a reference picture index of the current block. Inter prediction may be performed based on various prediction modes. For example, in a skip mode and a merge mode, the inter-predictor 221 may use motion information about a neighboring block as motion information about the current block. In the skip mode, unlike the merge mode, the residual signal may not be transmitted. In a motion vector prediction (MVP) mode, the motion vector of a neighboring block may be used as a motion vector predictor and the motion vector difference may be signaled to indicate the motion vector of the current block.

The predictor 220 may generate a prediction signal based on various prediction methods, which will be described later. For example, the predictor may apply intra prediction or inter prediction for prediction of a block. In addition, it may apply the intra prediction and the inter prediction simultaneously. This operation may be called combined inter and intra prediction (CIIP). In addition, the predictor may operate based on an intra block copy (IBC) prediction mode or a palette mode for prediction for a block. The IBC prediction mode or the palette mode may be used for coding of images/video of content such as games, for example, screen content coding (SCC). The IBC basically performs prediction within the current picture, but the prediction may be similar to inter prediction in that a reference block is derived within the current picture. That is, the IBC may use at least one of the inter prediction techniques described in the present disclosure. The palette mode may be considered as an example of intra coding or intra prediction. When the palette mode is applied, a sample value in the picture may be signaled based on information about a palette table and a palette index.

The prediction signal generated through the predictor (including the inter-predictor 221 and/or the intra-predictor 222) may be used to generate a reconstructed signal or to generate a residual signal. The transformer 232 may generate transform coefficients by applying a transform technique to the residual signal. For example, the transform technique may include at least one of discrete cosine transform (DCT), discrete sine transform (DST), Karhunen-Loéve transform (KLT), graph-based transform (GBT), or conditionally non-linear transform (CNT). Here, the GBT refers to transform obtained from a graph depicting the relationship between pixels. The CNT refers to transform obtained based on a prediction signal generated based on all previously reconstructed pixels. In addition, the transform operation may be applied to pixel blocks having the same size of a square, or may be applied to blocks of a variable size other than the square.

The quantizer 233 may quantize the transform coefficients and transmit the same to the entropy encoder 240. The entropy encoder 240 may encode the quantized signal (information about the quantized transform coefficients) and output a bitstream of the encoded signal. The information about the quantized transform coefficients may be referred to as residual information. The quantizer 233 may rearrange the quantized transform coefficients, which are in a block form, in the form of a one-dimensional vector based on a coefficient scan order, and generate information about the quantized transform coefficients based on the quantized transform coefficients in the form of the one-dimensional vector. The entropy encoder 240 may employ various encoding techniques such as, for example, exponential Golomb, context-adaptive variable length coding (CAVLC), and context-adaptive binary arithmetic coding (CABAC). The entropy encoder 240 may encode information necessary for video/image reconstruction (e.g., values of syntax elements) together with or separately from the quantized transform coefficients. The encoded information (e.g., encoded video/image information) may be transmitted or stored in the form of a bitstream on a network abstraction layer (NAL) unit basis. The video/image information may further include information about various parameter sets, such as an adaptation parameter set (APS), a picture parameter set (PPS), a sequence parameter set (SPS), or a video parameter set (VPS). The video/image information may further include general constraint information. The video/image information may include a method of generating the encoded information, usage of the encoded information, and a purpose of the encoded information. In the present disclosure, information and/or syntax elements transmitted/signaled from the encoding apparatus to the decoding apparatus may be included in the video/image information. The video/image information may be encoded through the above-described encoding procedure and included in the bitstream. The bitstream may be transmitted over a network or may be stored in a digital storage medium. Here, the network may include a broadcast network and/or a communication network, and the digital storage medium may include various storage media such as USB, SD, CD, DVD, Blu-ray, HDD, and SSD. A transmitter (not shown) to transmit the signal output from the entropy encoder 240 and/or a storage (not shown) to store the signal may be configured as internal/external elements of the encoding apparatus 200. Alternatively, the transmitter may be included in the entropy encoder 240.

The quantized transform coefficients output from the quantizer 233 may be used to generate a prediction signal. For example, dequantization and inverse transform may be applied to the quantized transform coefficients through the dequantizer 234 and the inverse transformer 235 to reconstruct the residual signal (residual block or residual samples). The adder 250 may add the reconstructed residual signal to the prediction signal output from the inter-predictor 221 or the intra-predictor 222. Thereby, a reconstructed signal (reconstructed picture, reconstructed block, reconstructed sample array) may be generated. When there is no residual signal for a processing target block as in the case where the skip mode is applied, the predicted block may be used as the reconstructed block. The adder 250 may be called a reconstructor or a reconstructed block generator. The generated reconstructed signal may be used for intra-prediction of the next processing target block in the current picture, or may be used for inter-prediction of the next picture through filtering as described below.

Luma mapping with chroma scaling (LMCS) may be applied in the picture encoding and/or reconstruction process.

The filter 260 may improve subjective/objective image quality by applying filtering to the reconstructed signal. For example, the filter 260 may generate a modified reconstructed picture by applying various filtering techniques to the reconstructed picture, and the modified reconstructed picture may be stored in the memory 270, specifically, the DPB of the memory 270. The various filtering techniques may include, for example, deblocking filtering, sample adaptive offset, adaptive loop filtering, and bilateral filtering. As described below in relation to the filtering techniques, the filter 260 may generate various kinds of information about filtering and deliver the generated information to the entropy encoder 240. The information about filtering may be encoded and output in the form of a bitstream by the entropy encoder 240.

The modified reconstructed picture transmitted to the memory 270 may be used as a reference picture by the inter-predictor 221. Thus, when inter-prediction is applied, the encoding apparatus may avoid prediction mismatch between the encoding apparatus 200 and the decoding apparatus and improve encoding efficiency.

The DPB of the memory 270 may store the modified reconstructed picture so as to be used as a reference picture by the inter-predictor 221. The memory 270 may store the motion information about a block from which the motion information in the current picture is derived (or encoded) and/or the motion information about the blocks in a picture that has already been reconstructed. The stored motion information may be delivered to the inter-predictor 221 so as to be used as motion information about a spatial neighboring block or motion information about a temporal neighboring block. The memory 270 may store the reconstructed samples of the reconstructed blocks in the current picture and deliver the reconstructed samples to the intra-predictor 222.

Figure 3:
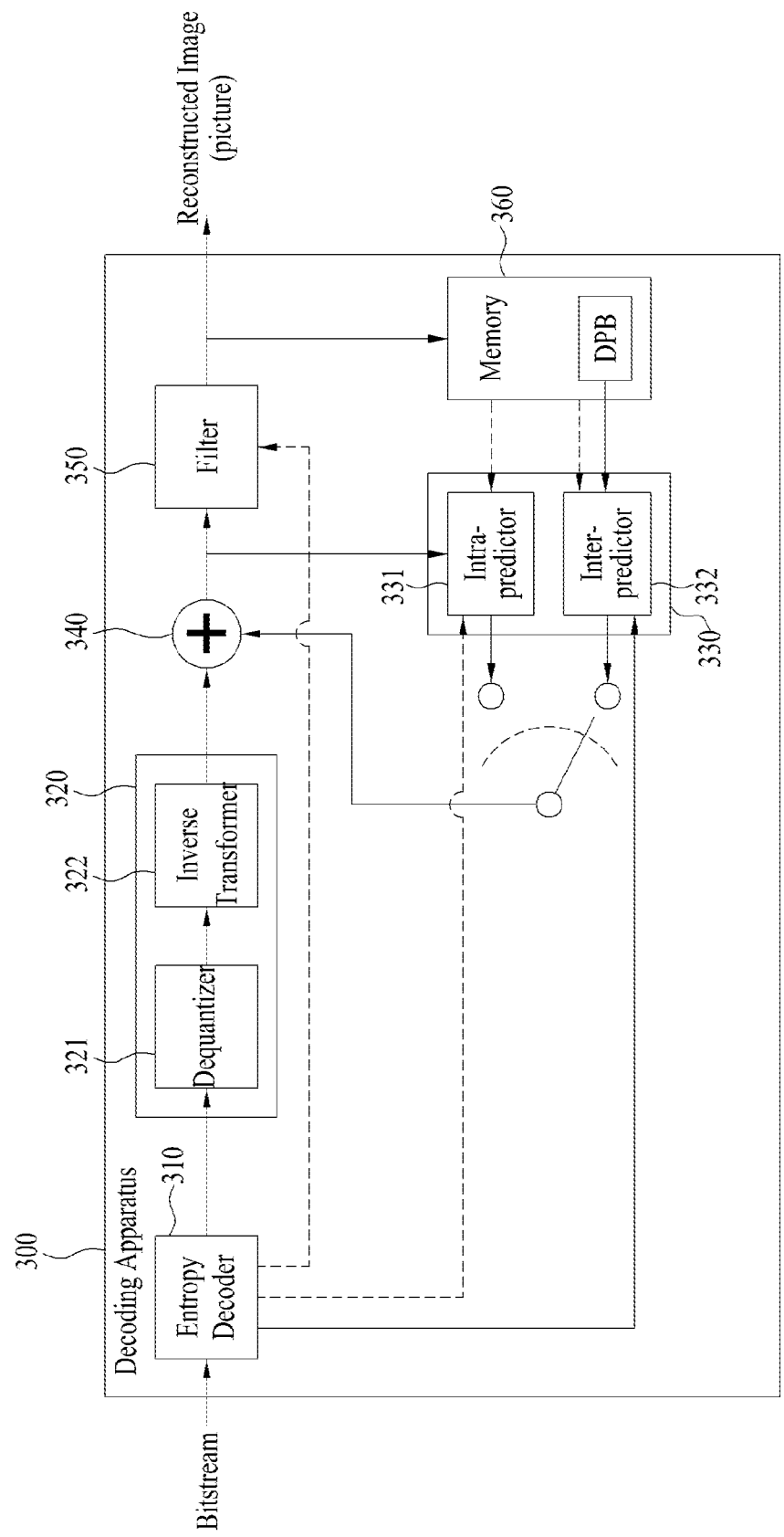
FIG. 3 illustrates a decoding apparatus according to embodiments.

FIG. 3 illustrates a decoding apparatus according to embodiments.

FIG. 3 shows the decoding apparatus 1060 of FIG. 1, which may be referred to as a decoder or the like.

The decoding apparatus of FIG. 3 may follow the reverse process of the operation of the encoding apparatus of FIGS. 1 and 2.

FIG. 3 is a schematic block diagram of a decoding apparatus decoding a video/image signal.

The decoding apparatus 300 may include an entropy decoder 310, a residual processor 320, a predictor 330, an adder 340, a filter 350, and a memory 360. The predictor 330 may include an inter-predictor 331 and an intra-predictor 332. The residual processor 320 may include a dequantizer 321 and an inverse transformer 321. The entropy decoder 310, residual processor 320, predictor 330, adder 340 and filter 350 are configured by one hardware component (e.g., a decoder chipset or processor) according to an embodiment. In addition, the memory 360 may include a decoded picture buffer (DPB), and may be configured by a digital storage medium. The hardware component may further include the memory 360 as an internal/external component.

When a bitstream containing video/image information is input, the decoding apparatus 300 may reconstruct an image according to the process in which the video/image information is processed by the encoding apparatus of FIGS. 2-1. For example, the decoding apparatus 300 may derive units/blocks based on block partitioning related information acquired from the bitstream. The decoding apparatus 300 may perform decoding using a processing unit applied in the encoding apparatus. Thus, the processing unit of decoding may be, for example, a CU. The CU may be partitioned from a CTU or an LCU along a quad-tree structure, a binary-tree structure, and/or a ternary tree structure. One or more transform units may be derived from the coding unit. Then, the reconstructed video signal decoded and output through the decoding apparatus 300 may be played through a player.

The decoding apparatus 300 may receive a signal output from the encoder in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information about various parameter sets, such as an adaptation parameter set (APS), a picture parameter set (PPS), a sequence parameter set (SPS), or a video parameter set (VPS). The video/image information may further include general constraint information. The video/image information may include a method of generating the decoded information, usage of the decoded information, and a purpose of the decoded information. The decoding apparatus may decode the picture further based on the information about the parameter set and/or the general constraint information. Signaled/received information and/or syntax elements described later in the present disclosure may be decoded through a decoding procedure and acquired from a bitstream. For example, the entropy decoder 310 may decode the information in the bitstream based on a coding technique such as exponential Golomb coding, CAVLC, or CABAC, output values of syntax elements required for image reconstruction and quantized values of transform coefficients for the residual. More specifically, in the CABAC entropy decoding, a bin corresponding to each syntax element in the bitstream may be received, and a context model may be determined based on decoding target syntax element information and decoding information about neighboring and decoding target blocks or information about a symbol/bin decoded in a previous step. Then, the probability of occurrence of a bin may be predicted according to the determined context model, and arithmetic decoding of the bin may be performed to generate a symbol corresponding to the value of each syntax element. According to the CABAC entropy decoding method, after a context model is determined, the context model may be updated based on the information about the symbol/bin decoded for the context model of the next symbol/bin. Information about the prediction in the information decoded by the entropy decoder 310 may be provided to the predictors (the inter-predictor 332 and the intra-predictor 331), and the residual values on which entropy decoding has been performed by the entropy decoder 310, that is, the quantized transform coefficients and related parameter information, may be input to the residual processor 320. The residual processor 320 may derive a residual signal (a residual block, residual samples, or a residual sample array). In addition, information about filtering in the information decoded by the entropy decoder 310 may be provided to the filter 350. A receiver (not shown) configured to receive a signal output from the encoding apparatus may be further configured as an internal/external element of the decoding apparatus 300. Alternatively, the receiver may be an element of the entropy decoder 310. The decoding apparatus according to the present disclosure may be referred to as a video/image/picture decoding apparatus. The decoding apparatus may be divided into an information decoder (a video/image/picture information decoder) and a sample decoder (a video/image/picture sample decoder). The information decoder may include an entropy decoder 310. The sample decoder may include at least one of a dequantizer 321, an inverse transformer 322, an adder 340, a filter 350, a memory 360, and an inter-predictor 332, or an intra-predictor 331.

The dequantizer 321 may output transform coefficients by dequantizing the quantized transform coefficients. The dequantizer 321 may rearrange the quantized transform coefficients in the form of a two-dimensional block. In this case, the rearrangement may be performed based on the coefficient scan order implemented by the encoding apparatus. The dequantizer 321 may dequantize the quantized transform coefficients using a quantization parameter (e.g., quantization step size information), and acquire transform coefficients.

The inverse transformer 322 inversely transforms the transform coefficients to acquire a residual signal (residual block or residual sample array).

The predictor may perform prediction on the current block and generate a predicted block including prediction samples for the current block. The predictor may determine whether intra-prediction or inter-prediction is to be applied to the current block based on the information about the prediction output from the entropy decoder 310, and may determine a specific intra-/inter-prediction mode.

The predictor 320 may generate a prediction signal based on various prediction methods, which will be described later. For example, the predictor may apply intra prediction or inter prediction for prediction of a block. In addition, it may apply the intra prediction and the inter prediction simultaneously. This operation may be called combined inter and intra prediction (CIIP). In addition, the predictor may operate based on an intra block copy (IBC) prediction mode or a palette mode for prediction for a block. The IBC prediction mode or the palette mode may be used for coding of images/video of content such as games, for example, screen content coding (SCC). The IBC basically performs prediction within the current picture, but the prediction may be similar to inter prediction in that a reference block is derived within the current picture. That is, the IBC may use at least one of the inter prediction techniques described in the present disclosure. The palette mode may be considered as an example of intra coding or intra prediction. When the palette mode is applied, information about a palette table and a palette index may be included in video/image information and signaled.

The intra-predictor 331 may predict the current block with reference to the samples in the current picture. The samples may be positioned in the neighbor of or away from the current block depending on the prediction mode. In intra-prediction, the prediction modes may include a plurality of non-directional modes and a plurality of directional modes. The intra-predictor 331 may determine a prediction mode to be applied to the current block, based on the prediction mode applied to the neighboring block.

The inter-predictor 332 may derive a predicted block for the current block based on a reference block (reference sample array) specified by a motion vector on the reference picture. In this case, in order to reduce the amount of motion information transmitted in the inter-prediction mode, the motion information may be predicted on a per block, sub-block, or sample basis based on the correlation in motion information between the neighboring blocks and the current block. The motion information may include a motion vector and a reference picture index. The motion information may further include information about an inter-prediction direction (L0 prediction, L1 prediction, Bi prediction, etc.). In the case of inter-prediction, the neighboring blocks may include a spatial neighboring block, which is present in the current picture, and a temporal neighboring block, which is present in the reference picture. For example, the inter-predictor 332 may configure a motion information candidate list based on the neighboring blocks and derive a motion vector and/or a reference picture index of the current block based on the received candidate selection information. Inter prediction may be performed based on various prediction modes, and the prediction information may include information indicating an inter prediction mode for the current block.

The adder 340 may add the acquired residual signal to the prediction signal (predicted block or predicted sample array) output from the predictor (including the inter-predictor 332 and/or the intra-predictor 331), thereby generating a reconstructed signal (a reconstructed picture, a reconstructed block, or a reconstructed sample array). When there is no residual signal for a processing target block unlike in the case where the skip mode is applied, the predicted block may be used as the reconstructed block.

The adder 340 may be called a reconstructor or a reconstructed block generator. The generated reconstructed signal may be used for intra-prediction of the next processing target block in the current picture, or may be output or used for inter-prediction of the next picture through filtering as described below.

Luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering techniques to the reconstructed picture, and may transmit the modified reconstructed picture to the memory 360, specifically, the DPB of the memory 360. The various filtering techniques may include, for example, deblocking filtering, sample adaptive offset, adaptive loop filtering, and bilateral filtering.

The (modified) reconstructed picture stored in the DPB of the memory 360 may be used as a reference picture in the inter-predictor 332. The memory 360 may store the motion information about a block from which the motion information is derived (or decoded) in the current picture and/or the motion information about the blocks in a picture that has already been reconstructed. The stored motion information may be delivered to the inter-predictor 260 so as to be used as the motion information about a spatial neighboring block or the motion information about a temporal neighboring block. The memory 360 may store the reconstructed samples of the reconstructed blocks in the current picture, and deliver the reconstructed samples to the intra-predictor 331.

In the present disclosure, the embodiments described regarding the filter 260, the inter-predictor 221, and the intra-predictor 222 of the encoder 100 may be applied to the filter 350, the inter-predictor 332 and the intra-predictor 331 of the decoding apparatus 300, respectively, in the same or corresponding manner.

Embodiments of FIGS. 1 to 3 may be implemented and carried out on a processor, a microprocessor, a controller, or a chip. For example, the functional units shown in each figure may be implemented and carried out on a computer, a processor, a microprocessor, a controller, or a chip. In this case, information (e.g., information on instructions) or an algorithm for implementation may be stored in a digital storage medium.

In addition, the decoding apparatus and the encoding apparatus according to the embodiments of FIGS. 1 to 3 may be included in a multimedia broadcast transmission/reception device, a mobile communication terminal, a home cinema video device, a digital cinema video device, a surveillance camera, a video conversation device, a real-time communication device such as a video communication device, a mobile streaming device, a storage medium, a camcorder, a video on demand (VoD) service providing device, an Over the top (OTT) video device, an internet streaming service providing device, a three-dimensional (3D) video device, a virtual reality (VR) device, an augmented reality (AR) device, a video telephony video device, a transportation terminal (e.g., a vehicle (including an autonomous vehicle) terminal, a robot terminal, an airplane terminal, a ship terminal, etc.), and a medical video device.

Also, the embodiments of FIGS. 1 to 3 may be used to process a video signal or a data signal. For example, the OTT video device may include a game console, a Blu-ray player, an Internet-connected TV, a home theater system, a smartphone, a tablet, and a digital video recorder (DVR).

In addition, the embodiments of FIGS. 1 to 3 may be implemented as a computer program product by program code. The program code may be executed on a computer by the embodiment(s) of the present disclosure. The program code may be stored in a carrier readable by a computer.

Figure 4:
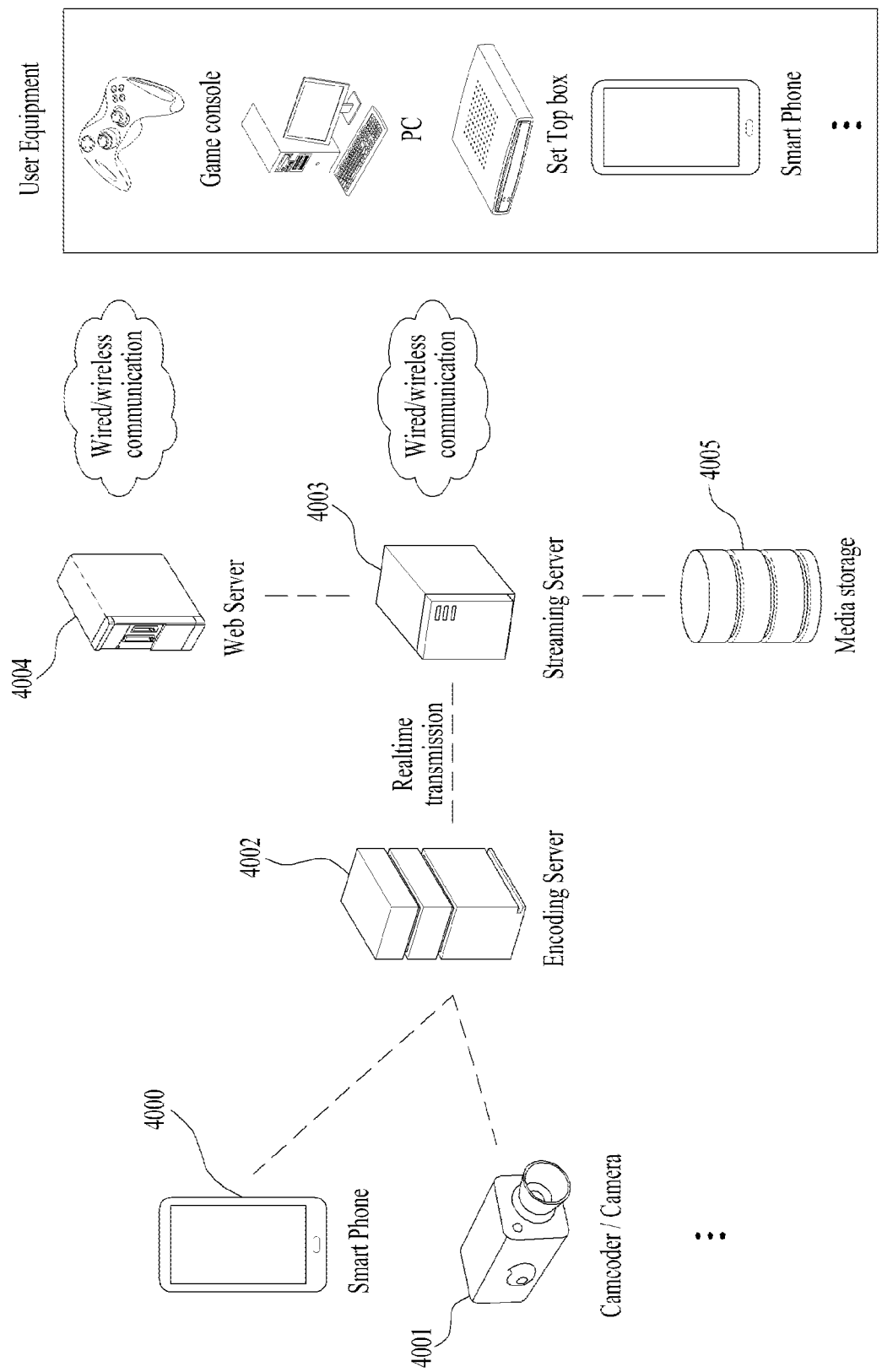
FIG. 4 illustrates a structure diagram of a content streaming system according to embodiments.

FIG. 4 illustrates a structure diagram of a content streaming system according to embodiments.

FIG. 4 shows a content system with which the video transmission device and/or reception device of FIG. 1 may be associated.

A video/image processing device such as a smartphone 4000 or a camera 4001 may be connected to an encoding server 4002. The video/image processing device may correspond to the devices of FIG. 1 according to embodiments.

The content streaming system of FIG. 4 may largely include an encoding server 4002, a streaming server 4003, a web server 4004, a media storage 4005, a user equipment and a multimedia input device 4006.

The encoding server generates a bitstream by compressing content input from multimedia input devices such as a smartphone, a camera, and a camcorder into digital data and transmits the same to the streaming server.

For example, when multimedia input devices such as a smartphone, a camera, and a camcorder directly generate a bitstream, the encoding server may be omitted. Depending on the performance of the device, the user request, and the characteristics of the task to be performed, the task may be performed by the user equipment or may be performed by an external device. In order to transmit information necessary for the task to an external device, the input device may directly generate a bitstream or generate a bitstream through the encoding server.

The bitstream may be generated by the encoding method or the bitstream generation method according to the embodiments, and the streaming server may temporarily store the bitstream in the process of transmitting or receiving the bitstream.

After decoding the received encoded information, the analytic server performs a task requested by the user. At this time, the result obtained through task execution may be transmitted to the user or to another associated service server.

For example, a result obtained by performing a task of determining a fire may be transmitted to a firefighting-related server. In this case, the analytic server may include a separate control server. In this case, the control server serves to control commands/responses between the analytic server each device associated with the server.

The streaming server transmits multimedia data to the user equipment based on the user's request provided through the web server, wherein the web server serves as a medium informing the user of an available service. In this case, the user equipment may make a request for the desired information to the web server based on the task to be performed and information about tasks that may be performed. Once the user makes a request for a desired service to the web server, the web server delivers the same to the streaming server, and the streaming server transmits multimedia data to the user. In this case, the content streaming system may include a separate control server. In this case, the control server serves to control commands/responses between devices in the content streaming system.

The streaming server may receive content from the media storage and/or the encoding server. For example, in receiving content from the encoding server, the content may be received in real time. In this case, in order to provide a smooth streaming service, the streaming server may store the bitstream for a certain period of time.

Examples of the user equipment may include a mobile phone, a smartphone, a laptop computer, a digital broadcasting terminal, a personal digital assistant (PDA), a portable multimedia player (PMP), a navigation system, a slate PC, a tablet PC, an ultrabook, a wearable device (e.g., a watch-type terminal (smartwatch), a glass-type terminal (smart glasses), a head mounted display (HMD)), a digital TV, a desktop computer, and digital signage.

The servers in the content streaming system may be operated as distributed servers. In this case, data received by each server may be processed in a distributed manner.

Figure 5:
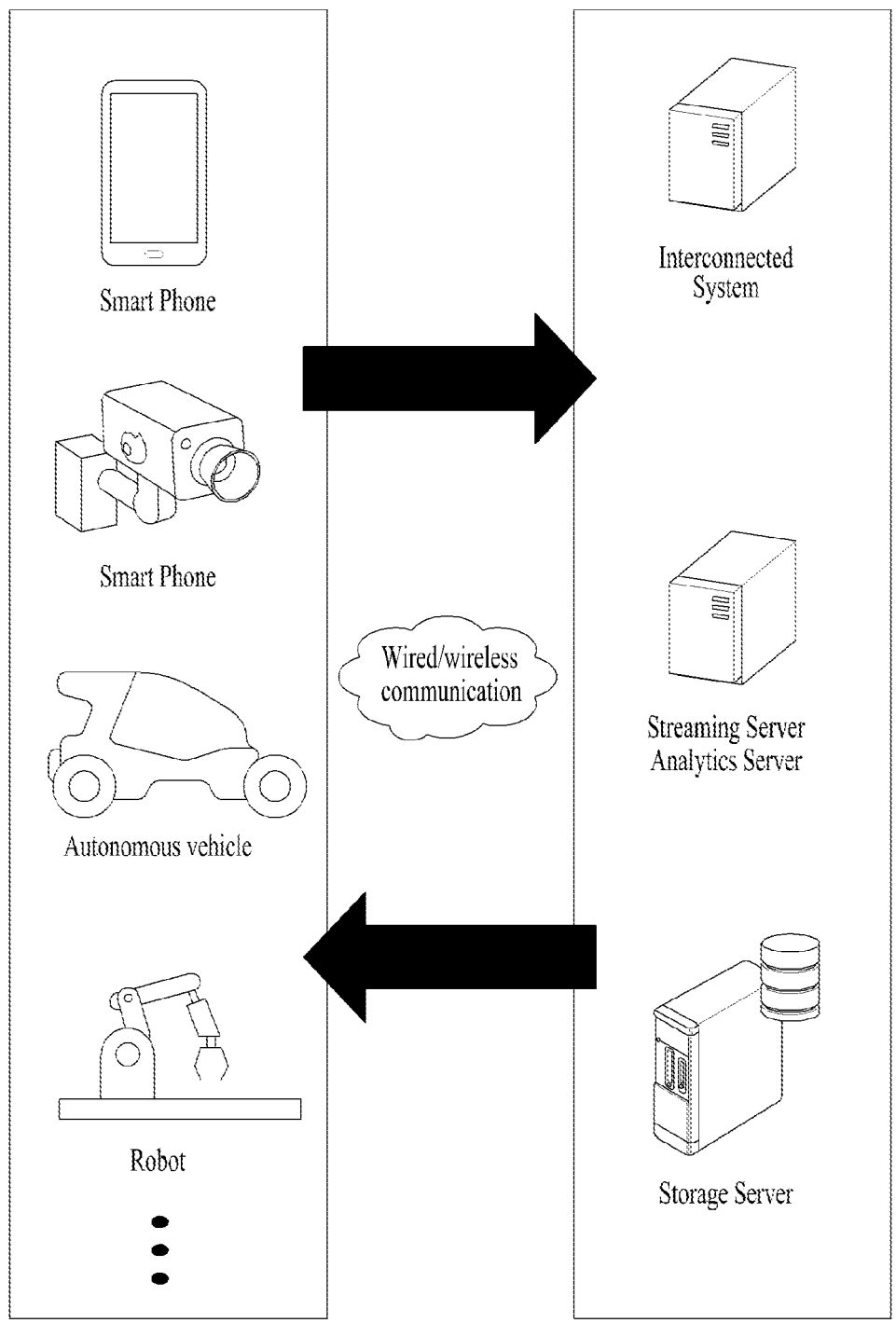
FIG. 5 illustrates an interaction system structure according to embodiments.

FIG. 5 illustrates an interaction system structure according to embodiments.

FIG. 5 illustrates an example in which the method/device according to the embodiments of FIGS. 1 to 4 interact through various devices and/or environments based on a communication network.

A smartphone, autonomous driving vehicle, robot, or the like that may be operatively connected to the device according to the embodiments may exchange data with a connected system, streaming server, analytic server, and storage server based on a wired/wireless communication network. The device according to the embodiments may perform a specific task in the interactive system structure based on the video/image compression techniques according to the embodiments.

The method/device according to the embodiments of FIGS. 1 to 5 may code a video/image based on a partitioning structure.

For example, in the method/device according to the embodiments of FIGS. 1 to 5, the partitioning structure according to the embodiments may include partitioning of a picture into CTUs, partitioning of pictures into subpictures, slices, or tiles, partitioning of the CTUs using a tree structure, CU splits on picture boundaries, restrictions on redundant CU splits, virtual pipeline data units (VPDUs), and intra chroma partitioning and prediction restriction. Hereinafter, the operations will be described.

The method/device according to the embodiments of FIGS. 1 to 5 may code a video/image based on a partitioning structure. In addition, procedures such as prediction, residual processing ((inverse) transform, (de)quantization, etc.), syntax element coding, and filtering may be performed based on the CTU, CU (and/or TU, PU) derived based on the partitioning structure.

The block partitioning procedure according to the embodiments may be performed by the image partitioner 210 of the encoding apparatus, and partitioning-related information may be (encoded) processed by the entropy encoder 240 and transmitted to the decoding apparatus in the form of a bitstream. The entropy decoder 310 of the decoding apparatus may derive the block partitioning structure of the current picture based on the partitioning related information acquired from the bitstream, and perform a series of procedures (e.g., prediction, residual processing, block/picture reconstruction, in-loop filtering, etc.) based on the derived structure. The CU size may be the same as the TU size, or a plurality of TUs may be present in the CU region. The CU size may generally represent a luma component (sample) CB size. The TU size may generally represent a luma component (sample) TB size. The chroma component (sample) CB or TB size may be derived based on the luma component (sample) CB or TB size according to the component ratio (e.g., 4:4:4, 4:2:2, 4:2:0, etc.) according to the picture/video color format (chroma format). The TU size may be derived based on maxTbSize. For example, when the CU size is greater than maxTbSize, a plurality of TUs (TBs) of maxTbSize may be derived from the CU, and transform/inverse transform may be performed on a per TU (TB) basis. In addition, for example, when intra prediction is applied, the intra prediction mode/type may be derived on a per CU (or CB) basis, and the procedure of deriving neighboring reference samples and generating prediction samples may be performed on a per TU (or TB) basis. In this case, one or more TUs (or TBs) may be present in a CU (or CB) region. In this case, the plurality of TUs (or TBs) may share the same intra prediction mode/type.

Also, in video/image coding according to embodiments, an image processing unit may have a hierarchical structure. A picture may be divided into one or more tiles, bricks, slices, and/or tile groups. A slice may include one or more bricks. A brick may include one or more CTU rows in a tile. A slice may include an integer number of bricks of a picture. A tile group may include one or more tiles. A tile may include one or more CTUs. A CTU may be partitioned into one or more CUs. A tile is a rectangular region of CTUs within a particular tile column and a particular tile row in a picture. A tile group may include an integer number of tiles according to the tile raster scan in a picture. A slice header may convey information/parameters applicable to the corresponding slice (or blocks in the slice). A picture header may convey information/parameters applied to the corresponding picture (or blocks in the picture). When the encoding/decoding apparatus has a multi-core processor, encoding/decoding procedures for tiles, slices, bricks and/or tile groups may be processed in parallel. In the present disclosure, the terms slice and tile group may be used interchangeably. That is, the tile group header may be referred to as a slice header. Here, the slice may have one of slice types including intra (I) slice, predictive (P) slice, and bi-predictive (B) slice. For blocks in an I slice, inter prediction may not be used as prediction, and only intra prediction may be used. Of course, even in this case, the original sample value may be coded and signaled without prediction. For blocks in a P slice, intra prediction or inter prediction may be used, and when inter prediction is used, only uni prediction may be used. For blocks in a B slice, intra prediction or inter prediction may be used, and when inter prediction is used, up to the maximum (bi) prediction may be used.

The encoder according to the embodiments may determine the tile/tile group, brick, slice, and maximum and minimum coding unit sizes according to characteristics (e.g., resolution) of a video/image or in consideration of coding efficiency or parallel processing, and information thereon or information for deriving the same may be included in the bitstream.

The decoder according to the embodiments may acquire information indicating whether a tile/tile group, a brick, a slice, or a CTU in a tile of the current picture are partitioned into multiple coding units. When such information is allowed to be acquired (transmitted) only under a specific condition, efficiency may be increased.

A slice header (slice header syntax) according to embodiments may include information/parameters commonly applicable to slices. The APS (APS syntax) or PPS (PPS syntax) may include information/parameters commonly applicable to one or more pictures. The SPS (SPS syntax) may include information/parameters commonly applicable to one or more sequences. The VPS (VPS syntax) may include information/parameters commonly applicable to multiple layers. The DPS (DPS syntax) may include information/parameters commonly applicable to the entire video. The DPS may include information/parameters related to concatenation of a coded video sequence (CVS).

The high-level syntax according to embodiments may include at least one of an APS syntax, a PPS syntax, an SPS syntax, a VPS syntax, DPS syntax, a picture header syntax, and a slice header syntax.

For example, information on partitioning and configuration of the tile/tile group/brick/slice may be configured at the encoding stage through higher-level syntax and transmitted to the decoding apparatus in the form of a bitstream.

Figure 6:
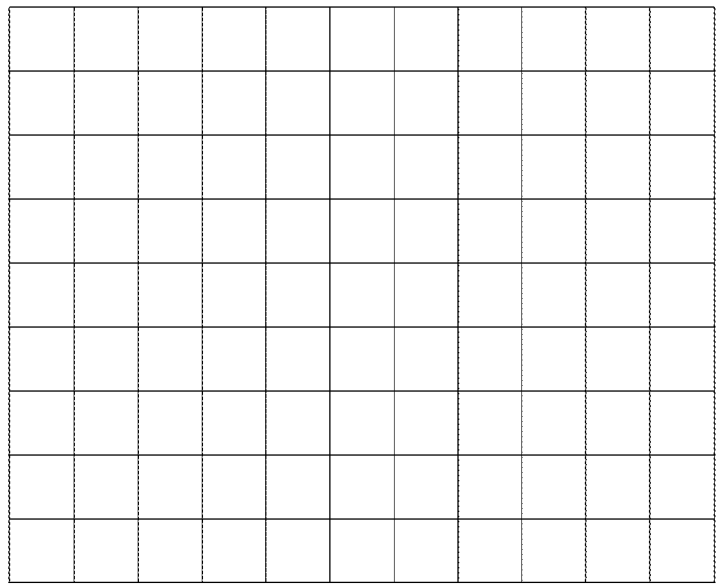
FIG. 6 illustrates an example of a picture partitioned into CTUs according to embodiments.

FIG. 6 illustrates an example of a picture partitioned into CTUs according to embodiments.

FIG. 6 illustrates an example of partitioning a picture into CTUs according to embodiments. The method/device according to the embodiments of FIGS. 1 to 5 may partition a picture as shown in FIG. 6.

Partitioning of a Picture into CTUs

Pictures may be divided into a sequence of coding tree units (CTUs). A CTU may correspond to a coding tree block (CTB). Alternatively, the CTU may include a coding tree block of luma samples and two coding tree blocks of corresponding chroma samples.

For a picture including three sample arrays, the CTU may include an N×N block of luma samples and two corresponding blocks of chroma samples. FIG. 6 shows an example in which a picture is partitioned into CTUs.

The maximum allowable size of the CTU for coding and prediction may be different from the maximum allowable size of the CTU for transformation. For example, the maximum allowable size of a luma block in the CTU may be 128×128 (even when the maximum size of the luma transform blocks is 64×64).

Figure 7:
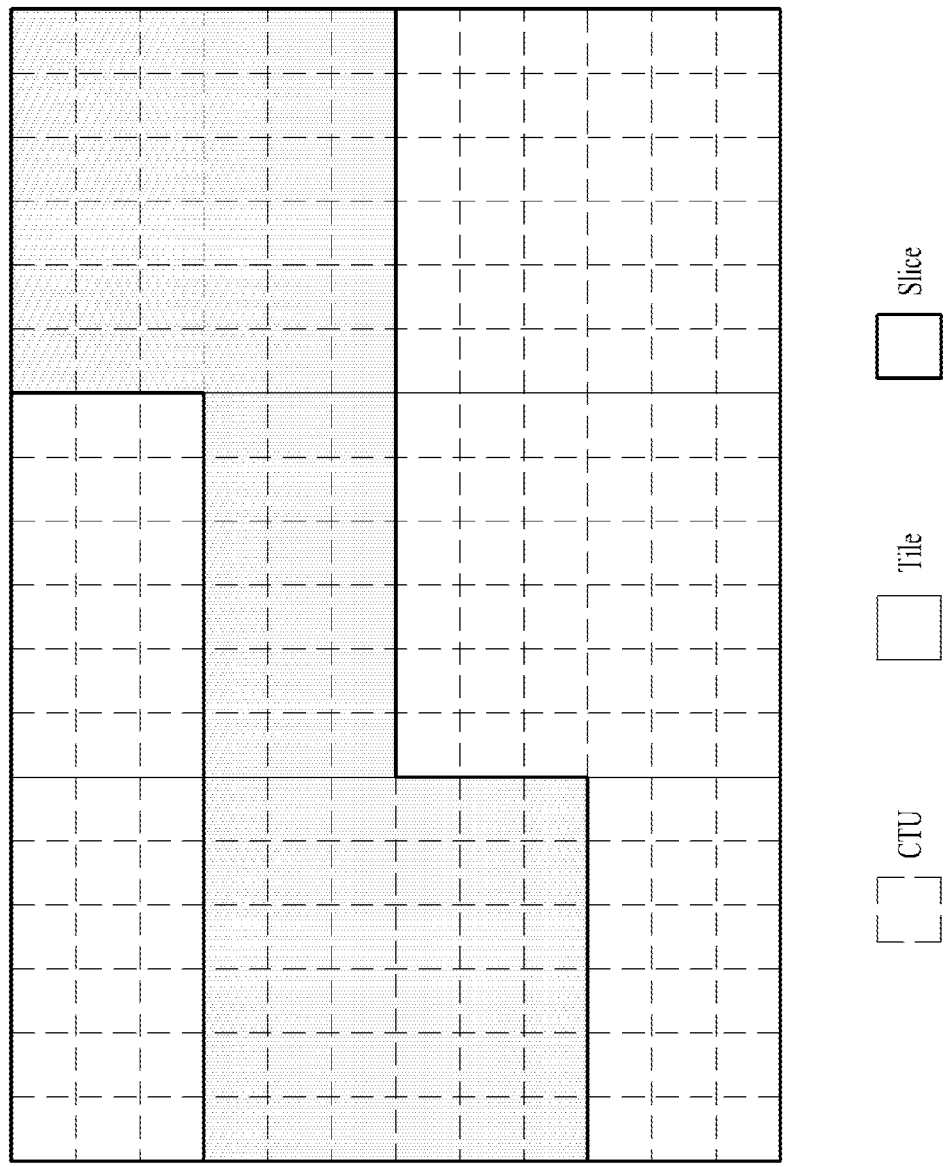
FIG. 7 illustrates an example of a picture partitioned into tiles and raster-scan slices according to embodiments.

FIG. 7 illustrates an example of a picture partitioned into tiles and raster-scan slices according to embodiments.

FIG. 7 illustrates partitioning of a picture according to embodiments. The method/device according to the embodiments of FIGS. 1 to 5 may partition a picture as shown in FIG. 7.

Partitioning of Pictures into Subpictures, Slices, or Tiles

A picture may be partitioned into one or more tile rows and one or more tile columns. A tile may be a sequence of CTUs covering a rectangular region of the picture.

A slice may consist of an integer number of complete tiles or an integer number of consecutive complete CTU rows within a tile of a picture.

Two modes of slices may include a raster-scan slice mode and a rectangular slice mode.

In the raster-scan mode, a slice may contain a sequence of complete tiles in a tile raster scan of a picture.

In the rectangular slice mode, a slice may contain an integer number of complete tiles that collectively form a rectangular region of the picture. Alternatively, a slice may include an integer number of consecutive complete CTU rows of one tile that collectively form a rectangular region of the picture.

Tiles within a rectangular slice may be scanned in tile raster scan order within the rectangular region corresponding to the slice.

A subpicture may contain one or more slices that collectively cover a rectangular region of a picture.

FIG. 7 illustrates an example of raster scan slice partitioning of a picture. FIG. 7 illustrates an example in which a picture is partitioned into 12 tiles and 3 raster scan slices.

Figure 8:
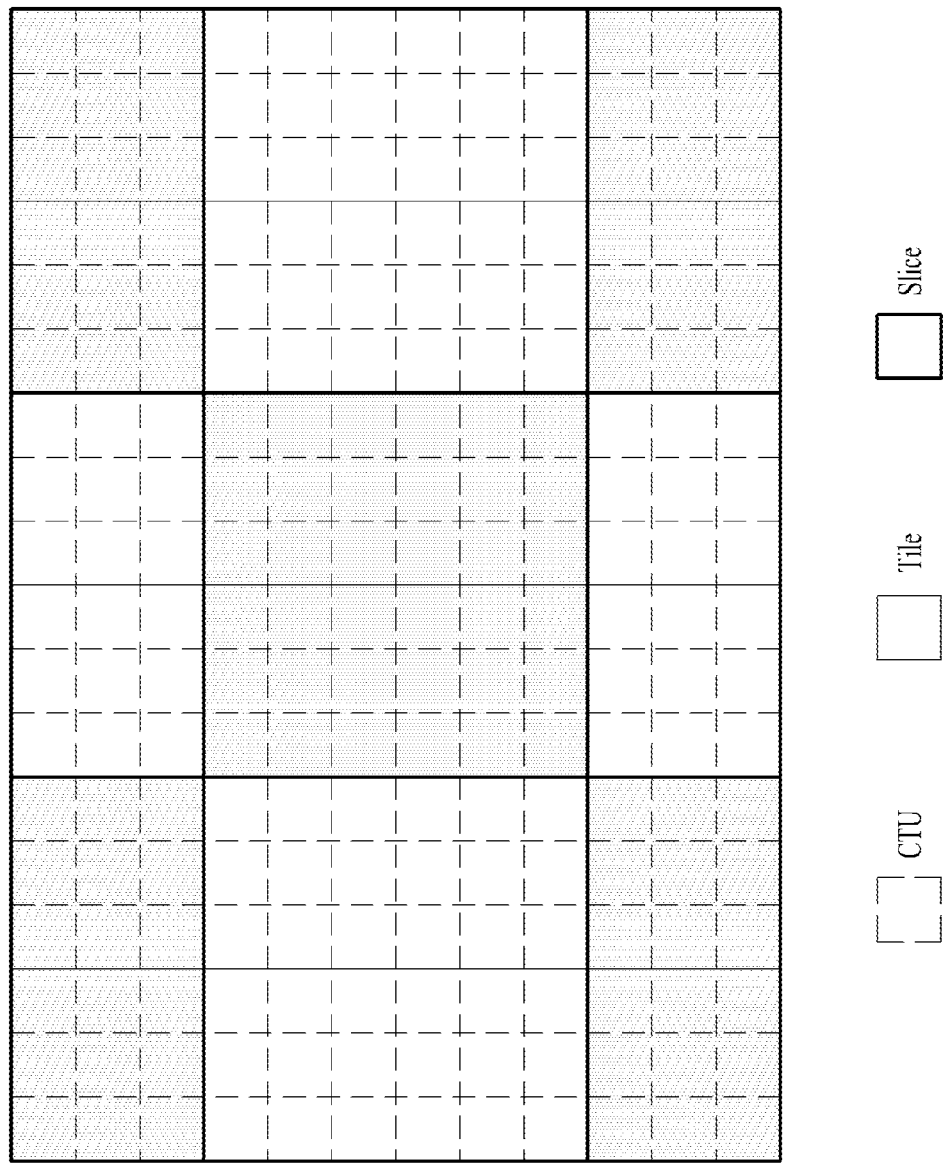
FIG. 8 illustrates an example of a picture partitioned into tiles and rectangular slices according to embodiments.

FIG. 8 illustrates an example of a picture partitioned into tiles and rectangular slices according to embodiments.

FIG. 8 illustrates partitioning of a picture according to embodiments. The method/device according to the embodiments of FIGS. 1 to 5 may partition a picture as shown in FIG. 8.

FIG. 8 illustrates an example in which a picture is partitioned into rectangular slices. A picture may be partitioned into 24 tiles and 9 rectangular slices. There are six tile columns and four tile rows.

Figure 9:
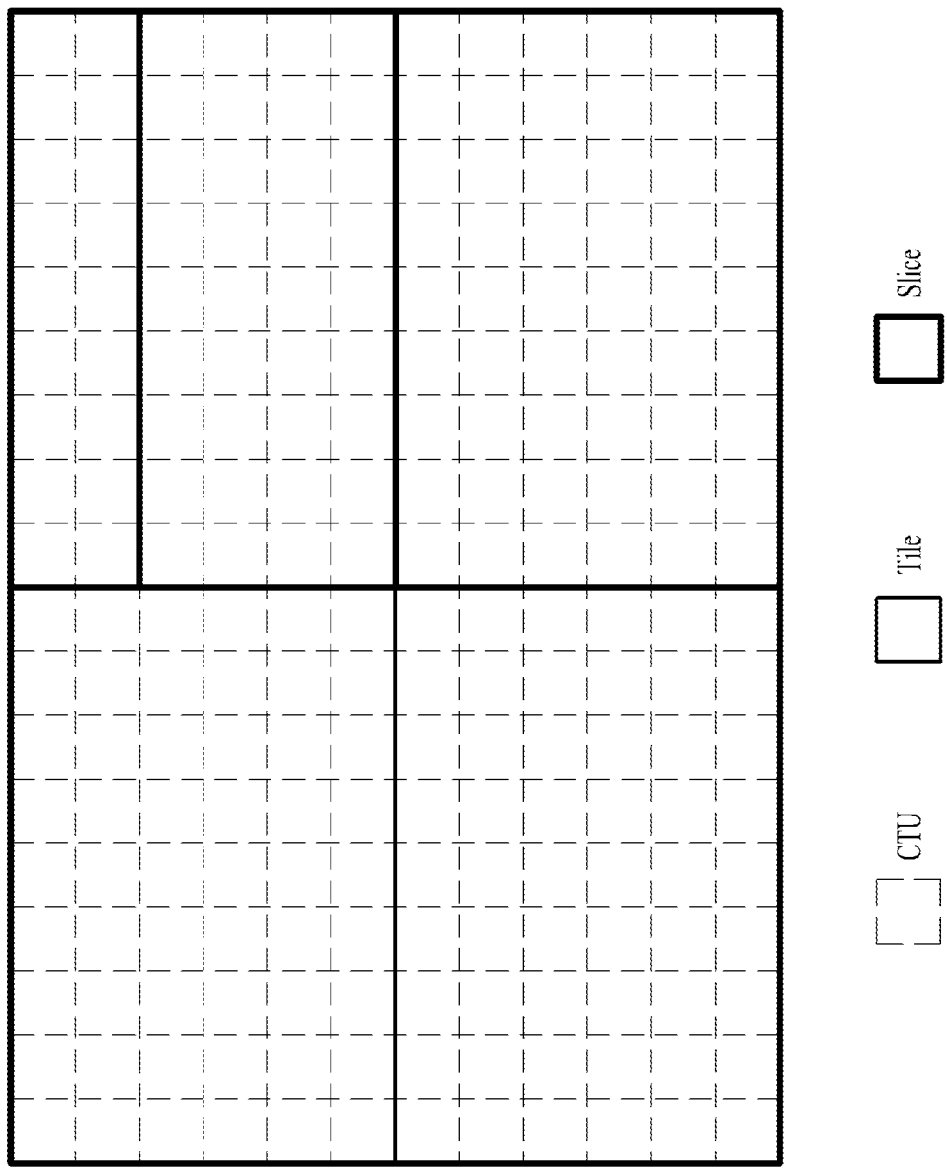
FIG. 9 illustrates an example of a picture partitioned into tiles and rectangular slices according to embodiments.

FIG. 9 illustrates an example of a picture partitioned into tiles and rectangular slices according to embodiments.

FIG. 9 illustrates partitioning of a picture according to embodiments. The method/device according to the embodiments of FIGS. 1 to 5 may partition a picture as shown in FIG. 9.

A picture may be partitioned into 4 tiles and 4 rectangular slices. There are two tile columns and two tile rows.

Figure 10:
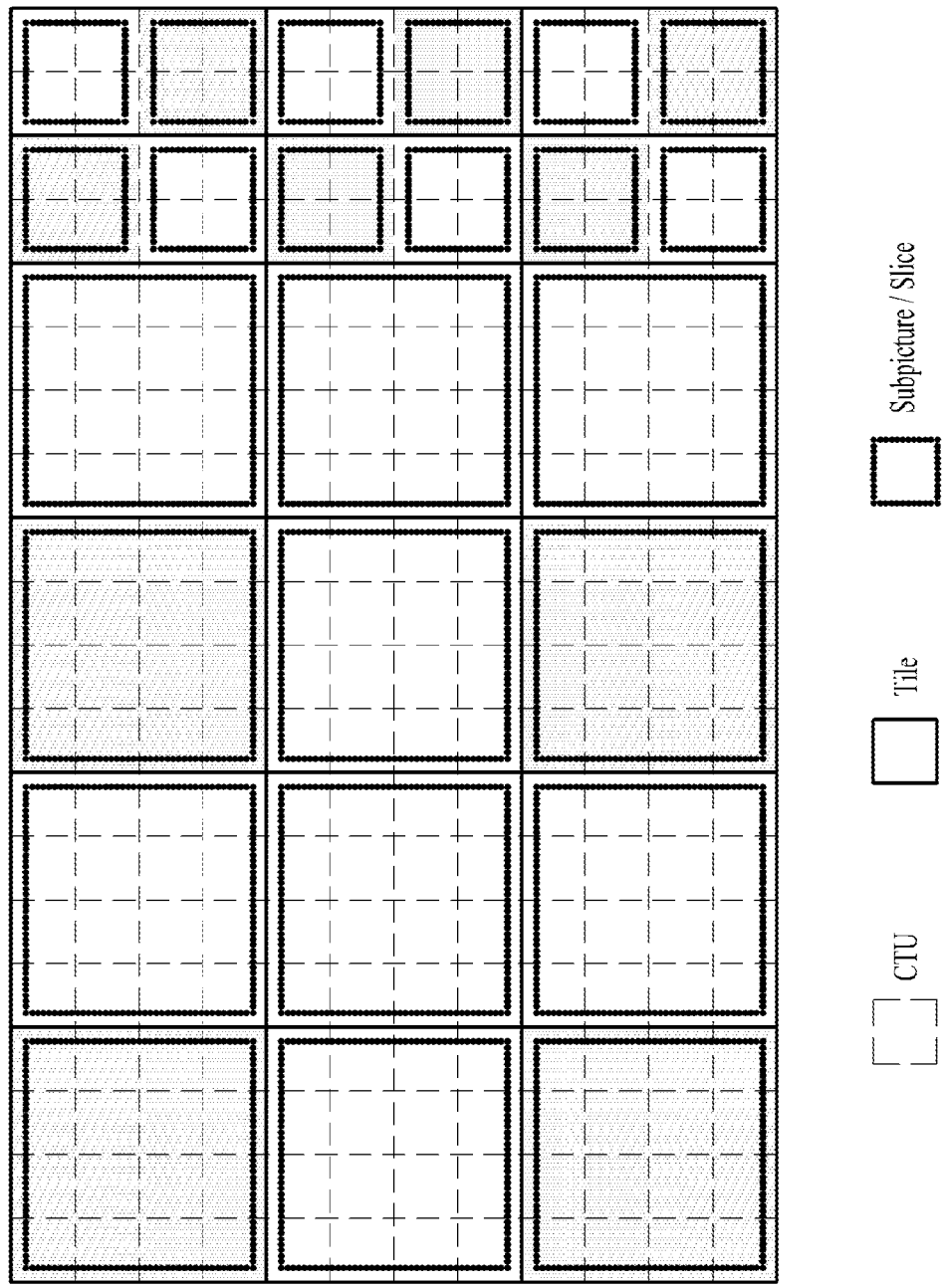
FIG. 10 illustrates an example of a picture partitioned into subpictures according to embodiments.

FIG. 10 illustrates an example of a picture partitioned into subpictures according to embodiments.

FIG. 10 illustrates partitioning of a picture according to embodiments. The method/device according to embodiments of FIGS. 1 to 5 may partition a picture as shown in FIG. 10.

A picture may be partitioned into 18 tiles. 12 tiles may be positioned on the left side covering one slice of 4 by 4 CTUs, and 6 tiles may be positioned on the right side covering two vertically stacked slices of 2 by 2 CTUs. A picture may be partitioned into 24 slices, 24 subpictures having various dimensions. Each slice becomes a subpicture. A picture may be partitioned into 28 subpictures.

Figure 11:
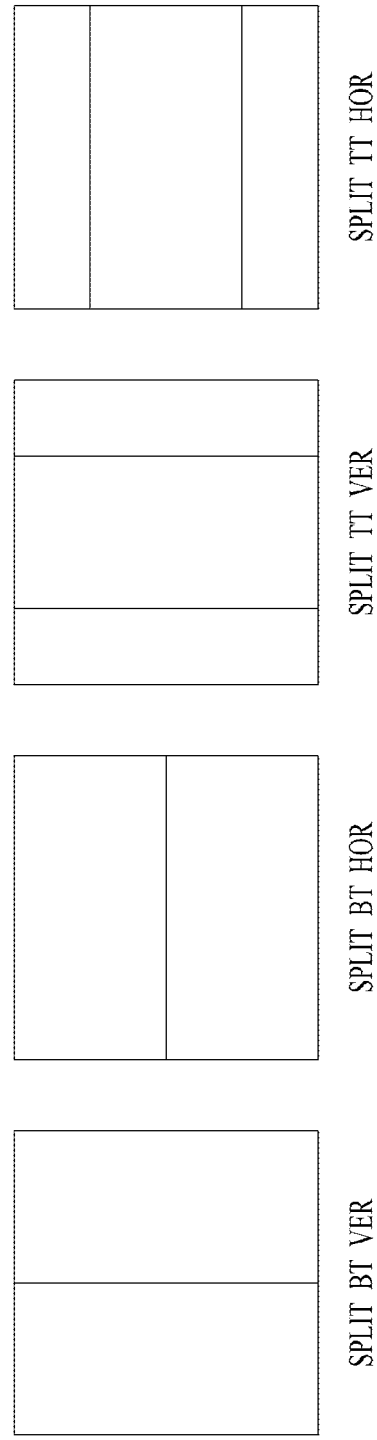
FIG. 11 illustrates multi-type tree split modes according to embodiments.

FIG. 11 illustrates multi-type tree split modes according to embodiments.

FIG. 11 illustrates partitioning of CTUs using a tree structure by a method/device according to embodiments of FIGS. 1 to 5.

Partitioning of the CTUs Using a Tree Structure

A CTU may be partitioned into CUs based on a quad-tree (QT) structure. The QT structure may be called a quaternary tree structure. This scheme is intended to reflect various local characteristics According to embodiments, a CTU may be partitioned based on a multi-type tree structure d including a binary-tree (BT) and a ternary-tree (TT) as well as the QT. Hereinafter, a QTBT structure may include a partitioning structure based on the QT and BT, and a QTBTTT may include a partitioning structure based on the QT, BT, and TT. Alternatively, the QTBT structure may include a partitioning structure based on the QT, BT, and TT. In a coding tree structure, a CU may have a square or rectangular shape. The CTU may first be partitioned in the QT structure. Thereafter, leaf nodes in the QT structure may be further partitioned in the multi-type tree structure. For example, as shown in FIG. 11, the multi-type tree structure may include approximately four splitting types.

The four partitioning types may include vertical binary splitting (SPLIT_BT_VER), horizontal binary splitting (SPLIT_BT_HOR), vertical ternary splitting (SPLIT_TT_VER), horizontal tunnel splitting (SPLIT_TT_VER), and horizontal ternary (SPLIT_TT_HOR). Leaf nodes in the multi-type tree structure may be called CUs. These CUs may be used for prediction and transform procedures. In the present disclosure, the CU, the PU, and the TU may generally have the same block size. However, when the maximum supported transform length is less than the width or height of the color component of the CU, the CU and the TU may have different block sizes.

Figure 12:
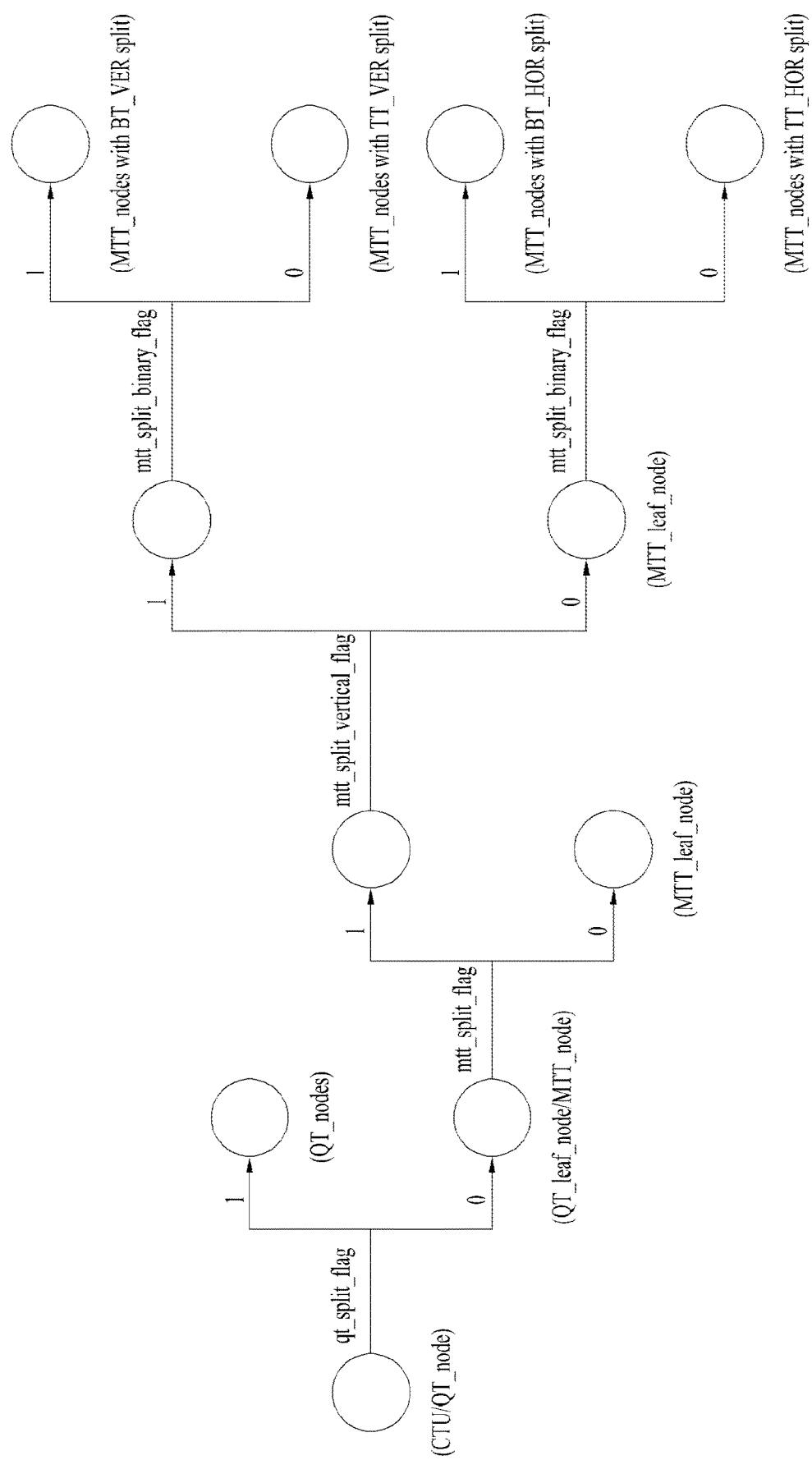
FIG. 12 illustrates an example of split flag signaling in a quad tree based on a nested multi-type coding tree structure according to embodiments.

FIG. 12 illustrates an example of split flag signaling in a quad tree based on a nested multi-type coding tree structure according to embodiments.

The method/device according to the embodiments of FIGS. 1 to 5 may signal/control partitioning information about the multi-type tree-based quad-tree structure as shown in FIG. 12.

FIG. 12 illustrates a signaling mechanism of partitioning information about a quadtree with a nested multi-type tree structure.

A CTU is treated as the root of the quad-tree and is first partitioned in a quad-tree structure. Each quad-tree leaf node may then be further partitioned in a multi-type tree structure. In the multi-type tree structure, a first flag (e.g., mtt_split_cu_flag) is signaled to indicate whether a node is additionally partitioned. The video transmission device according to the embodiments may transmit the first flag to the video reception device according to the embodiments through signaling information.

When the node is additionally partitioned, a second flag (e.g., mtt_split_cu_verticla_flag) may be signaled to indicate the splitting direction. The video transmission device according to the embodiments may transmit the second flag to the video reception device according to the embodiments through signaling information.

Thereafter, a third flag (e.g., mtt_split_cu_binary_flag) may be signaled to indicate whether the splitting type is binary splitting or ternary splitting. The video transmission device according to the embodiments may transmit the third flag to the video reception device according to the embodiments through signaling information.

For example, based on mtt_split_cu_vertical_flag and mtt_split_cu_binary_flag, the multi-type tree splitting mode (MttSplitMode) of the CU may be set.

FIG. 13 shows splitting modes according to embodiments.

FIG. 13 shows an example of the multi-type tree splitting mode of a CU based on mtt_split_cu_vertical_flag and mtt_split_cu_binary_flag described in FIG. 12.

FIG. 13 is an example in which the multi-type tree split mode of FIG. 11 is indicated by signaling information according to embodiments.

Figure 14:
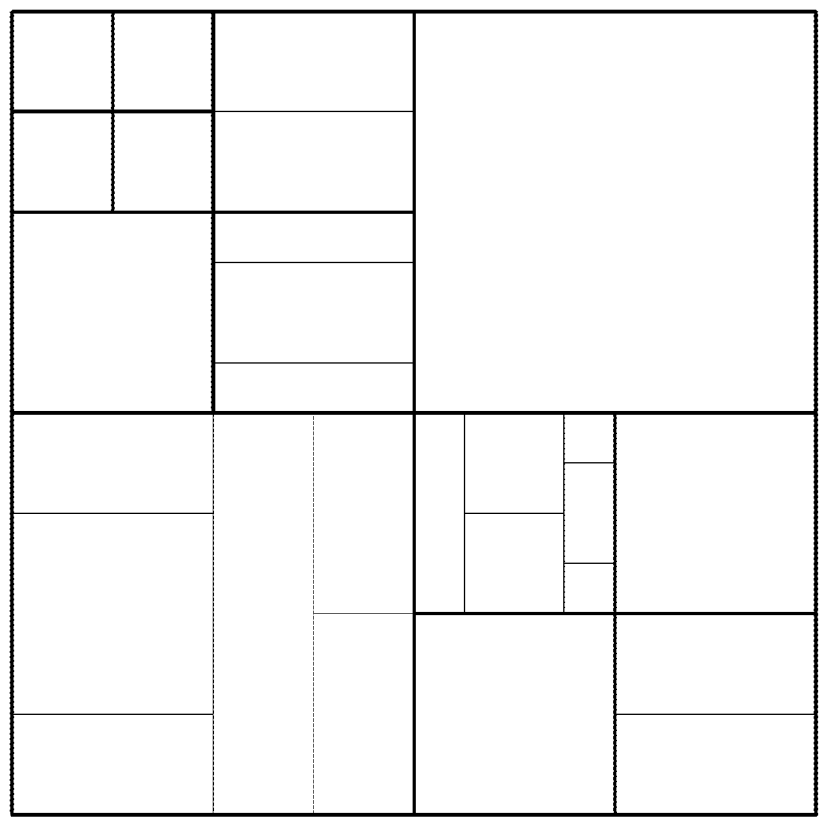
FIG. 14 illustrates an example of multiple CU splits according to embodiments.

FIG. 14 illustrates an example of multiple CU splits according to embodiments.

FIG. 14 illustrates that a CTU is partitioned into multiple CUs based on the quadtree and nested multi-type tree of FIGS. 11 to 13.

The method/device according to the embodiments in FIGS. 1 to 5 may partition the CTU into various CUs as shown in FIG. 14 according to quad-tree partitioning, multi-type partitioning, and the like in FIGS. 11 to 13.

In FIG. 14, the bold block edges represent quad-tree partitioning, and the other edges represent multi-type tree partitioning. A quad-tree partition with a nested multi-type tree may provide a content-adapted coding tree structure. A CU may correspond to a coding block (CB). Alternatively, the CU may include a CB of luma samples and two CBs of corresponding chroma samples. The size of the CU may be as large as the CTU, or may be as small as 4×4 in the luma sample unit. For example, in a 4:2:0 color format (or chroma format), the maximum chroma CB size may be 64×64 and the minimum chroma CB size may be 2×2.

For example, the maximum allowed luma TB size may be 64×64, and the maximum allowed chroma TB size may be 32×32. When the width or height of a CB partitioned according to the tree structure is greater than the maximum transform width or height, the CB may be partitioned until it automatically (or implicitly) meets the horizontal and vertical TB size limits.

For the coding tree scheme of the quad-tree with a nested multi-type tree, the following parameters may be defined and identified as SPS syntax elements.

CTU size: the root node size of a quaternary tree

MinQTSize: the minimum allowed quaternary tree leaf node size

MaxBtSize: the maximum allowed binary tree root node size

MaxTtSize: the maximum allowed ternary tree root node size

MaxMttDepth: the maximum allowed hierarchy depth of multi-type tree splitting from a quadtree leaf MinBtSize: the minimum allowed binary tree leaf node size MinTtSize: the minimum allowed ternary tree leaf node size As an example of the quad-tree with a nested multi-type tree, the CTU size may be set to 128×128 luma samples and 64×64 blocks of two corresponding chroma samples (in the 4:2:0 chroma format). In this case, MinOTSize may be set to 16×16, MaxBtSize may be set to 128×128, MaxTtSzie may be set to 64×64, MinBtSize and MinTtSize (for both width and height) may be set to 4×4, and MaxMttDepth may be set to 4. Quart-tree partitioning may be applied to the CTU to generate quad-tree leaf nodes. The quad-tree leaf node may be referred to as a leaf QT node. Quad-tree leaf nodes may have a size from 16×16 (i.e., the MinOTSize) to 128×128 (i.e., the CTU size). When the leaf QT node is 128×128, it may not be additionally partitioned into binary/turnery trees. This is because even if it is partitioned in this case, the size exceeds MaxBtsize and MaxTtszie (i.e., 64×64). In other cases, the leaf QT node may be additionally partitioned into a multi-type tree. Thus, the leaf QT node may be a root node for the multi-type tree, and mttDepth for the leaf QT node may be 0. When mttDepth reaches MaxMttdepth (e.g., 4), further partitioning may not be considered. When the width of the multi-type tree node is equal to MinBtSiz and is less than or equal to 2×MinTtSize, further horizontal partitioning may not be considered. When the height of the multi-type tree node is equal to MinBtSiz and is less than or equal to 2×MinTtSize, further vertical partitioning may be considered.

Figure 15:
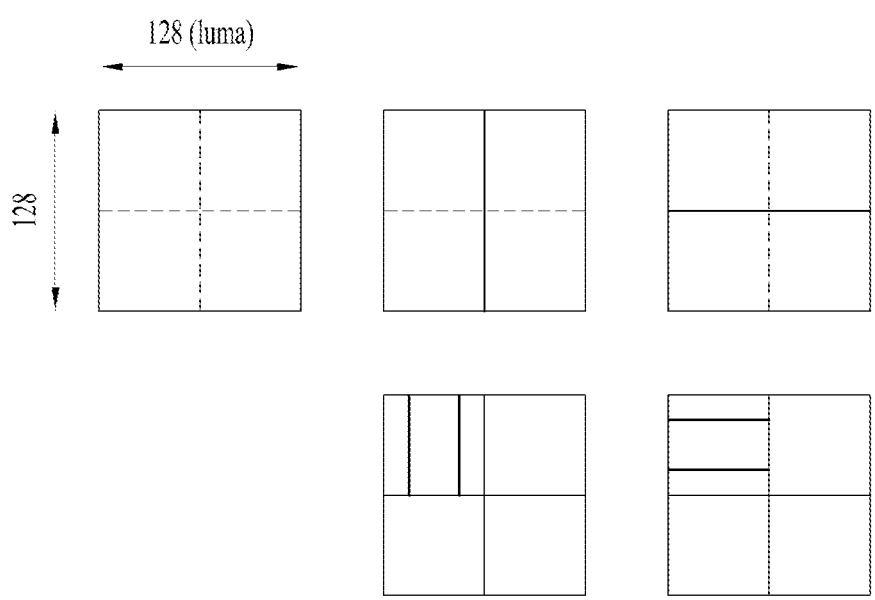
FIG. 15 illustrates forbidding of TT partitioning according to embodiments.

FIG. 15 illustrates forbidding of TT partitioning according to embodiments.

FIG. 15 illustrates an example in which TT partitioning of FIG. 11 and the like is forbidden.

In a hardware decoder according to embodiments, to allow a 64×64 luma block and a 32×32 chroma pipeline design, TT partitioning may be forbidden in certain cases. For example, when the width or height of the luma CB is greater than 64, TT partitioning may be forbidden as shown in FIG. 15. Also, for example, when the width or height of the chroma CB is greater than 32, TT partitioning may be forbidden.

For example, TT partitioning may be forbidden for the 128×128 CB.

The coding tree scheme according to embodiments may support the luma and chroma (component) blocks having a separate block tree structure. When the luma and chroma blocks in a CTU have the same block tree structure, they may be represented as SINGLE TREE.

When the luma and chroma blocks in a CTU have separate block tree structures, they may be represented as DUAL_TREE. In this case, the block tree type for the luma component may be called DUAL_TREE_LUMA, and the block tree type for the chroma component may be called DUAL_TREE_CHROMA.

For P and B slice/tile groups, luma and chroma CTBs in a CTU may be limited to have the same coding tree structure. However, for I slice/tile groups, the luma and chroma blocks may have separate block tree structures.

When the separate block tree mode is applied, the luma CTB may be partitioned into CUs based on a specific coding tree structure, and the chroma CTB may be partitioned into chroma CUs based on another coding tree structure. This may mean that the CUs in the I slice/tile group are composed of CBs of a luma component or CBs of two chroma components, and the CUs in the P or B slice/tile group may be composed of blocks of three color components.

The slice according to embodiments may be referred to as a tile/tile group, and the tile/tile group may be referred to as a slice.

In "Partitioning of the CTUs using a tree structure," the coding tree structure of a quad-tree with a nested multi-type tree has been described. However, the structure in which CUs are partitioned is not limited thereto.

For example, the BT structure and TT structure may be interpreted as concepts included in multiple partitioning tree (MPT) structure, and CUs may be interpreted as being partitioned through the QT structure and MPT structure.

In the example of CU splitting through the QT structure and the MPT structure, a syntax element (e.g., MPT_split_type) containing information about how many blocks the leaf node of the QT structure is split into, and a syntax element (e.g., MPT_split_mode) containing information about whether the leaf node of the QT structure is split vertically or horizontally may be transmitted and received through signaling information to determine the splitting structure.

According to embodiments, the CU may be partitioned using a method different from the QT structure, the BT structure, or the TT structure. That is, unlike the QT structure in which the CU of the lower depth is spit to have a size equal to ¼ of the size of the CU of the upper depth, the BT structure in which the CU of the lower depth is spit to have a size equal to ½ of the size of the CU of the upper depth, or the TT structure in which the CU of the lower depth is spit to have a size equal to ¼ or ½ of the size of the CU of the upper depth, the CU of the lower depth may be spit to have a size equal to ⅕, ⅓, ⅜, ⅗, ⅔ or ⅝ of the size of the CU of the upper depth. The method in which the CU is spit is not limited thereto.

CU Splits on Picture Boundaries

The method/device according to embodiments of FIGS. 1 to 5 may split the CU on picture boundaries.

When a portion of a tree node block exceeds the bottom or right picture boundary, the tree node block may be restricted such that all samples of all coded CUs are positioned within the picture boundaries. For example, the following splitting rules may be applied.

If a portion of a tree node block exceeds both the bottom and the right picture boundaries If the block is a QT node and the size of the block is larger than the minimum QT size, the block may be forced to be split with QT split mode.

Otherwise, the block may be forced to be split with SPLIT_BT_HOR mode.

Otherwise, if a portion of a tree node block exceeds the bottom picture boundaries If the block is a QT node, and the size of the block is larger than the minimum QT size, and the size of the block is larger than the maximum BT size, the block may be forced to be split with QT split mode.

Otherwise, if the block is a QT node, and the size of the block is larger than the minimum QT size and the size of the block is smaller than or equal to the maximum BT size, the block may be forced to be split with QT split mode or SPLIT_BT_HOR mode.

Otherwise (if the block is a BTT node or the size of the block is smaller than or equal to the minimum QT size), the block may be forced to be split with SPLIT_BT_HOR mode.

Otherwise, if a portion of a tree node block exceeds the right picture boundaries, If the block is a QT node, and the size of the block is larger than the minimum QT size, and the size of the block is larger than the maximum BT size, the block may be forced to be split with QT split mode.

—Otherwise, if the block is a QT node, and the size of the block is larger than the minimum QT size and the size of the block is smaller than or equal to the maximum BT size, the block may be forced to be split with QT split mode or SPLIT_BT_VER mode.

—Otherwise (the block is a BTT node or the size of the block is smaller than or equal to the minimum QT size), the block may be forced to be split with SPLIT_BT_VER mode.

Figure 16:
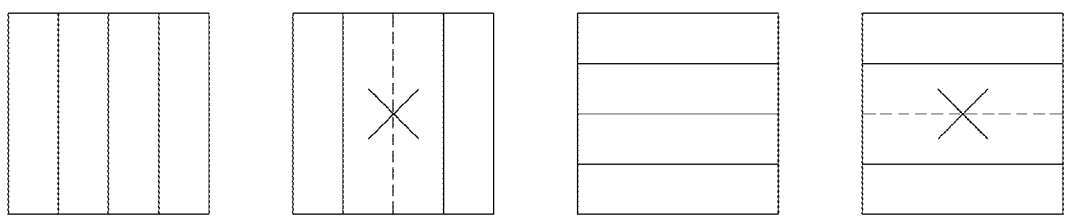
FIG. 16 shows examples of redundant splitting patterns according to embodiments.

FIG. 16 shows examples of redundant splitting patterns according to embodiments.

FIG. 16 shows redundant splitting patterns that may occur when the method/device according to the embodiments of FIGS. 1 to 5 performs binary tree splitting and ternary tree splitting.

The coding block structure of a quad-tree with a nested multi-type tree may provide a very flexible block partitioning structure. Due to the splitting types supported in the multi-type tree, different splitting patterns may potentially result in the same coding block structure in some cases. By limiting the occurrence of such redundant splitting patterns, the amount of data of partitioning information may be reduced.

As shown in FIG. 16, two levels of consecutive binary splits in one direction have the same coding block structure as the binary split for the center partition after the ternary split. In this case, the binary tree split for the center partition of the ternary tree split (in the given direction) is forbidden. such forbidding may be applied to CUs of all pictures. When such a specific split is forbidden, the signaling of the corresponding syntax elements may be modified to reflect such forbidden cases, thereby reducing the number of bits signaled for partitioning. For example, when binary tree split for the center partition of a CU is forbidden, as shown in FIG. 16, the mtt_split_cu_binary_flag syntax element indicating whether the split is binary split or ternary split may not be signaled, and may be inferred by the decoder to have a value of 0.

Virtual Pipeline Data Units (VPDUs)

The method/device according to embodiments of FIGS. 1 to 5 may code a video based on a VPDU.

Virtual pipeline data units (VPDUs) may be defined for pipeline processing in the picture. VPDUs may be defined as non-overlapping units in one picture. In a hardware decoder (e.g., FIGS. 1 to 5) according to embodiments, successive VPDUs may be processed simultaneously by multiple pipeline stages. The VPDU size is roughly proportional to the buffer size in most pipeline stages.

Therefore, keeping the VPDU size small is important, considering the buffer size from a hardware perspective. In most hardware decoders, the VPDU size may be set to be equal to the maximum transform block (TB) size. For example, the VPDU size may be 64×64 (64×64 luma samples). However, this is merely an example, and the VPDU size may be changed (increased or decreased) in consideration of the ternary tree (TT) and/or binary tree (BT) partitioning described above in relation to VVC.

Figure 17:
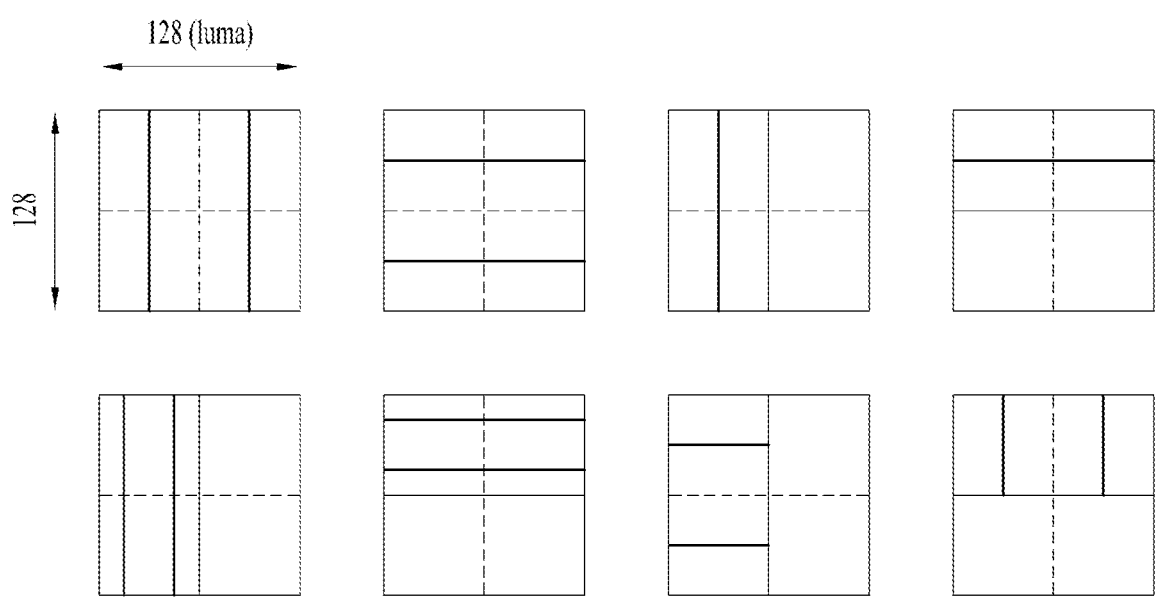
FIG. 17 illustrates restrictions of TT and BT partitioning according to embodiments.

FIG. 17 illustrates restrictions of TT and BT partitioning according to embodiments.

Regarding the VPDU of FIG. 16, in order to maintain the VPDU size as the size of 64×64 luma samples, at least one of the following restrictions may be applied as shown in FIG. 17.

TT split may not be allowed for with either width or height, or both width and height equal to 128.

For a 128×N CU with N≤64, i.e., width equal to 128 and height less than 128, horizontal BT may not be allowed.

For an N×128 CU with N≤64, i.e. height equal to 128 and width less than 128, vertical BT may not be allowed.

Intra Chroma Partitioning and Prediction Restriction

The method/device according to embodiments of FIGS. 1 to 5 may perform intra chroma partitioning and redirection as follows.

When a picture has smaller intra blocks, typical hardware video encoders and decoders may exhibit poor throughput processing due to samples that process data dependencies between neighboring intra blocks. Generation of a predictor for an intra block may require top and left boundary reconstructed samples from neighboring blocks. Accordingly, intra-prediction may be continuously processed on a block-by-block basis.

In HEVC, the smallest intra CU is 8×8 luma samples. The luma component of the smallest intra CU may be further split into four 4×4 luma intra prediction units (PUs). Accordingly, worst case hardware processing throughput may occur when 4×4 chroma intra blocks or 4×4 luma intra blocks are processed.

In VVC, in order to improve worst case throughput, chroma intra CBs smaller than 16 chroma samples (size 2×2, 4×2, and 2×4) and chroma intra CBs with width smaller than 4 chroma samples (size 2×N) may be disallowed by constraining the partitioning of chroma intra CBs.

In a single coding tree, the smallest chroma intra prediction unit (SCIPU) may be defined as a coding tree node whose chroma block size may be larger than or equal to 16 chroma samples and have at least one child luma block smaller than 64 luma samples, or a coding tree node whose chroma block size may not be 2×N and may have at least one child luma block 4×N luma samples.

In each SCIPU, all CBs may be inter, or all CBs are non-inter, i.e, either intra or intra block copy (IBC).

In the case of a non-inter SCIPU, it may be further required that chroma of the non-inter SCIPU shall not be further split and luma of the SCIPU is allowed to be further split. In this way, the small chroma intra CBs with size less than 16 chroma samples or with size 2×N may be removed.

Chroma scaling may not be applied in the case of a non-inter SCIPU. Here, no additional syntax is signaled. Whether the SCIPU is non-inter may be derived by the predication mode of the first luma CB in the SCIPU. The type of the SCIPU may be inferred to be non-inter if the current slice is an I-slice or the current SCIPU has a 4×4 luma partition after being split once. This is because no inter 4×4 is allowed in VVC. Otherwise, the type of the SCIPU (inter or non-inter) may be indicated by one flag before parsing the CUs in the SCIPU.

For the dual tree in an intra-picture, the 2×N intra chroma blocks may be removed by disabling vertical binary and vertical ternary splits for 4×N and 8×N chroma partitions, respectively. The small chroma blocks with sizes 2×2, 4×2, and 2×4 may be removed by partitioning restrictions.

A restriction on picture size may be considered to avoid 2×2/2×4/4×2/2×N intra chroma blocks at the corner of pictures by considering the picture width and height to be multiple of max (8, MinCbSizeY).

Transform/Inverse Transform

The method/device according to the embodiments of FIGS. 1 to 5 may derive a residual block (residual samples) based on the block (predicted samples) predicted through intra/inter/IBC prediction, etc.

Quantized transform coefficients may be derived by applying transform and quantization to the derived residual samples. Information on the quantized transform coefficients (residual information) may be included in a residual coding syntax and output in the form of a bitstream after being encoded.

The decoding apparatus according to the embodiments of FIGS. 1 to 5 may acquire the information on the quantized transform coefficients (residual information) from the bitstream and decode the information to derive the quantized transform coefficients. The decoding apparatus may derive residual samples through dequantization/inverse transform based on the quantized transform coefficients.

At least one of quantization/inverse quantization and/or transform/inverse transform may be skipped. When the transform/inverse transform is skipped, the transform coefficient may be called a coefficient or a residual coefficient, or it may still be called the transform coefficient for the sake of uniformity of expression. Whether the transform/inverse transform is skipped may be signaled based on transform_skip_flag.

The transform/inverse transform may be performed based on the transform kernel(s). For example, according to embodiments, a multiple transformation (MTS) scheme may be applied. In this case, some of multiple transform kernel sets may be selected and applied to the current block. The transform kernel may be called by various terms such as a transform matrix and a transform type. For example, a transform kernel set may represent a combination of a vertical transform kernel and a horizontal transform kernel.

For example, MTS index information (or tu_mts_idx syntax element) may be generated/encoded by the encoding apparatus and signaled to a decoding apparatus to indicate one of the transform kernel sets. For example, a transform kernel set according to a value of the MTS index information may be derived as follows.

The table below shows the values of trTypeHor and trTypeVer according to tu_mts_idx[x][y].

TABLE 1

| tu_mts_idx[x0][y0] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

The transform kernel set may be determined based on, for example, cu_sbt_horizontal_flag and cu_sbt_pos_flag.

cu_sbt_horizontal_flag equal to 1 specifies that the current coding unit is split horizontally into 2 transform units. cu_sbt_horizontal_flag equal to 0 specifies that the current coding unit is split vertically into 2 transform units.

cu_sbtpos_flag equal to 1 specifies that tu_cbf_lama, tu_cbf_cb and tu_cbf_cr of the first transform unit in the current coding unit are not present in the bitstream. cu_sbt_pos_flag equal to 0 specifies that tu_cbf_luma, tu_cbf_cb and tu_cbf_cr of the second transform unit in the current coding unit are not present in the bitstream.

FIGS. 18 and 19 show transform types according to embodiments.

FIGS. 18 and 19 show the transform types described with reference to FIG. 17.

As shown in FIG. 18, the method/device according to the embodiments of FIGS. 1 to 5 may present values of trType-Hor and trTypeVer based on cu_sbt_horizontal_flag and cu_sbtpos_flag.

The transform kernel set may be determined based on, for example, an intra prediction mode for the current block.

The method/device according to the embodiments of FIGS. 1 to 5 may present values of trTypeHor and trTypeVer based on predModeIntra, as shown in FIG. 19.

In FIG. 19, trTypeHor may represent a horizontal transform kernel, and trTypeVer may represent a vertical transform kernel.

trTypeHor/trTypeVer equal to 0 may indicate DCT2, trTypeHor/trTypeVer equal to 1 may indicate DST7, and trTypeHor/trTypeVer equal to 2 may indicate DCT8. However, this is merely an example, and other values may be mapped to other DCT/DST by an agreement.

FIG. 20 illustrates transform base functions according to embodiments.

The method/device according to the embodiments of FIGS. 1 to 5 may perform a transform operation with respect to the N point input values, using the transform basis functions for DCT-II/VIII and DSTVII.

FIG. 20 shows basis functions for DCT2, DCT8, and DST7 according to embodiments.

Figure 21:
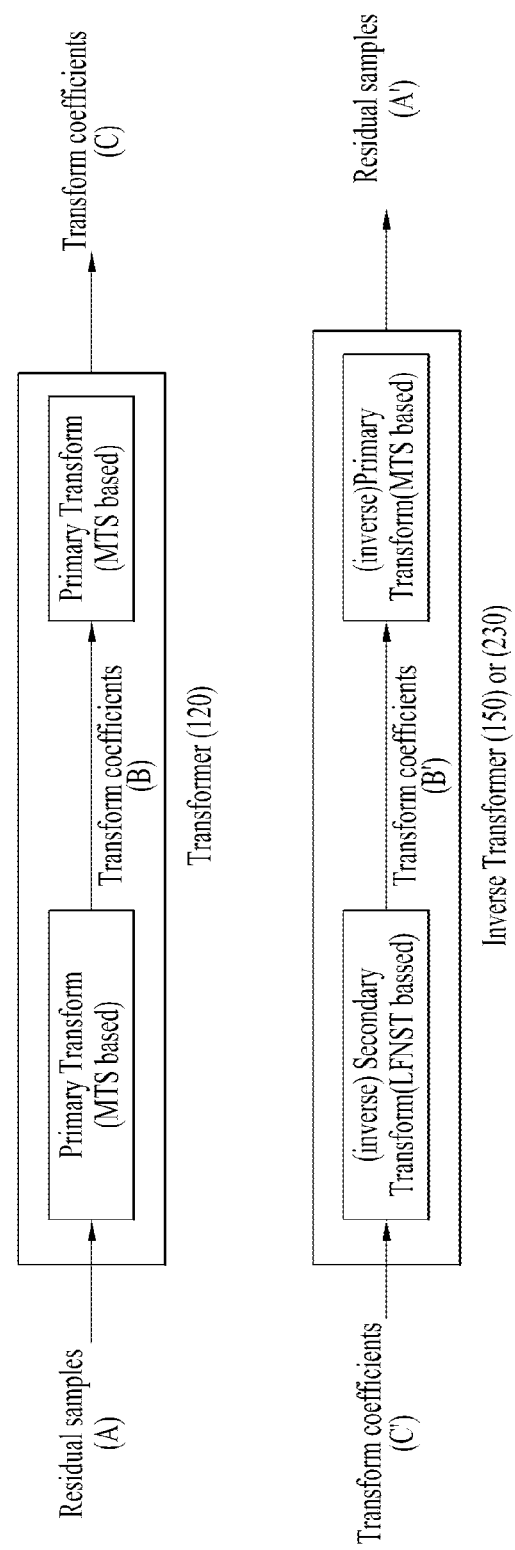
FIG. 21 illustrates transform and inverse transform according to embodiments.

FIG. 21 illustrates transform and inverse transform according to embodiments.

The method/device according to the embodiments of FIGS. 1 to 5 may transform and inversely transform video/image-related data based on the structure shown in FIG. 20.

For MTS-based transform according to embodiments, a primary transform may be applied, and a secondary transform may be further applied.

The secondary transform may be applied only to coefficients in the top left w×h region of the coefficient block to which the primary transform has been applied, or may be called a reduced secondary transform (RST).

For example, w and/or h may be 4 or 8. In the transform, the primary transform and secondary transform may be applied sequentially to the residual block. In the reverse transform, the inverse secondary transform and the inverse primary transform may be applied sequentially to the transform coefficients. The secondary transform (RST transform) may be called low frequency coefficients transform (LFCT) or low frequency non-separable transform (LFNST). The inverse secondary transform may be referred to as an inverse LFCT or an inverse LFNST.

The transformer 120 for the video transmission method/device according to the embodiments may receive residual samples A and generate transform coefficients B by performing MTS-based transform. In addition, it may generate transform coefficients C by performing LFNST-based transform.

The inverse transformer 150 or 230 for the video reception method/device according to the embodiments may perform a reverse process of the transform process. It may receive transform coefficients C', generate transform coefficients B' by performing LFNST-based inverse transform, and generate residual samples A' by performing MTS inverse transform.

Figure 22:
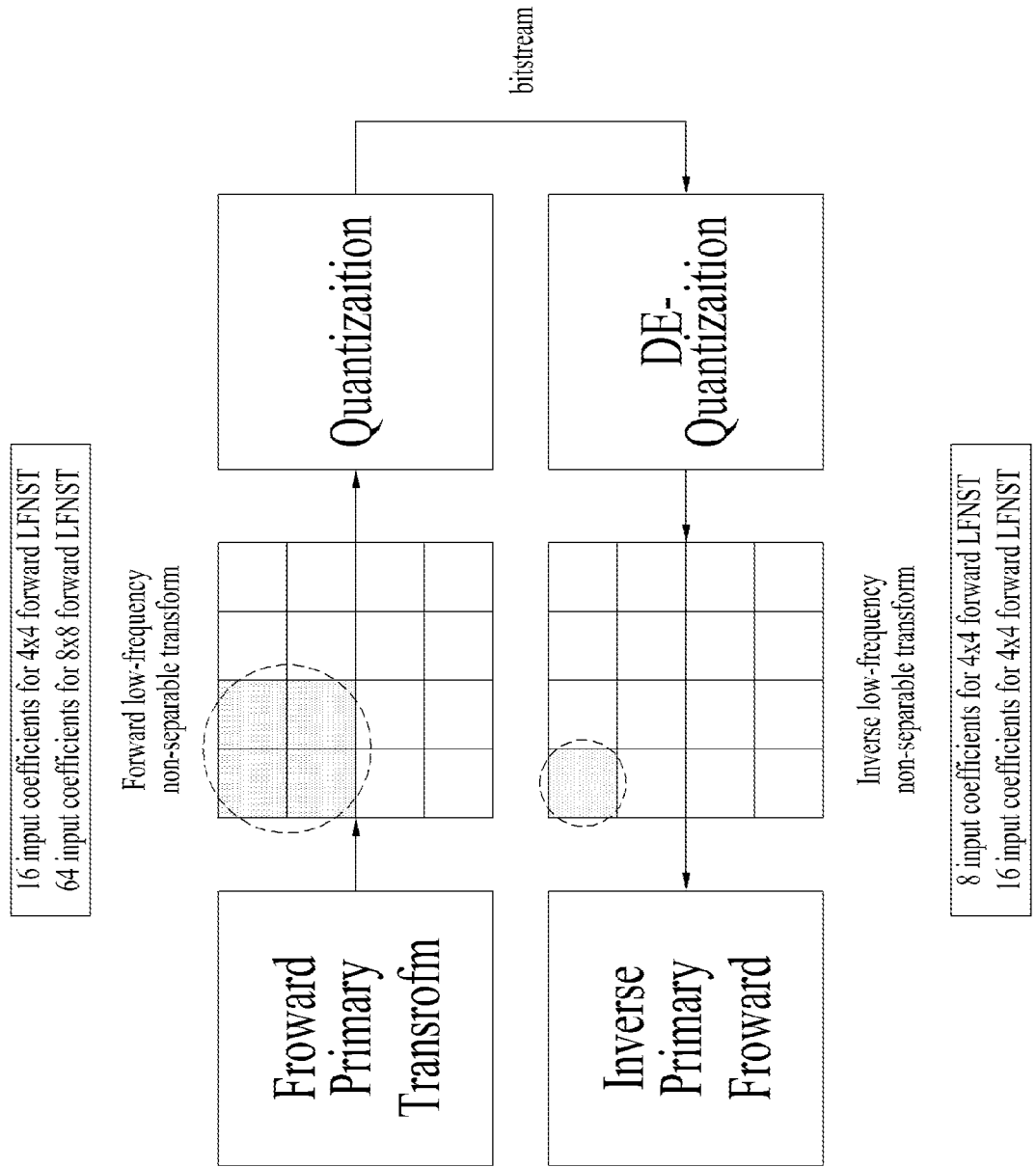

FIGS. 22 and 23 illustrate a low-frequency non-separable transform (LFNST) process according to embodiments.

FIG. 22 illustrates an LFNST process applied when the method/device according to the embodiments of FIGS. 1 to 5 performs a transform/inverse transform operation.

As shown in FIG. 22, the low-frequency non-separable transform (LFNST) may be applied between the forward primary transform and quantization at the encoder side. In addition, it may be applied between dequantization and inverse primary transform at the decoder side.

In LFNST, 4×4 non-separable transform or 8×8 non-separable transform may be applied depending on the block size.

For example, 4×4 LFNST may be applied to small blocks. The small blocks may be, for example, blocks satisfying a condition of min(width, height)<8. 8×8 LFNST may be applied to large blocks. The large blocks may be, for example, blocks satisfying a condition of min(width, height)>4.

Application of a non-separable transform, which is used in LFNST, described as follows using input. To apply the 4×4 LFNST, a 4×4 input block X may be configured as shown in FIG. 23.

FIG. 23 shows a vector, which may be represented as $\vec{X}$.

$\vec{X} = [X_{00} X_{01} X_{02} X_{03} X_{10} X_{11} X_{12} X_{13} X_{20} X_{21} X_{22} X_{23} X_{30} X_{31} X_{32} X_{33}]^T$ The non-separable transform may be calculated as $\vec{F} = T\vec{X}$, where $\vec{F}$ denotes the transform coefficient vector, and T is a 16×16 transform matrix. The 16×1 coefficient vector $\vec{F}$ may be subsequently re-organized as 4×4 block using the scanning order for the block (horizontal, vertical or diagonal).

The coefficients with smaller index may be placed with the smaller scanning index in the 4×4 coefficient block.

The transform/inverse transform according to embodiments may be performed on a per CU or TU basis. That is, the transform/inverse transform may be applied to residual samples in the CU or residual samples in the TU. The CU size may be equal to the TU size, or a plurality of TUs may be present in the CU region. The CU size may generally represent a luma component (sample) CB size.

The TU size may generally represent a luma component (sample) TB size. chroma component (sample) CB or TB size may be derived based on the luma component (sample) CB or TB size according to the component ratio according to the color format (e.g., 4:4:4, 4:2, 4:2:0, etc.).

The TU size may be derived based on maxTbSize. For example, when the CU size is greater than maxTbSize, a plurality of TUs (TBs) of maxTbSize may be derived from the CU, and transform/inverse transform may be performed on a per TU (TB) basis. The maxTbSize may be considered for determining whether various intra prediction types such as ISP are applied. Information on maxTbSize may be predetermined, or may be generated and encoded and signaled to the decoding apparatus by the encoding apparatus.
Quantization/Dequantization The method/device according to embodiments of FIGS. 1 to 5 may quantize and dequantize video/image data.

The quantizer of the encoding apparatus of FIGS. 1 to 5 may derive quantized transform coefficients by applying quantization to the transform coefficients, and the dequantizer of the encoding apparatus or the decoding apparatus may derive transform coefficients by applying dequantization to the quantized transform coefficients.

In video/image coding according to embodiments, the quantization rate may be changed, and the compression rate may be adjusted using the changed quantization rate. In terms of implementation, a quantization parameter (QP) may be used, rather than directly using the quantization rate, considering complexity.

For example, a QP having an integer value from 0 to 63 may be used, and each QP value may correspond to an actual quantization rate. The QP for the luma component (luma sample), $QP_Y$, and the QP for the chroma component (chroma sample), $QP_C$ may be set differently.

In the quantization process, the transform coefficient C may be input and divided by the quantization rate $Q_{step}$ to obtain a quantized transform coefficient C' based thereon. In this case, considering the computational complexity, the quantization rate may be multiplied by a scale to form an integer, and shift operation may be performed as much as the value corresponding to the scale value. A quantization scale may be derived based on the product of the quantization rate and the scale value. That is, the quantization scale may be derived according to the QP. A quantized transform coefficient C' may be derived based on the quantization scale applied to the transform coefficient C.

In the dequantization process, which is the reverse process of the quantization process, the quantized transform coefficient C may multiplied by the quantization rate $Q_{step}$ to obtain the restored transform coefficient C' based thereon. In this case, a level scale may be derived according to the quantization parameter, and the restored transform coefficient C'' may be derived by applying the level scale to the quantized transform coefficient C'. The restored transform coefficient C'' may be different from the initial transform coefficient C due to loss in the transform and/or quantization process. Therefore, the encoding apparatus performs dequantization in the same manner as in the decoding apparatus.

Adaptive frequency weighting quantization technology that adjusts quantization intensity according to frequency may be applied. Adaptive frequency weighting quantization is a method of applying different quantization intensities for each frequency.

Adaptive frequency weighting quantization may apply different quantization intensities for each frequency using a predefined quantization scaling matrix. That is, the above-described quantization/dequantization process may be performed further based on the quantization scaling matrix.

For example, to generate the size of the current block and/or the residual signal of the current block, different quantization scaling matrices may be used depending on whether the prediction mode applied to the current block is inter-prediction or intra-prediction. The quantization scaling matrix may be called a quantization matrix or scaling matrix. The quantization scaling matrix may be predefined.

In addition, for frequency adaptive scaling, frequency quantization scale information for the quantization scaling matrix may be configured/encoded by the encoding apparatus and signaled to a decoding apparatus. The frequency quantization scale information may be referred to as quantization scaling information.

The frequency quantization scale information may include scaling_list_data. A (modified) quantized scaling matrix may be derived based on the scaling list data.

In addition, the frequency quantization scale information may include present flag information indicating presence or absence of scaling list data. Alternatively, when the scaling list data is signaled at a higher level (e.g., SPS), information indicating whether the scaling list data is modified at a lower level (e.g., PPS, APS, slice header, etc.) may be further included.

In VVC, Maximum QP may be extended from 51 to 63, and the signaling of initial QP may be changed accordingly. The initial value of SliceQpY may be modified at the slice segment layer when a non-zero value of slice_qp_delta is coded.

The value of init_qp_minus26 may be modified to be in the range of (−26+QpBdOffsetY) to +37. When the size of a transform block is not a power of 4, the transform coefficients may be processed along with a modification to the QP or QP levelScale table rather than by multiplication by 181/256 (or 181/128), to compensate for an implicit scaling by the transform process.

For a transform skip block, minimum allowed QP may be defined as 4 because the quantization step size becomes 1 when QP is equal to 4.

In HEVC or H.264, a fixed look-up table may be used to convert the luma quantization parameter $QP_Y$ to the chroma quantization parameter $QP_Y$.

In VVC, a more flexible luma-to-chroma QP mapping may be used. Instead of having a fixed table, the luma-to-chroma QP mapping relationship may be signaled in the SPS using a flexible piecewise linear model. There may be a constraint on the linear model that the slope of each piece cannot be negative (i.e., as luma QP increases, chroma QP must stay flat or increase, but cannot decrease)

The piecewise linear model may be defined by: 1) the number of pieces in the model; 2) input (luma) and output (chroma) delta QPs for the piece. The input range of the piecewise linear model may be [$-QpBdOffsetY$, 63] and the output range of the piecewise linear model may be [$-QpBdOffset_C$, 63].

The QP mapping relationship may be signaled separately for Cb, Cr and joint Cb/Cr coding, or signaled jointly for all three types of residual coding.

As in HEVC, CU-level QP adaptation is allowed in VVC. Delta QP values for luma and chroma components may be signaled separately. For the chroma components, the allowed chroma QP offset values may be signaled in the form of offset lists in the PPS in a similar manner as in HEVC.

The lists may be defined separately for Cb, Cr and joint Cb/Cr coding. Up to 6 offset values may be allowed for each of Cb, Cr, and joint Cb/Cr lists. At the CU-level, an index may be signaled to indicate which one of the offset values in the offset list is used to adjust the chroma QP for the CU.

Figure 24:
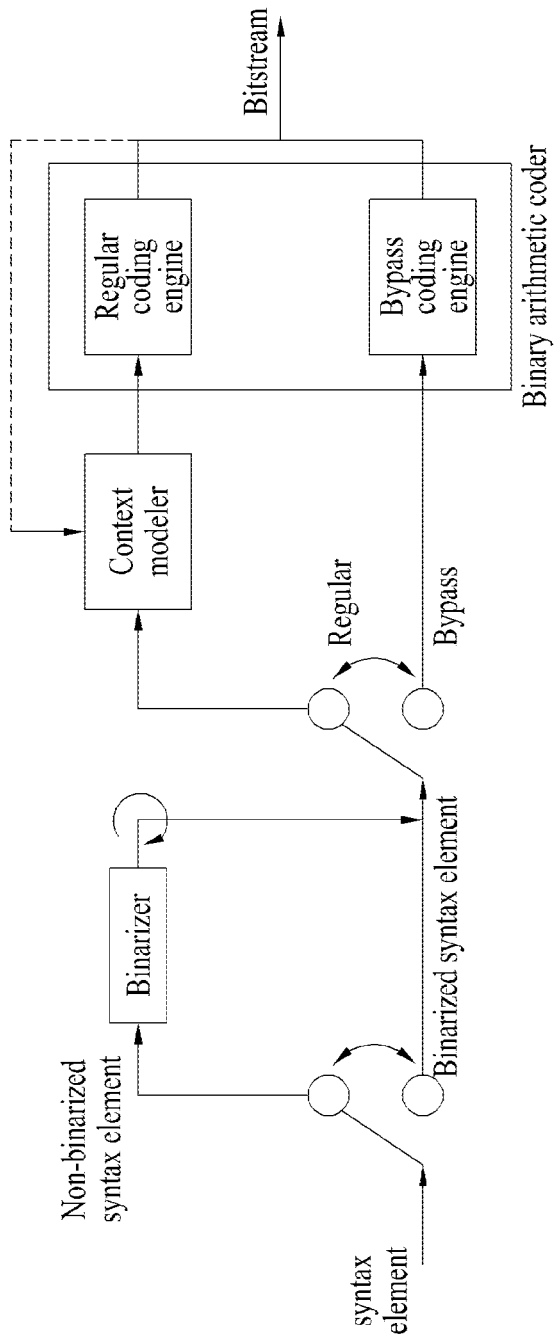
FIG. 24 illustrates an encoding scheme according to embodiments.

FIG. 24 illustrates an encoding scheme according to embodiments.

FIG. 24 illustrates a CABAC encoding structure used by the method/device according to the embodiments of FIGS. 1 to 5.

Entropy Coding

Some or all of the video/image information may be entropy-encoded by the entropy encoder 240 as described with reference to FIG. 2. Some or all of the video/image information may be entropy-decoded by the entropy decoder 310 as described with reference to FIG. 3. In this case, the video/image information may be encoded/decoded on a syntax element basis.

According to embodiments, the encoding/decoding of information may include encoding/decoding by a method described herein.

FIG. 24 is a block diagram of CABAC for encoding a syntax element. In the encoding process of CABAC, an input signal is first converted into a binary value through binarization when the input signal is a syntax element rather than a binary value. When the input signal is a binary value, binarization is bypassed.

Here, each binary number 0 or 1 constituting the binary value is referred to as a bin. For example, when the binary string (bin string) after binarization is 110, each of 1, 1, and 0 is called a bin. The bin(s) for one syntax element may represent the value of the syntax element.

The binarized bins are input to a regular coding engine or a bypass coding engine. The regular coding engine assigns a context model that reflects the probability value for the bin and encodes the bin based on the assigned context model.

The regular coding engine may perform coding on each bin and then update the probability model for the bin. The coded bins are referred to as context-coded bins. The bypass coding engine skips the procedure of estimating a probability for the input bin and a the procedure of updating the probability model applied to the bin after the coding. Instead of assigning a context, a uniform probability distribution (e.g., 50:50) may be applied to code the input bin. Thereby, the coding rate may be improved.

The bins coded in this way are referred to as bypass bins. Context models may be assigned and updated for each bin processed through the context coding (regular coding). Context models may be indicated based on ctxidx or ctxInc. ctxidx may be derived based on ctxInc.

Specifically, for example, a context index (ctxidx) indicating a context model for each bin processed through regular coding may be derived as the sum of context index increment (ctxInc) and context index offset (ctxIdxOffset). Here, ctxInc may be derived differently for each bin. ctxIdxOffset may be represented as the lowest value of ctxIdx. The lowest value of ctxIdx may be referred to as an initial value (initValue) of ctxIdx. ctxIdxOffset is a value generally used to distinguish a context model from context models for other syntax elements. A context model for a syntax element may be distinguished/derived based on ctxinc.

In the entropy encoding procedure, it may be determined whether encoding is to be performed through the regular coding engine or through the bypass coding engine, coding paths may be switched. Entropy decoding performs the same process as entropy encoding in reverse order.

FIG. 25 illustrates a flowchart of entropy coding and a configuration of an entropy encoder according to embodiments.

FIG. 25 illustrates an operation of entropy coding and a structure of an entropy encoder described with reference to FIG. 24.

The encoding apparatus (entropy encoder) for the method/device according to the embodiments of FIGS. 1 to 5 performs an entropy coding procedure for image/video information. The video/image information may include partitioning-related information, prediction-related information (e.g., inter/intra prediction classification information, intra prediction mode information, inter prediction mode information, etc.), residual information, and in-loop filtering information, or various syntax elements therefor. Entropy coding may be performed on a per syntax element basis. Operations S600 to S610 may be performed by the entropy encoder 240 of the encoding apparatus of FIGS. 2-1.

The encoding apparatus performs binarization on a target syntax element (S600). Here, binarization may be based on various binarization methods, such as the truncated rice binarization process and the fixed-length binarization process. A binarization method for the target syntax element may be predefined. The binarization procedure may be performed by the binarizer 242 in the entropy encoder 240.

The encoding apparatus performs entropy encoding on the target syntax element (S610). Based on entropy coding techniques such as context-adaptive arithmetic coding (CABAC) or context-adaptive variable length coding (CAVLC), the encoding apparatus may perform either regular coding-based (context-based) or bypass coding-based encoding on a bin string of the target syntax element, and the output may be included in a bitstream. The entropy encoding procedure may be performed by the entropy encoding processor 243 in the entropy encoder 240. As described above, the bitstream may be transmitted to the decoding apparatus through a (digital) storage medium or a network.

FIG. 26 illustrates a flowchart of entropy decoding and a structure of an entropy decoder according to embodiments.

FIG. 26 illustrates an operation and configuration of entropy decoding described with reference to FIGS. 24 and 25 performed by the method/device according to the embodiments of FIGS. 1 to 5.

The decoding apparatus (entropy decoder) may decode encoded image/video information. The video/image information may include partitioning-related information, prediction-related information (e.g., inter/intra prediction classification information, intra prediction mode information, inter prediction mode information, etc.), residual information, and in-loop filtering information, or various syntax elements therefor. Entropy coding may be performed on a per syntax element basis. Operations S700 to S710 may be performed by the entropy decoder 310 of the decoding apparatus of FIG. 3.

The decoding apparatus performs binarization on a target syntax element (S700). Here, binarization may be based on various binarization methods, such as the truncated rice binarization process and the fixed-length binarization process. A binarization method for the target syntax element may be predefined. The decoding apparatus may derive available bin strings (bin string candidates) for the available values of the target syntax element through a binarization procedure. The binarization procedure may be performed by the binarizer 312 in the entropy decoder 310.

The decoding apparatus performs entropy decoding on the target syntax element (S710). The decoding apparatus sequentially decodes and parses the bins for the target syntax element from the input bit(s) in the bitstream, and compares the derived bin string with the available bin strings for the syntax element. If the derived bin string is identical to one of the available bin strings, a value corresponding to the bin string is derived as a value of the syntax element. Otherwise, the next bit in the bitstream is further parsed and then the above-described procedure is performed again. Through this process, the information may be signaled using variable length bits without using the start or end bit for specific information (specific syntax element) in the bitstream. Accordingly, fewer bits may be allocated to a lower value, and overall coding efficiency may be increased.

The decoding apparatus may perform either context-based or bypass-based decoding on each bin in the bin string from the bitstream based on an entropy coding technique such as CABAC or CAVLC. The entropy decoding procedure may be performed by the entropy decoding processor 313 in the entropy decoder 310. As described above, the bitstream may include various kinds of information for image/video decoding. As described above, the bitstream may be transmitted to the decoding apparatus through a (digital) storage medium or a network.

In the present disclosure, a table (syntax table) containing syntax elements may be used to indicate signaling of information from the encoding apparatus to the decoding apparatus. The sequential order of syntax elements in the table including syntax elements used in the present disclosure may represent a parsing order of syntax elements from a bitstream. The encoding apparatus may configure and encode the syntax table such that the syntax elements may be parsed by the decoding apparatus in the parsing order, and the decoding apparatus may parse and decode the syntax elements in the syntax table from the bitstream in the parsing order to acquire values of the syntax elements.

Image/Video Coding Procedure

In image/video coding, the method/device according to the embodiments of FIGS. 1 to 5 may encode/decode pictures constituting an image/video according to a decoding order.

The picture order corresponding to the output order of the decoded pictures may be set differently from the decoding order. Based on the picture order, not only forward prediction but also reverse prediction may be performed in inter prediction. Details will be described with reference to FIG. 27.

Figure 27:
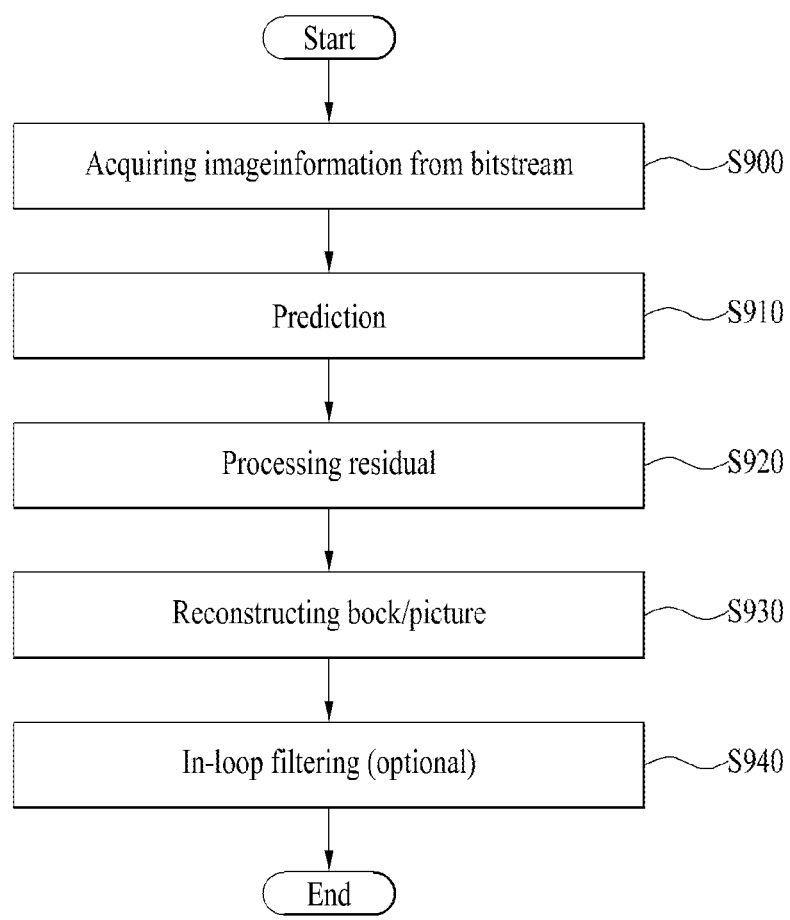
FIG. 27 illustrates a flowchart of picture decoding according to embodiments.

FIG. 27 illustrates a flowchart of picture decoding according to embodiments.

FIG. 27 schematically illustrates an example of an applicable picture decoding procedure according to embodiments. In FIG. 27, operation S900 may be performed by the entropy decoder 310 of the decoding apparatus described with reference to FIG. 3, and operation S910 may be performed by the predictor 330. Operation S920 may be performed by the residual processor 320, operation S930 may be performed by the adder 340, and operation S940 may be performed by the filter 350. Operation S900 may include the information decoding procedure described in the present disclosure, and operation S910 may include the inter/intra prediction procedure described in the present disclosure. Operation S920 may include the residual processing procedure described in the present disclosure, operation S930 may include the block/picture reconstruction procedure described in the present disclosure, and operation S940 may include the in-loop filtering procedure described in the present disclosure.

The picture decoding procedure may include the procedure S900 of acquiring image/video information from a bitstream, the picture reconstruction procedure S910 to S930, and the in-loop filtering procedure S940 for the reconstructed picture, as described in FIG. 3. The picture reconstruction procedure may be performed based on prediction samples and residual samples acquired through the inter/intra prediction (S910) and residual processing (S920: dequantization and inverse transform of quantized transform coefficients) described in the present disclosure.

A modified reconstructed picture may be generated through the in-loop filtering procedure for a reconstructed picture generated through the picture reconstruction procedure. The modified reconstructed picture may be output as a decoded picture. It may be stored in a decoded picture buffer or the memory 360 of the decoding apparatus, and then may be used as a reference picture in the inter-prediction procedure in picture decoding. In some cases, the in-loop filtering procedure may be skipped. In this case, the reconstructed picture may be output as a decoded picture.

In addition, the picture may be stored in the decoding picture buffer or the memory 360 of the decoding apparatus and then used as a reference picture in the inter-prediction procedure when the picture is decoded. As described above, the in-loop filtering procedure S940 may include a deblocking filtering procedure, a sample adaptive offset (SAO) procedure, an adaptive loop filter (ALF) procedure, and/or a bi-lateral filter procedure. Some or all of the procedures may be skipped.

In addition, one or some of the deblocking filtering procedure, SAO procedure, ALF) procedure, and bi-lateral filter procedure may be applied sequentially, or all of the procedures may be applied sequentially. For example, the SAO procedure may be performed after the deblocking filtering procedure is applied to the reconstructed picture. Alternatively, for example, the ALF procedure may be performed after the deblocking filtering procedure is applied to the reconstructed picture.

The procedures may also be performed by the encoding apparatus in a similar manner. Details will be described with reference to FIG. 28.

Figure 28:
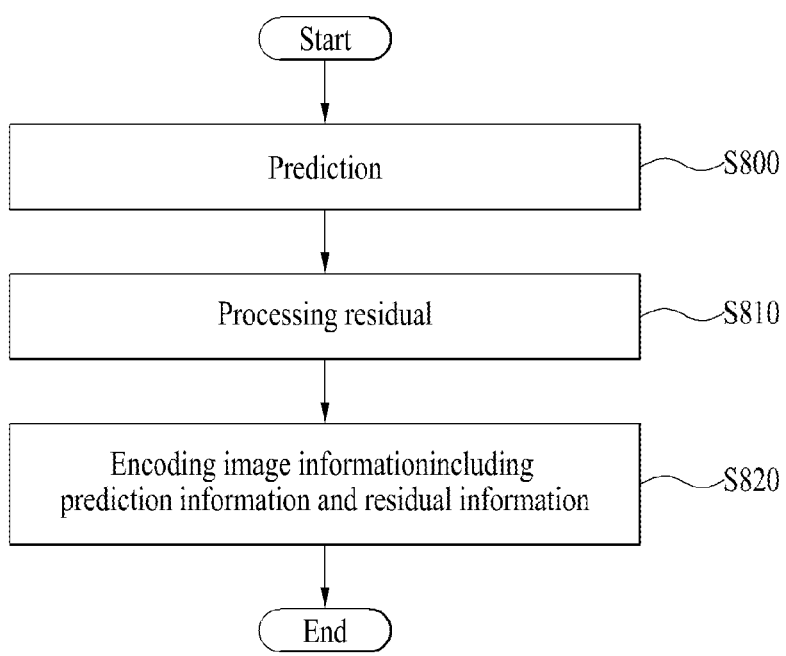
FIG. 28 illustrates a flowchart of picture encoding according to embodiments.

FIG. 28 illustrates a flowchart of picture encoding according to embodiments.

FIG. 28 schematically illustrates an example of a picture encoding procedure performed by the method/device according to the embodiments of FIGS. 1 to 5. In FIG. 28, operation S800 may be performed by the predictor 220 of the encoding apparatus described with reference to FIG. 2, operation S810 may be performed by the residual processor 230, and operation S820 may be performed by the entropy encoder 240. Operation S800 may include the inter/intra prediction procedure described in the present disclosure, operation S810 may include the residual processing procedure described in the present disclosure, and operation S820 may include the information encoding procedure described in the present disclosure.

Referring to FIG. 28, as described with reference to FIG. 2, the picture encoding procedure may include a procedure for encoding and outputting picture reconstruction information (e.g., prediction information, residual information, partitioning information, etc.), and also include a procedure (optional) for generating a reconstructed picture and applying in-loop filtering to the reconstructed picture.

The encoding apparatus may derive (modified) residual samples from quantized transform coefficients through the dequantizer 234 and the inverse transformer 235, and may generate a reconstructed picture based on the predicted samples output in S800 and the (modified) residual samples. The reconstructed picture generated in this way may be the same as the reconstructed picture generated by the decoding apparatus described above. A modified reconstructed picture may be generated through the in-loop filtering procedure for the reconstructed picture, and may be stored in a decoded picture buffer or the memory 270. Thereafter, it may be used as a reference picture in the inter-prediction procedure in encoding the picture, as in the case of the decoding apparatus. As described above, the in-loop filtering procedure may be partially or fully skipped in some cases.

When the in-loop filtering procedure is performed, (in-loop) filtering-related information (parameters) may be encoded and output by the entropy encoder 240 in the form of a bitstream, and the decoding apparatus may perform the in-loop filtering procedure in the same manner as in the encoding apparatus based on the filtering-related information.

Through the in-loop filtering procedure, noise generated during image/video coding, such as blocking artifacts and ringing artifacts, may be reduced, and subjective/objective visual quality may be improved. In addition, as both the encoding apparatus and the decoding apparatus perform the in-loop filtering procedure, the encoding apparatus and the decoding apparatus may produce the same prediction result. Thereby, the reliability of picture coding may be increased, and the amount of data to be transmitted for picture coding may be reduced.

As described above, the picture reconstruction procedure may be performed not only by the decoding apparatus but also by the encoding apparatus. A reconstructed block may be generated for each block based on intra prediction/inter prediction, and a reconstructed picture including reconstructed blocks may be generated. When the current picture/slice/tile group is an I-picture/slice/tile group, blocks included in the current picture/slice/tile group may be reconstructed based only on the intra prediction. When the current picture/slice/tile group is a P- or B-picture/slice/tile group, blocks included in the current picture/slice/tile group may be reconstructed based on the intra prediction or the inter prediction.

In this case, inter prediction may be applied to some blocks in the current picture/slice/tile group, and intra prediction may be applied to some other blocks. The color component of the picture may include a luma component and a chroma component. Methods and embodiments proposed in the present disclosure may be applied to the luma component and the chroma component unless explicitly limited herein.

Figure 29:
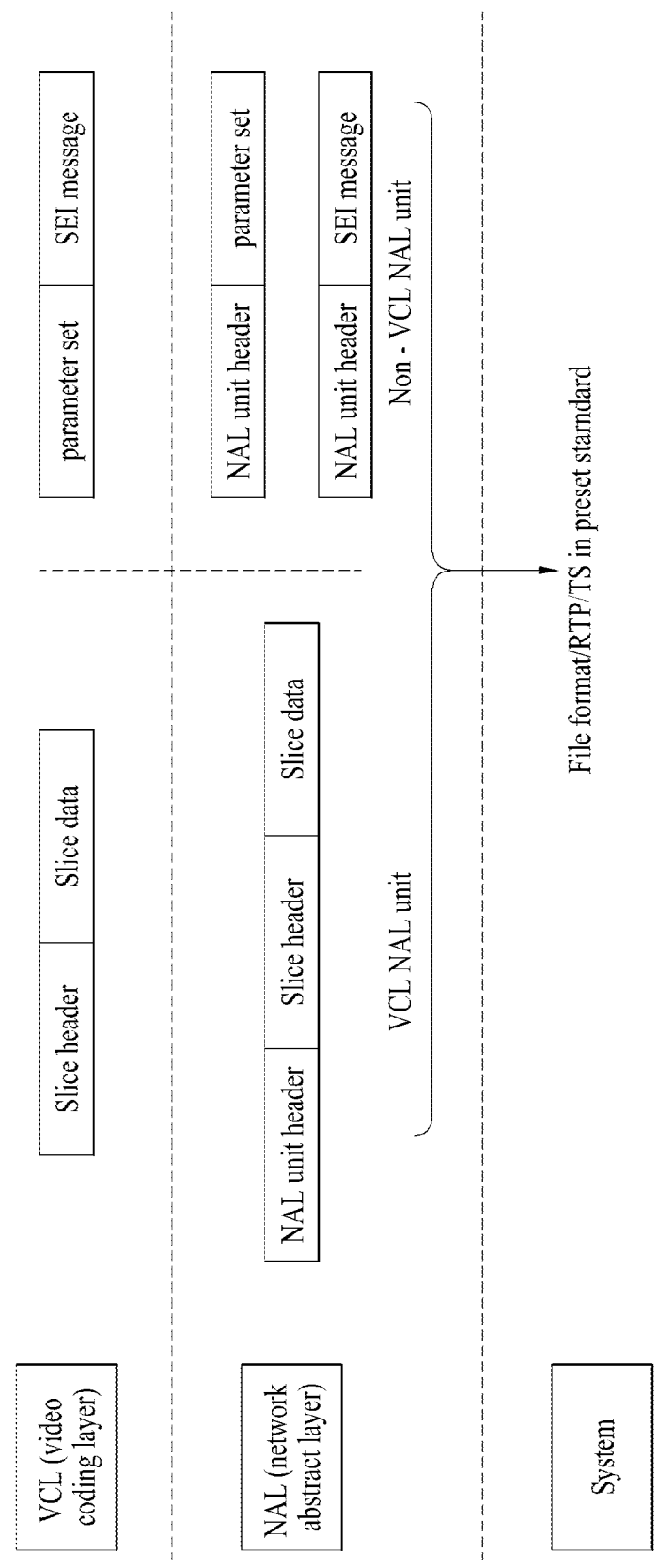
FIG. 29 illustrates a layer structure of an image/video according to embodiments.

FIG. 29 illustrates a layer structure of an image/video according to embodiments.

Coding Layers and Structure

The method/device according to embodiments of FIGS. 1 to 5 may code video/image data based on a layer structure as shown in FIG. 29.

FIG. 29 is a diagram illustrating a layer structure of a coded image/video.

The layer structure of the coded image/video is divided into a video coding layer (VCL) that deal with decoding of the video/image and the video/image itself, a lower system that transmits and stores encoded information, and a network abstraction layer (NAL) that is present between the VCL and the lower system and is responsible for a network adaptation function.

In the VCL, VCL data including compressed image data (slice data) may be generated, or a parameter set including information such as a picture parameter set (PPS), a sequence parameter set (SPS), a video parameter set (VPS) or a supplement enhancement information (SEI) message additionally needed in the decoding process of an image may be generated. In such information/message, additional information about an image, such as task information that may be performed through an encoded image and a method of generating an image to be encoded, may be described.

In the NAL, a NAL unit may be generated by adding header information (NAL unit header) to the raw byte sequence payload (RBSP) generated in the VCL. Here, the RBSP refers to the slice data, parameter set, SEI message, and the like generated in the VCL. The NAL unit header may include NAL unit type information specified according to RBSP data included in the NAL unit.

The NAL unit may be divided into a VCL NAL unit and a non-VCL NAL unit according to the RBSP generated in the VCL. The VCL NAL unit may represent a NAL unit containing information (slice data) about an image, and the non-VCL NAL unit may represent a NAL unit containing information (parameter set or SEI message) necessary to decode the image. Information indicating image information for a specific task may be included in the VCL NAL unit, or may be included in the non-VCL NAL unit.

The VCL NAL unit and the non-VCL NAL unit may be transmitted over the network by attaching header information according to the data specifications of the lower system. For example, the NAL units may be transformed into a data format of a predetermined specification, such as H.266/VVC file format, Real-time Transport Protocol (RTP), or Transport Stream (TS), and transmitted over various networks.

A NAL unit type may be specified according to the RBSP data structure included in the NAL unit, and information about the NAL unit type may be stored in the NAL unit header and signaled.

For example, the unit types may be largely classified into a VCL NAL unit type and a non-VCL NAL unit type according to whether the NAL unit contains information about the image (slice data). The VCL NAL unit type may be classified according to the nature and type of a picture included in the VCL NAL unit, and the non-VCL NAL unit type may be classified according to the type of a parameter set.

The following is an example of an NAL unit type specified according to the type of the parameter set included in the non-VCL NAL unit type.

APS (Adaptation Parameter Set) NAL unit: Type of a NAL unit including APS

DPS (Decoding Parameter Set) NAL unit: Type of a NAL unit including DPS

Video Parameter Set (VP S) NAL unit: Type of a NAL unit including VPS

Sequence Parameter Set (SPS) NAL unit: Type of a NAL unit including SPS

PPS (Picture Parameter Set) NAL unit: Type of a NAL unit including PPS

PH (Picture header) NAL unit: Type of a NAL unit including PH

The NAL unit types have syntax information for the NAL unit types, and the syntax information may be stored in the NAL unit header and signaled. For example, the syntax information may be nal_unit_type, and the NAL unit types may be specified as values of nal_unit_type.

A picture may include a plurality of slices. Each slice may include a slice header and slice data. In this case, one picture header may be further added to a plurality of slices (slice header and slice data set) in a picture. The picture header (picture header syntax) may include information/parameters that may be commonly applied to the picture. The slice header (slice header syntax) may include information/parameters that may be commonly applied to the slices.

The APS (APS syntax) or the PPS (PPS syntax) may include information/parameters that may be commonly applied to one or more slices or pictures.

The SPS (SPS syntax) may include information/parameters that may be commonly applied to one or more sequences. The VPS syntax may include information/parameters that may be commonly applied to multiple layers.

The DPS syntax may include information/parameters that may be commonly applied throughout the video. The DPS may include information/parameters related to concatenation of a coded video sequence (CVS).

In the present disclosure, a high level syntax (HLS) may include at least one of an APS syntax, a PPS syntax, an SPS syntax, a VPS syntax, a DPS syntax, a picture header syntax, or a slice header syntax.

In the present disclosure, video/image information encoded by the encoding apparatus and signaled to decoding apparatus in the form of a bitstream may include information related to in-picture partitioning, intra/inter prediction information, residual information, in-loop filtering information, information contained in the slice header, information contained in the picture header, information contained in the APS, information contained in the PPS, information contained in the SPS, information in the VPS, and/or information contained in the DPS. The image/video information may further include information in the NAL unit header.

The methods/devices according to the embodiments of FIGS. 1 to 5 may encode a video/picture/image based on operations according to embodiments to generate data and a bitstream having a layer structure as shown in FIG. 29, and may receive and decode the data.

Figure 30:
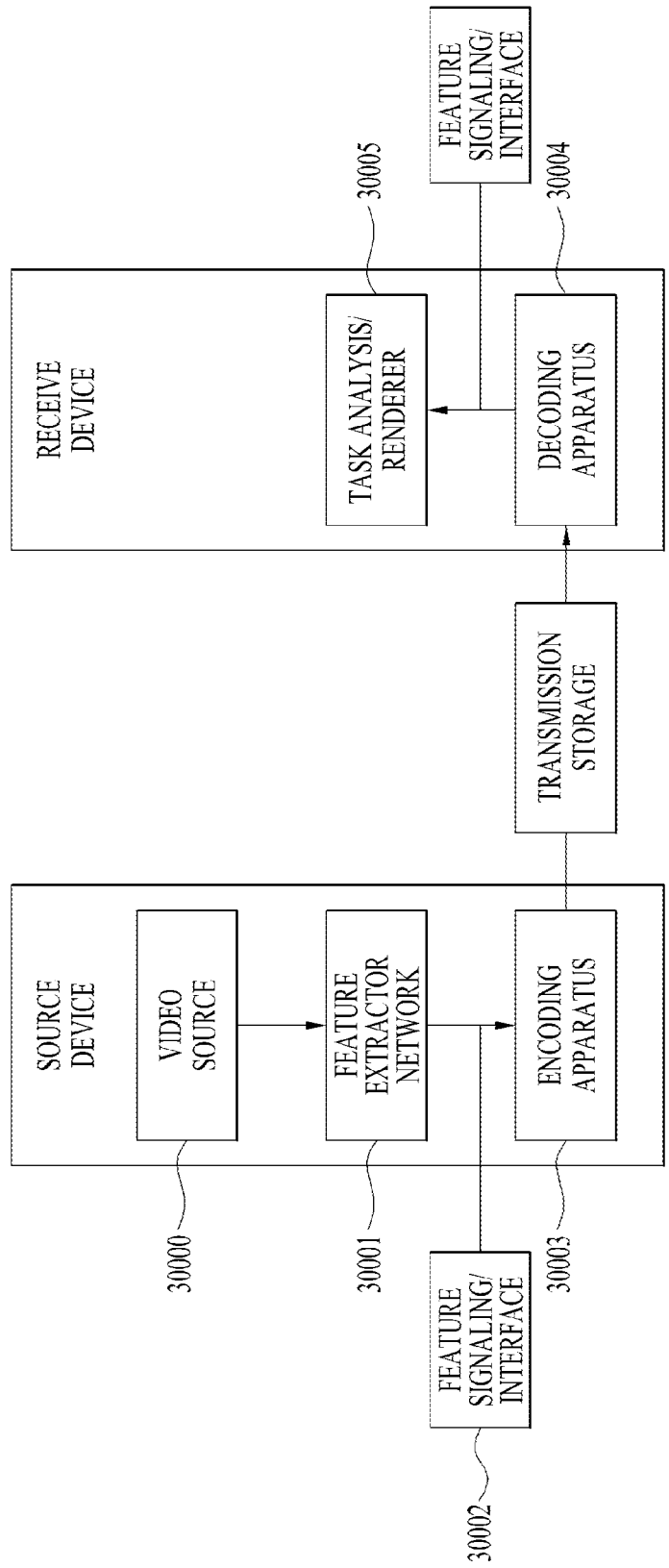
FIG. 30 illustrates a structure diagram of a video/image coding system for a machine according to embodiments.

FIG. 30 illustrates a structure diagram of a video/image coding system for a machine according to embodiments.

FIG. 30 illustrates a video (or image) transmission device/reception device corresponding to the video transmission device/reception device according to the embodiments of FIG. 1.

Each element in FIG. 30 may correspond to hardware, software, a processor, and/or a combination thereof.

Video/Image Coding for Machines (Encoding/Decoding)

Referring to FIG. 30, the video/image coding system of FIG. 1 may be expanded/redesigned to use only a part of the video source according to the request of the user or machine, purpose, and surroundings, or to acquire the necessary part/information from the video source.

A video/image coding method/device for the machine of FIG. 30 may be referred to as a method/device according to embodiments.

The above-described operations of the methods/devices according to the embodiments of FIGS. 1 to 5 may be applied to the methods/devices according to the embodiments of FIG. 30.

General

In the present disclosure, the video coding for machines (VCM) means acquiring and encoding/decoding information a part (feature) of the video source and/or information (features) necessary for the video source according to the request of the user and/or machine, purpose, and surroundings. In VCM, an encoding target is referred to as a feature. It may be information extracted from the video source according to the request of the user and/or machine, purpose, and surroundings, and may refer to a set of information over time.

Referring to FIG. 30, the VCM system may include a first device (source device) and a second device (receive device). The source device may transmit encoded feature information to the reception device through a storage medium or network. The subjects using the first device and the second device may be humans and/or machines, respectively.

A video source 30000 may acquire a video/image through a capture, synthesis, or generation process for the video/image. The video source may include a video/image capture device and/or a video/image generation device.

A feature extraction network 30001 may acquire a feature from the video source. The feature extraction network may include a video/image capture device and/or a video/image generation device.

The feature according to the embodiments may be information extracted/processed from the video source according to the request of the user and/or machine, purpose, and surroundings, and may refer to a set of information over time. The feature may be referred to by various names such as a feature point and feature data.

Feature signaling/interface 30002 represents signaling information/interface between feature compression and the encoding apparatus in the source device. Also, in the receive device, the feature signaling/interface represents signaling information/interface between a decoding apparatus and a task analysis/renderer. The feature signaling/interface may include information about features such as the type, acquisition method, and purpose of features acquired over the feature extraction network. It may also include information about the request for information/operation required by the feature extraction network.

An encoding apparatus 30003 may perform a series of procedures such as prediction, transformation, and quantization for compression and coding efficiency of features. The encoded data (encoded feature information) may be output in the form of a bitstream.

A transmission/storage may transfer encoded features output in the form of a bitstream to the receiver of the receive device through a digital storage medium or a network. The digital storage medium may include various storage media such as USB, SD, CD, DVD, Blu-ray, HDD, and SSD. The transmitter may include an element for generating a media file through a predetermined file format and an element for transmission over a broadcast/communication network. The receiver may receive the bitstream/extract data and transmit the same to the decoding apparatus.

The decoding apparatus 30004 may decode a video/image by performing a series of procedures such as dequantization, inverse transform, and prediction corresponding to the operations of the encoding apparatus.

A task analysis/renderer 30005 may render the decoded feature. In addition, it may be used to perform the tasks of a user or machine. Examples of the tasks may include AI and computer vision tasks such as face recognition, behavior recognition, and vehicle lane recognition.

In the present disclosure, various embodiments relating to the acquisition and coding of features are presented. The embodiments may be performed in combination with each other unless otherwise stated. The methods/configurations in the present disclosure may be applied to the method disclosed in the Video Coding for Machines (VCM) standard.

Methods/devices according to embodiments may be used in the following fields.

Among the fields where VCM technology according to embodiments may be used, the surveillance system performs tasks such as recognizing and tracking objects/persons. The VCM may be used for transmitting or storing information acquired from the surveillance camera.

The VCM may be used in the field of intelligent transportation. Each vehicle constituting a smart traffic system may collect location information collected from GPS, sensor information necessary for autonomous driving and safety from cameras, LiDAR, radar, and ultrasonic sensors, and various vehicle control information (about brakes, wipers, headlights, etc.) and transmit the same to other vehicles or facilities. Source image or processed image signals collected from various sensors may be compressed and transmitted to the VCM. In this case, data transmission may use a 5G data network.

The VCM may be used in the smart city field. Information necessary for interconnected node sensors and devices of a smart city to perform each task may be transmitted using the VCM technology. Examples of tasks in the smart city include traffic situation monitoring, density measurement and prediction, traffic flow prediction, and resource allocation.

Figure 31:
FIG. 31 illustrates a structure for extracting, encoding, and decoding features according to embodiments.

FIG. 31 illustrates a structure for extracting, encoding, and decoding features according to embodiments.

FIG. 31 illustrates a structure in which the methods/devices according to the embodiments of FIGS. 1 to 5 and 30 encode and decode a video/image.

Each element in FIG. 31 may correspond to hardware, software, a processor, and/or a combination thereof.

Embodiments present a prediction process and a bitstream generation method required to compress an activation (feature) map generated in a hidden layer of a deep neural network.

The input data provided to the neural network goes through computation processes of several hidden layers, and the computation results from the respective hidden layers are presented as a feature map with various sizes and channels depending on the type of a neural network in use and the locations of the hidden layers within the neural network.

FIG. 31 shows a feature extraction network to extract intermediate layer activation (feature) map data of the neural network from images or videos, an encoding apparatus to compress the extracted features, a decoding apparatus to reconstruct the features, and a task network to receive the features as input and perform a task.

Images and/or videos, which are the input data according to the embodiments, may be in the form of RGB, YUV or the like.

The feature extractor network of FIG. 31 may be considered as a set of successive hidden layers from the input to the neural network.

The output data 201 may be defined as feature data extracted by the feature extractor network from an image or video frame.

The encoding apparatus of FIGS. 1 to 5 and 30 may compress the feature and output the compressed feature in the form of a bitstream (202).

The decoding apparatus of FIGS. 1 to 5 and 30 may reconstruct a feature from bitstream (203) and transmit the reconstructed feature to a network capable of performing a task. The methods presented in the present document may be applied to the encoding apparatus and the decoding apparatus of FIG. 31.

FIG. 32 illustrates a feature map principal component analysis procedure according to embodiments.

FIG. 32 illustrates a process of acquiring, compressing, and reconstructing a feature map in the coding process of the method/device according to the embodiments of FIGS. 1 to 5 and 30.

For example, embodiments describe a method for expressing feature data 201 in a lower dimension and reconstruct the feature expressed in the lower dimension back to the original dimension using a technique of principal component analysis (PCA).

FIG. 32 illustrates a principal component analysis and reconstruction process for the feature map.

FIG. 31-(1) shows a feature map having a size of W (width)×H (height) generated by the feature extractor 30001 and consisting of N channels. In this feature map, n principal components may be acquired by obtaining the mean (p) of pixel values at the same position for each channel, subtracting the same from each value, and performing principal component analysis. For example, the number of principal components may be less than or equal to the number of features. A data processing result according to the number of principal components will be described with reference to FIG. 33.

FIG. 31-(2) shows the mean (p) of the feature map and n principal components c0 to cn−1. As the number of principal components (PCs) acquired in the PCA calculation process increases, the effect of dimension reduction may decrease, but the data after the dimension reduction may accurately reflect the variance of the original data.

FIG. 31-(3) shows that any feature map data fx represented by W×H pixels may be projected onto principal components and expressed as n coefficient px. In other words, it may be seen that each feature map in the dimensions of W×H is converted into data in the n($1 \leq n \leq W*H$) dimensions through the PCA process.

FIG. 31-(4) illustrates a process of reconstructing a feature of original dimensions from reduced dimensions based on the mean feature and the PC.

The original feature may be reconstructed based on the average feature, principal components, coefficients, and the like.

Figure 33:
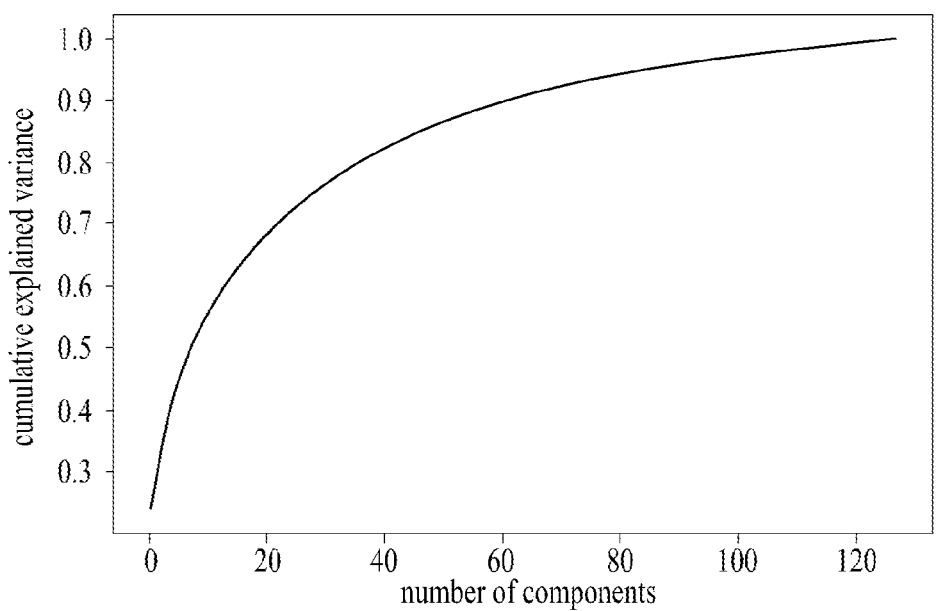
FIG. 33 shows a relationship between principal components and variance according to embodiments.

FIG. 33 shows a relationship between principal components and variance according to embodiments.

FIG. 33 is an example illustrating the range (0 to 1) of the variance of original feature map data that may be expressed according to the number of principal components.

As the number of principal components increases, the cumulative variance may become closer to 1.0, and thus the variance of the original may be accurately expressed.

That is, as the number of principal components processed by the methods/devices according to embodiments increases, data close to the original may be processed. In addition, the original data is reconstructed by multiplying the principal components by ad weight and adding the mean.

A method of using a PCA technique for compression of feature data by the method/device according to the embodiments of FIGS. 1 to 5 and 30 is described. After performing the principal component analysis on the feature data, the encoding apparatus should determine the number of principal components that optimally express the feature data to be coded. Elements to be considered to determine the optimal number of principal components include the size of the principal component analysis-related information (mean and principal component feature data, principal component coefficients for each feature) to be transmitted to the decoding apparatus, and the accuracy of prediction of the original feature data.

Figure 34:
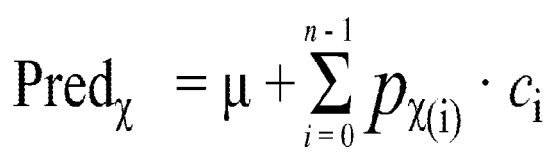

FIG. 34 illustrates an operation of obtaining a predicted value for a feature value according to embodiments.

FIG. 34 illustrates a method of obtaining a prediction feature map $Pred_x$ for feature map data $f_x$ by the method/device according to the embodiments of FIGS. 1 to 5, 30.

$\mu$ denotes the average of the entire feature data, px(i) denotes a coefficient by which fx is projected onto a principal component (PC), and ci denotes the i-th PC.

Figure 35:
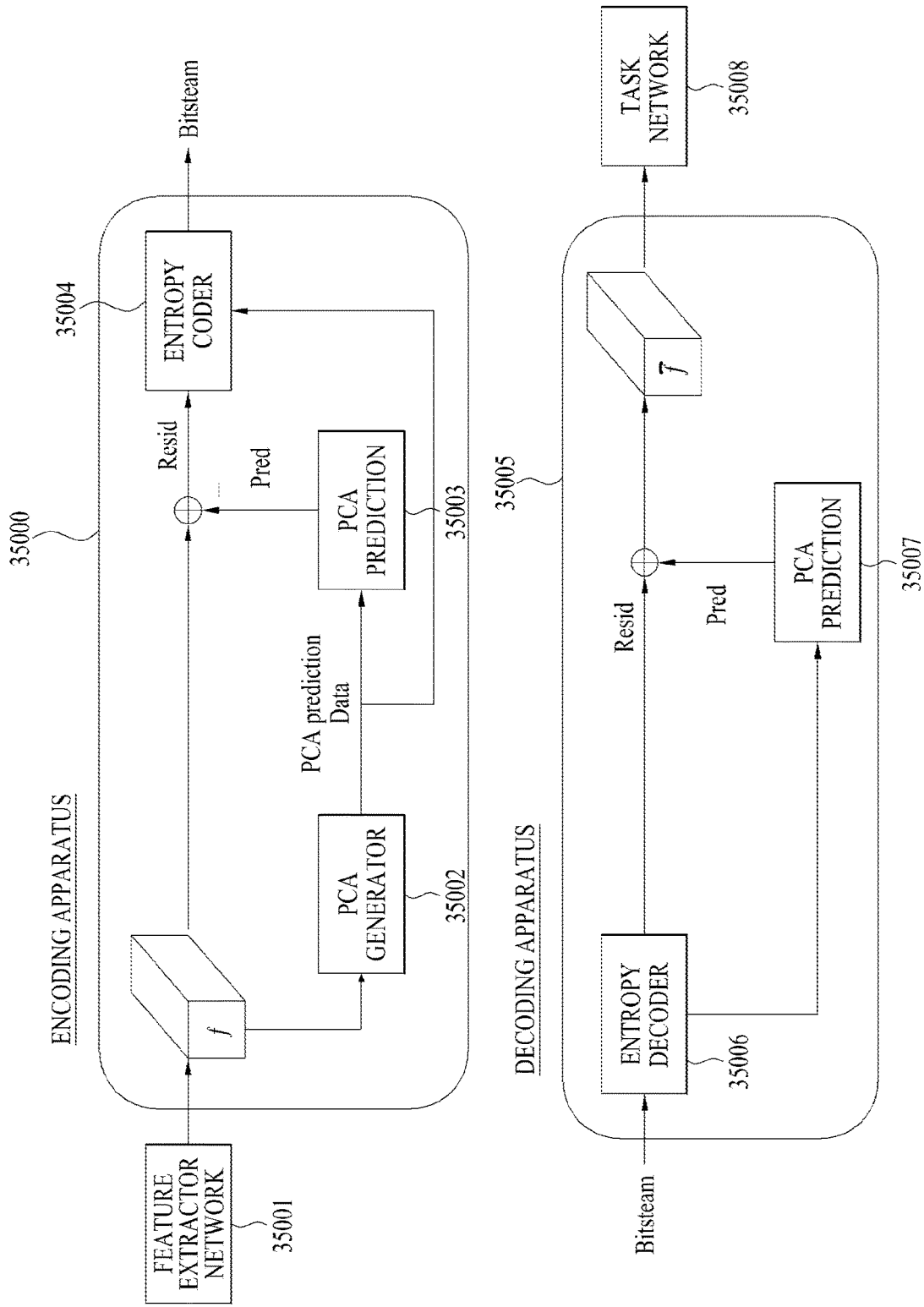
FIG. 35 illustrates a feature coding structure according to embodiments.

FIG. 35 illustrates a feature coding structure according to embodiments.

FIG. 35 is a diagram of a structure in which the method/device according to the embodiments of FIGS. 1 to 5 and 30 codes a feature based on PCA prediction or a similar prediction technique.

Each element in FIG. 35 may correspond to hardware, software, a processor, and/or a combination thereof.

The feature extraction network 35001 is the feature extraction network of FIGS. 30 and 31. It may be used for feature coding in connection with the encoding apparatus according to the embodiments of FIGS. 1 to 5 and 30.

The encoding apparatus 35000 corresponds to the encoder according to the embodiments of FIGS. 1 to 5 and 30.

The encoding apparatus 35000 may include, for example, a PCT generator, a PCT predictor, and an entropy coder.

The encoding apparatus 35000 receives feature data extracted from the feature extraction network.

Figure 36:
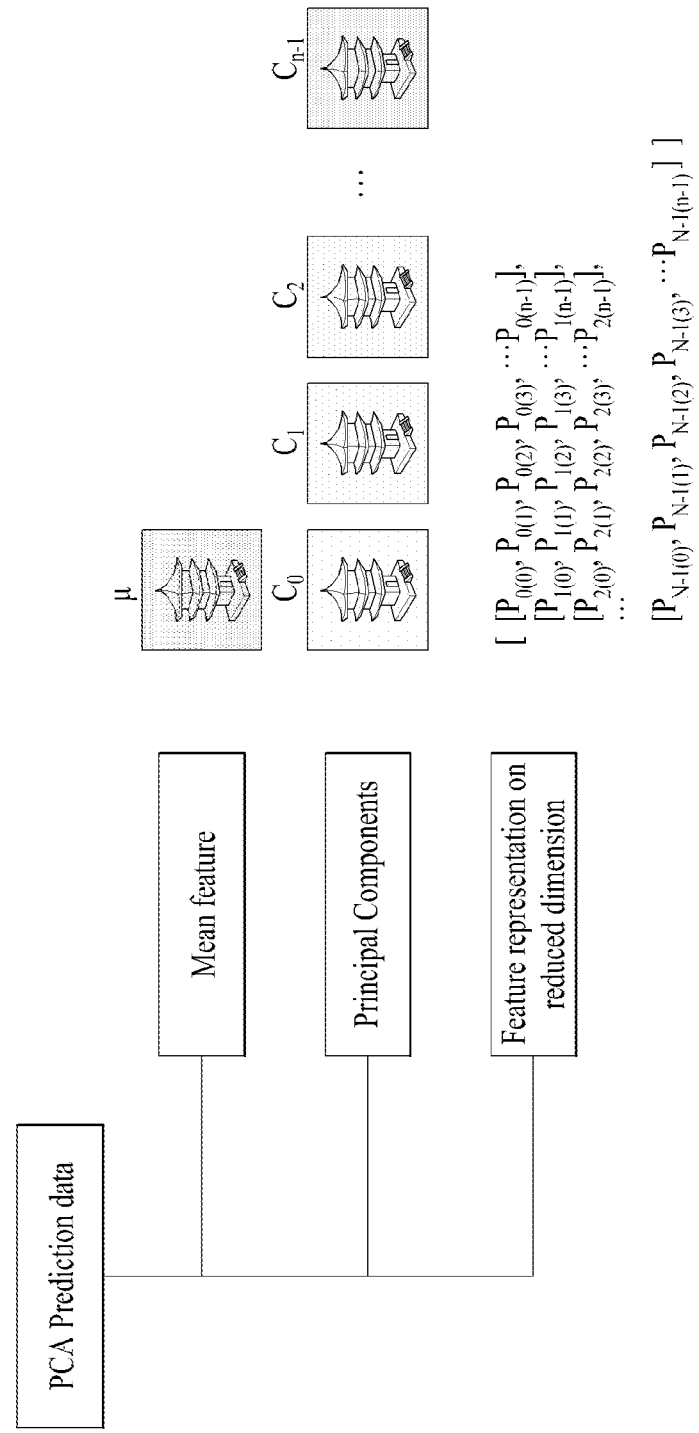
FIG. 36 illustrates a configuration of prediction data according to embodiments.

The encoding apparatus 35000 generates PCT prediction data through the PCA generator 35002. The PCT prediction data according to the embodiments is shown in FIG. 36.

The encoding apparatus 35000 may generate a predicted value (predicted data) through the PCT predictor 35003, as shown in FIG. 34.

Figure 37:
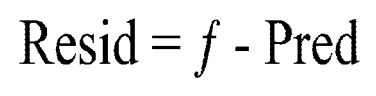

As shown in FIG. 37, the encoding apparatus 35000 may generate residual data (residual or residual value) based on a difference between the original feature and the predicted value.

The encoding apparatus 35000 may encode the residual through the entropy coder 35004 and generate a bitstream.

The decoding apparatus 35005 corresponds to the decoder according to the embodiments of FIGS. 1 to 5 and 30.

The decoding apparatus 35005 may perform a reverse process of the operation of the encoding apparatus 35000.

The decoding apparatus 35005 may include, for example, an entropy decoder 35006 and a PCA predictor 35007.

The decoding apparatus 35005 receives a bitstream via the entropy decoder 35006 and parses/generates PCA prediction data and residual.

The decoding apparatus 35005 generates a predicted value through the PCT predictor 35007.

The decoding apparatus 35005 reconstructs the feature by adding the residual and the predicted value. The reconstructed feature may be provided to a task network 35008 to perform a task according to embodiments.

The task network 35008 is a task executor connected to the receive device of FIGS. 30 and 31.

FIG. 36 illustrates a configuration of prediction data according to embodiments.

The method/device according to the embodiments of FIGS. 1 to 5 and 30 may code a feature based on the PCA prediction data as shown in FIG. 36 in the process shown in FIG. 35.

FIG. 37 illustrates a method of generating a residual by an encoder according to embodiments.

The method/device according to the embodiments of FIGS. 1 to 5 and 30 may generate a residual value according to a difference between a picture and a prediction based on the method illustrated in FIG. 37.

The structure proposed in the present disclosure for the encoding apparatus and the decoding apparatus of FIG. 31 may be specified as shown in FIG. 35. The encoding apparatus serves to compress the feature f generated by the feature extractor network 30001 into a bitstream form using the PCA generator, PCA prediction, and entropy coder modules.

The PCA generator block 35002 included in the encoding apparatus is configured to extract principal components and reduce the dimensions of the feature map. As a result of the operation, the block generates PCA prediction data.

The PCA prediction data may include data related to principal component analysis, such as a mean feature, principal components, and projected coefficients (see FIG. 36). Since this information should be utilized by the decoder, it may be sent to the entropy coder responsible for encoding so as to be included in a bitstream (see FIG. 38).

The mean feature is a value representing the feature data, and may be, for example, an average value.

The principal component refers to a main component in component data included in the feature. Features may be efficiently compressed and reconstructed through the principal components.

The mean feature and the principal components are generated from the feature map, which is a set of features, as described with reference to FIG. 32.

The reduced dimensional feature representation means a projected coefficient.

The projected coefficient is generated by reducing the dimensions of each feature as described with reference to FIG. 32.

The PCA prediction block receives PCA prediction data and generates Pred (prediction data or predicted value), which is the predicted data of the feature, as shown in FIG. 37. The residual signal Resid (residual) acquired by subtracting Pred from the source feature data is delivered to the entropy coder and a bitstream for the same is generated.

The decoding apparatus 35005 uses the entropy decoder 35006 and the PCA prediction module 35007 to generate a reconstructed feature f' from the bitstream.

After the entropy decoder 35006 reconstructs Resid and PCA prediction data, and then transmits the PCA prediction data to the PCA prediction block to generate Pred data. The reconstructed residual signal Resid and Pred generated by the PCA prediction block may be added to each other to generate a reconstructed feature f'. Then, f' is sent to the final Task Network capable of performing various tasks.

FIG. 38 illustrates feature coding-related information according to embodiments.

FIG. 38 shows a syntax of signaling information, data, or information that the transmission method/device according to the embodiments of FIGS. 1 to 5, 30 and 31 encoding a feature of a video/image transmits to the reception method/device according to the embodiments. The information of FIG. 38 may be transmitted in a bitstream as shown in FIG. 35.

feature_coding( ) represents a syntax for coding the feature data of FIG. 32.

feature_coding( ) may include information (FeaturePredMode) indicating a feature coding mode.

When FeaturePredMode is PCA (as shown in FIG. 35), PCA_Prediction_Data_coding( ) information may be included.

The PCA_Prediction_Data_coding( ) information may include a mean feature, principal components, and coefficients used in the PCT mode.

The prediction data coding information according to the embodiments is represented by at least one factor. The factor may include a mean, a principal component, and a coefficient, which are used for feature prediction coding. The prediction data coding information including the factor(s) may be transmitted to the reception side for feature reconstruction.

feature_coding( ) may include information on the number of feature channels for video/image coding.

feature_coding( ) may include skip_channel information indicating whether to include residual data for each channel based on the number of feature channels.

The method/device according to the embodiments may invoke PCA_Prediction_Data_coding( ) after checking whether the prediction mode of a feature has been selected as PCA.

For example, PCA prediction data may be transmitted through a syntax structure of PCA_Prediction_Data_coding( ).

In addition, transmission of residual data generated through the operation of FIGS. 31 to 37 may be signaled based on information for determining whether to additionally transmit residual data for each channel, for example, skip_channel flag.

The residual data should be transmitted only when the value of the skip_channel flag is not TRUE.

When the value of the skip_channel flag is TRUE, the residual data for the channel may not be separately transmitted. This is because picture coding for channel compression may have been skipped on the channel and the residual data may not have been generated. In this case, the Pred (prediction) value reconstructed from the PCA prediction data is used as reconstructed feature f'.

The feature prediction mode of the method/device according to the embodiments may be PCA. In this case, the mean feature, principal components, and projected coefficients (see FIG. 36) for PCA_Prediction_Data_coding used in the encoding process may be transmitted to the reception device for decoding and reconstruction of the video/image.

The method/device according to the embodiments may transmit the residual data to the reception device when the residual data is present for each i-th channel according to the number of channels, and.

The method/device according to the embodiments of FIGS. 1 to 5, 30 and 31 may perform feature_coding based on a linear factor model.

The PCA-based feature prediction technique according to FIG. 32 may be extended to a linear factor model-based feature prediction technique.

The methods/devices according to embodiments of FIGS. 1 to 5 and 30-31 may acquire a factor constituting a feature using the linear factor model, and may reconstruct the feature using the acquired factor and encode/decode the factor. With the methods according to the embodiments, the efficiency of feature compression may be increased.

Examples of a method of extracting a factor constituting a feature map according to embodiments include PCA, sparse coding, and ICA.

The video reception method/device according to embodiments may receive data about feature_coding in FIG. 38, generate a predicted value based on a representative value or prediction data, for example, the mean, principal components, and coefficients, and reconstruct video data by adding the feature (or residual) received for the feature channel to the predicted value.

Figure 39:
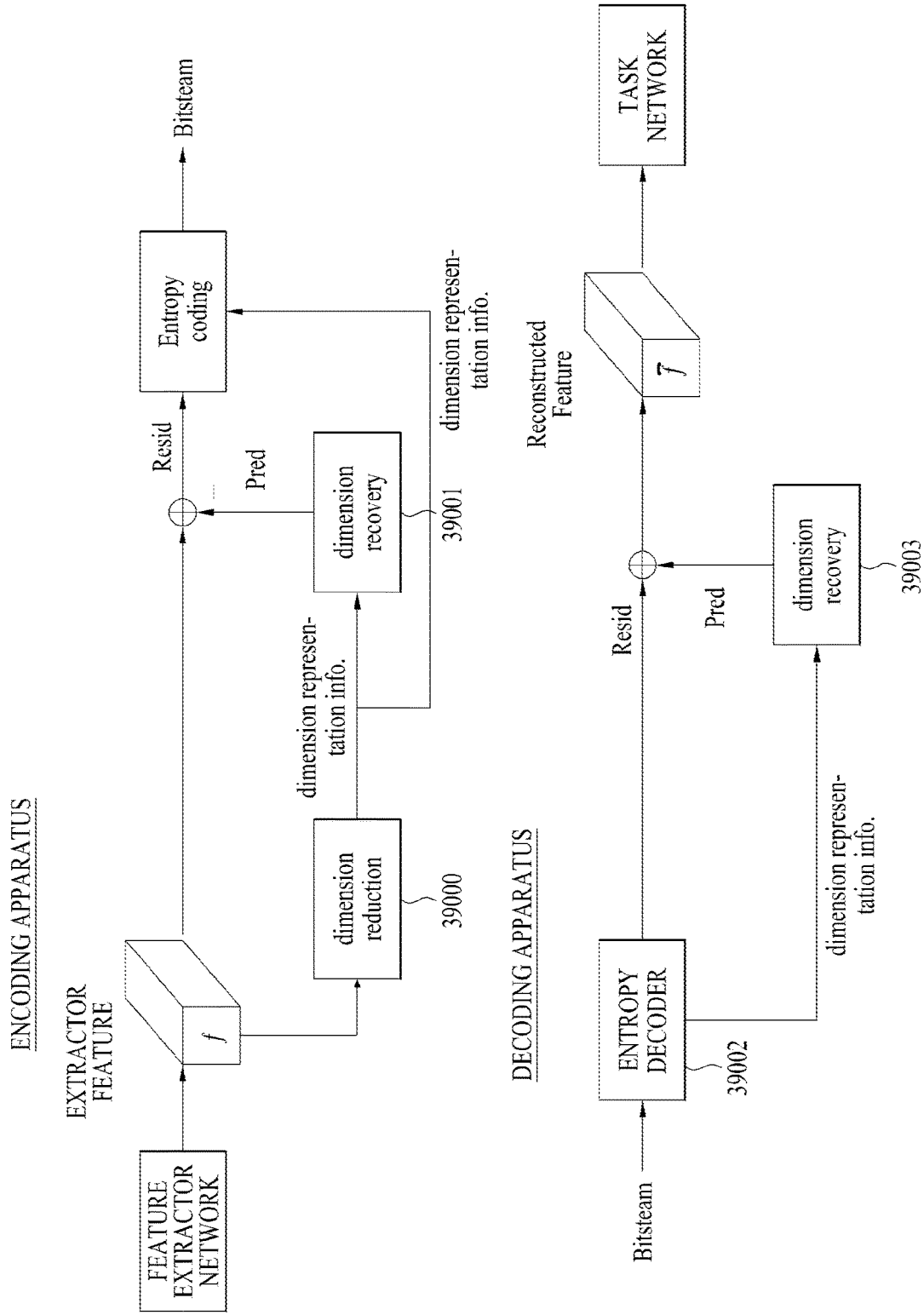
FIG. 39 illustrates a structure diagram of feature coding based on a linear factor model according to embodiments.

FIG. 39 illustrates a structure diagram of feature_coding based on a linear factor model according to embodiments.

FIG. 39 may correspond to the feature_coding structure of FIG. 35. The PCA-based feature_coding of FIG. 35 may be extended to the linear factor model-based feature coding of FIG. 39.

FIG. 35 is the same as or similar to FIG. 39 in terms of functions and/or purposes. The PCA scheme may be included in a linear factor model scheme in a broad sense.

Each element of FIG. 39 may be hardware, software, a processor, and/or a combination thereof.

FIG. 39 illustrates an example of feature compression using a linear factor model.

The dimension reduction 39000 of the encoding apparatus in FIG. 39 represents a linear factor model for factor extraction. The input to the dimension reduction 39000 may be a feature map or a set of feature maps.

The set of feature maps may be a set of feature maps that are successive in time, a set of feature maps that represent the image, or a part of a feature map.

For the decoding operation, information about a factor extraction method and a extraction unit should also be encoded. The input to the dimension reduction 39000 may be data obtained by converting a feature map or a feature map set. For example, it may be a feature map or a feature map set to which transform (e.g., DCT) and quantization are applied.

Dimension presentation info, which is the output of the dimension reduction 39000 may include not only factors but also the extraction method and extraction unit information. For the decoding operation, dimension representation info should also be encoded.

Dimension reduction and dimension reconstruction according to the embodiments represent generating prediction data including a representative value or representative data for efficiently encoding and reconstructing feature data from the extracted feature data, generating a predicted value from the prediction data, and generating and coding a residual between the predicted value and the feature data.

They are not limited to the PCA scheme according to the embodiments, and methods for dimension reduction may be applied.

The extracted factor depends on the linear factor model employed. When sparse coding is used, a set of base vectors is extracted as a factor.

Dimension recovery 39001 is to reconstruct the feature using the extracted factor value, and the method therefor depends on the linear factor model employed.

For example, when sparse coding is used, the feature may be reconstructed using a dictionary, which is a set of extracted base vectors. For the decoding operation, a sparse code, which is a weight used, should also be encoded.

The dictionary used for sparse coding according to embodiments is a set of characteristics of input information.

The input information may be re-expressed as a sum of these characteristics. Learned-based data may be extracted from natural video/image data The learned-based data corresponds to the dictionary. This data corresponds to data is a collection of the characteristics of videos/images.

For example, an image may be expressed by multiplying the characteristic values of the dictionary by a weight. In this case, the dictionary may be transmitted to the decoder to reconstruct the image.

An index for a characteristic used for a video/image to be decoded and the weight value thereof may be delivered to the decoder.

The Pred (predicted value, prediction data) of FIG. 39 represents a reconstructed signal. When the domain of the input value used for factor extraction is different from that of the feature map to be encoded, the process of adjusting the two domains to be identical is necessary.

For example, when a transform is applied, a pred (prediction data) signal may be created by applying an inverse transform to the reconstructed information.

The Resid (residual value or residual) of FIG. 39 refers to a signal obtained by removing redundancy between the encoding target and the Pred. The Resid signal may be input to the entropy coder after being processed through transformation and quantization.

In the decoding apparatus 39002 of FIG. 39, the dimension representation info includes factor information (factor, extraction method, extraction unit) and values for reconstructing features using the factor information (a sparse code, projected coefficients, etc.).

The decoding apparatus receives a bitstream.

The entropy decoder generates residual and dimension representation information by entropy decoding the bitstream.

The dimension recovery 39003 performs a function of reconstructing a feature using the extracted factor value. As in the encoder, Pred represents a reconstructed signal.

When the domain of the input value used for factor extraction is different from that of the feature map to be encoded, the process of adjusting the two domains to be identical is necessary.

For example, when transform is applied, a pred signal may be created by applying inverse transform to the reconstructed information. The feature may be decoded using the Resid signal and the Pred signal. When the Resid signal is transformed in the encoding operation, inverse transform is needed. For example, when transform and quantization are applied, inverse transform and dequantization must be applied.

The decoding apparatus reconstructs the feature value based on the residual and prediction data.

Based on the reconstructed feature value, the decoding apparatus may support various tasks.

The description of FIG. 35 may be equally applied to FIG. 39.

FIG. 40 illustrates information related to a linear factor model according to embodiments.

The figure shows a structure of data generated by the video transmission device according to embodiments described in FIG. 39 and FIG. 35 corresponding to FIG. 39, and received by the video reception device according to embodiments and used in decoding video/image.

The structure of FIG. 40 may correspond to the data structure described with reference to FIG. 38 or may be an extended form of FIG. 38. The description of FIG. 38 may be applied to FIG. 40.

Regarding the feature_coding-related information in FIG. 40, feature_coding( ) which represents syntax for coding feature data may include feature prediction mode information (FeaturePredMode).

feature_coding( ) may include a data structure as shown in FIG. 40, according to various modes (linear factor models such as PCA and Sparse) of FeaturePredMode.

When FeaturePredMode is PCA (as shown in FIG. 35), information Factor_Prediction_Data_coding may be included. The information Factor_Prediction_Data_coding may include mean feature information, principal component information, and projected coefficient information used in PCA. Factor_Prediction_Data_coding may include information on the number of feature channels for PCA coding. Factor_Prediction_Data_coding may include skip_channel [i]) indicating whether residual data for each channel has been applied based on the information on the number of feature channels. Factor_Prediction_Data_coding may include residual data when the residual data is applied to a corresponding channel based on skip_channel[i]. The reception method/device according to the embodiments may reconstruct feature data by acquiring the residual data.

When featurePredMode is sparse coding, feature_coding( ) may include information Factor_Prediction_Data_coding. Factor_Prediction_Data_coding may include dictionary information and sparse_code information used for sparse coding.

Sparse coding is a method of representing an image as a linear combination of multiple base vectors.

For example, when there is an image including a person's eye, the eye image may be composed of a sum of characteristics (base vectors. A weight value multiplied by each characteristic becomes a sparse code and a collection of the characteristics becomes a dictionary.

The dictionary is a set of characteristics (base vectors).

The sparse_code is a weight value of each characteristic (base vector).

Factor_Prediction_Data_coding may include information on the number of feature channels. Based on the number of feature channels, Factor_Prediction_Data_coding may include skip_channel[i] indicating whether residual data of a feature is generateds and transmitted for each feature channel. Based on the skip_channel information, Factor_Prediction_Data_coding may carry residual data coding information (resid_data_coding(resid[i])).

In other words, the method/device according to the embodiments may invoke PCA_Prediction_Data_coding( ) after checking whether the prediction mode of a feature has been selected as PCA.

There is a skip_channel flag for transmitting PCA prediction data and determining whether to additionally transmit residual data for each channel, the residual data may be allowed to be transmitted only when the value of the skip_channel flag is not TRUE.

When the value of skip_channel flag is TRUE, the residual data for the channel may not be separately transmitted, and the Pred value is not reconstructed from the PCA prediction data is used as a reconstructed feature f'. The signaling signal may vary depending on the employed linear factor model. FIG. 40 shows an example of application of PCA and application of sparse coding. Other models may also be applied employ the structure of FIG. 40. Signaling information signaled and transmitted/received according to embodiments is disclosed below, and may be applied even when the employed linear factor model is changed.

1. Type of prediction model used for feature compression (FeaturePredMode)
2. Factor values extracted according to prediction models (mean_feature for PCA, principal_components, dictionary for projected or sparse, sparse_code, other factor values according to other prediction models)
3. Information needed to reconstruct a feature using the factor value (Factor_Prediction_Data_coding described by factor 2)
4. Coding of difference value (resid_data_coding(resid[i]))

As described with reference to FIG. 37, the information needed to reconstruct a feature according to the embodiments may include factor(s), an extraction method, and extraction unit information. In other words, as shown in FIGS. 38, 40, 42, 44, 46, 49, and 51, the decoder should inversely transform and predict the feature coding data. To this end, coding information for the inverse transform type needed and necessary information according to the inverse transform may be generated and transmitted.

For example, in the dimension reduction process (FIGS. 35, 39, 43, 45, 47, 48, and 50), a feature may be subsampled for coding efficiency. In this case, the original size should be restored after dimension reconstruction. To this end, information on the subsampling method may be encoded and delivered as feature coding information (FIGS. 38, 40, 42, 44, 46, 49, and 51).

The method/device according to the embodiments of FIGS. 1 to 5, 30, 31, and 35 may extract and encode a factor using the temporal redundancy of the factor for coding efficiency. By reusing the extracted factor, encoding efficiency may be enhanced. Performing encoding by performing the factor extraction for all features may increase complexity and decrease coding efficiency. An example of a method of reusing a factor is described below, and factor information to be encoded is determined according to the method for reuse.

1. Method for Reusing a Factor
1) Reusing the Extracted Factor as it is
(1) Encoding the Extracted Factor
2) Updating and Using the Extracted Factor
(1) Updating on a Frame-by-Frame Basis
a. Encoding a relationship between the previous factor and a factor to be updated, or a value (e.g., a difference value) obtained by removing redundancy using the same
(2) Updating in Units of Multiple Frames
a. Encoding a relationship between the previous factor and the current factor, or a value (e.g., a difference value) obtained by removing redundancy using the same The above methods will be described below.

The video reception method/device according to embodiments may receive data about feature coding in FIG. 40, generate a predicted value based on a representative value or prediction data, for example, the mean, principal components, coefficients or dictionary, and sparse coding, and reconstruct video data by adding the feature (or residual) received for the feature channel to the predicted value.

Figure 41:
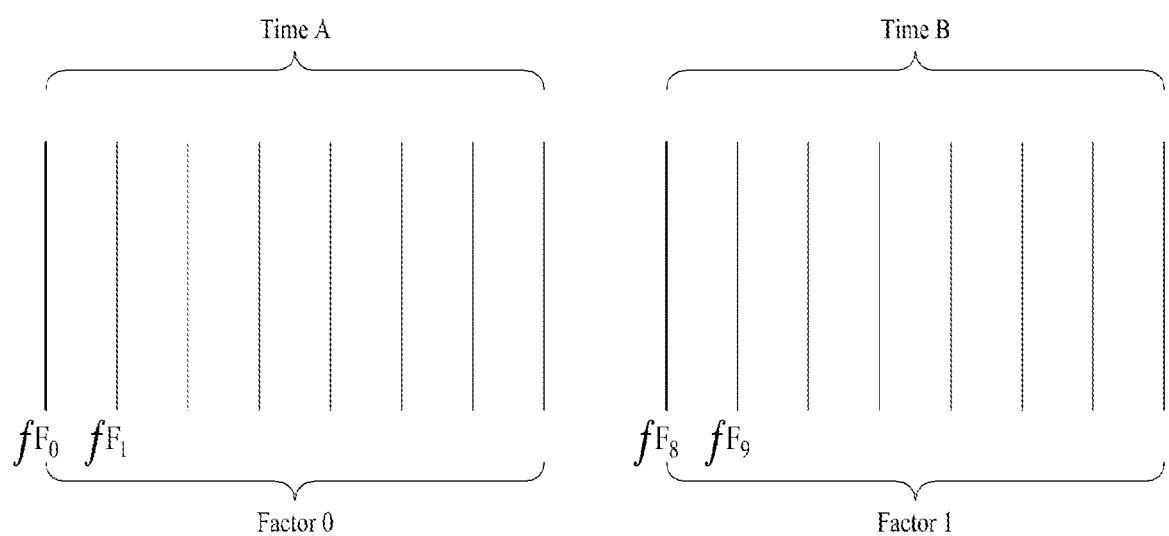
FIG. 41 illustrates a method of extracting factors based on a set of feature data according to embodiments.

FIG. 41 illustrates a method of extracting factors based on a set of feature data according to embodiments.

The method/device according to the embodiments of FIGS. 1 to 5, 30, 31, and 35 may extract a factor using a set of feature data and apply the same.

In FIG. 41, Time A and Time B may each be composed of features extracted from eight frames.

f_(F_0) is feature data of frame 0. Factor 0 is a representative factor used to compress the features extracted from the eight frames. In an embodiments, the representative factor Factor 0 may be extracted using f_(F_0) or using f_(F_0) to f_(F_8).

Factor 1 may be encoded independently or may be encoded using a correlation with Factor 0.

When there is a similarity between f_(F_0) and f_(F_8), the representative factor, factor 0, may be extracted using one of the two data, may be extracted using the difference between the two data, or may be extracted using both.

For processing of data of Time B, the method/device according to the embodiments of FIGS. 1 to 5, 30, 31, and 35 may use the mean and a component extracted from Time A, and use a different coefficient.

When the factor is reused, whether it is reused should be encoded for decoding. The encoding unit for the information is defined according to a unit in which the factor is reused.

FIG. 42 illustrates a configuration of signaling information for factor reuse according to embodiments.

When the unit of factor coding is a sequence, only the factor defined in the sequence level is used in the unit of the lower level without performing factor coding. In the case of factor coding in a specific group unit, a feature corresponding to the group uses the factor defined in the group level. When a factor is coded in a group unit, it may be encoded using the correlation with the factor of the previous group. In this case, information on whether the correlation is used should be encoded.

The method/device according to the embodiments of FIGS. 1 to 5, 30, 31, and 35 may generate and transmit/receive a data structure for feature coding. The data structure may include a header and a payload.

Referring to FIG. 42-(*a*), Feature_coding_header is a header of a sequence, group, or frame unit according to the factor coding unit, and may contain head information about payload. The video/image data may be configured for each sequence, group, or frame unit (or level).

Factor_coding may indicate whether factor coding is performed in a coding unit (e.g., sequence, group, and frame units).

The factor refers to a representative factor used to compress a feature when factor coding is performed.

FIG. 42-(*b*) shows an example applied to PCA. When Factor_coding is TRUE, mean_feature and principal_components information corresponding to the factor are included (e.g., Factor_Prediction_Data_coding (mean_feature, principal_components, projected)). In the other case, they may be excluded for the efficiency of information delivery (e.g., Factor_Prediction_Data_coding (projected)).

In addition, when the factor coding is not performed in the unit, the mean and component received before is utilized, but the projected coefficient may be sent essentially.

This is because the coefficient information indicates how many components are needed for decoding. For example, in the case of sparse coding, Dictionary is commonly used, and only sparse code may be encoded for each feature and delivered.

When a linear factor model according to embodiments other than PCA is used, all or part of representative prediction data according to the model may be delivered.

In other words, the mean and component before the level of the current factor coding information level may be used at the level of the current factor coding information and only Factor_Prediction_Data_coding (projected) included in the current factor coding information may be transmitted and received. Thereby, coding efficiency may be increased.

The prediction mode according to the embodiments may include PCA, and may include various methods such as a linear factor model, sparse coding, and ICA. The structure of signaling information for other methods may also be configured as shown in FIG. 42.

The video reception method/device according to the embodiments may receive data about feature coding in FIG. 42, generate a predicted value based on a representative value or prediction data, for example, the mean, principal components, and coefficients, or based on the mean and principal components received in the previous unit and coefficients in the unit, and reconstruct video data by adding the feature (or residual) received for the feature channel to the predicted value.

Figure 43:
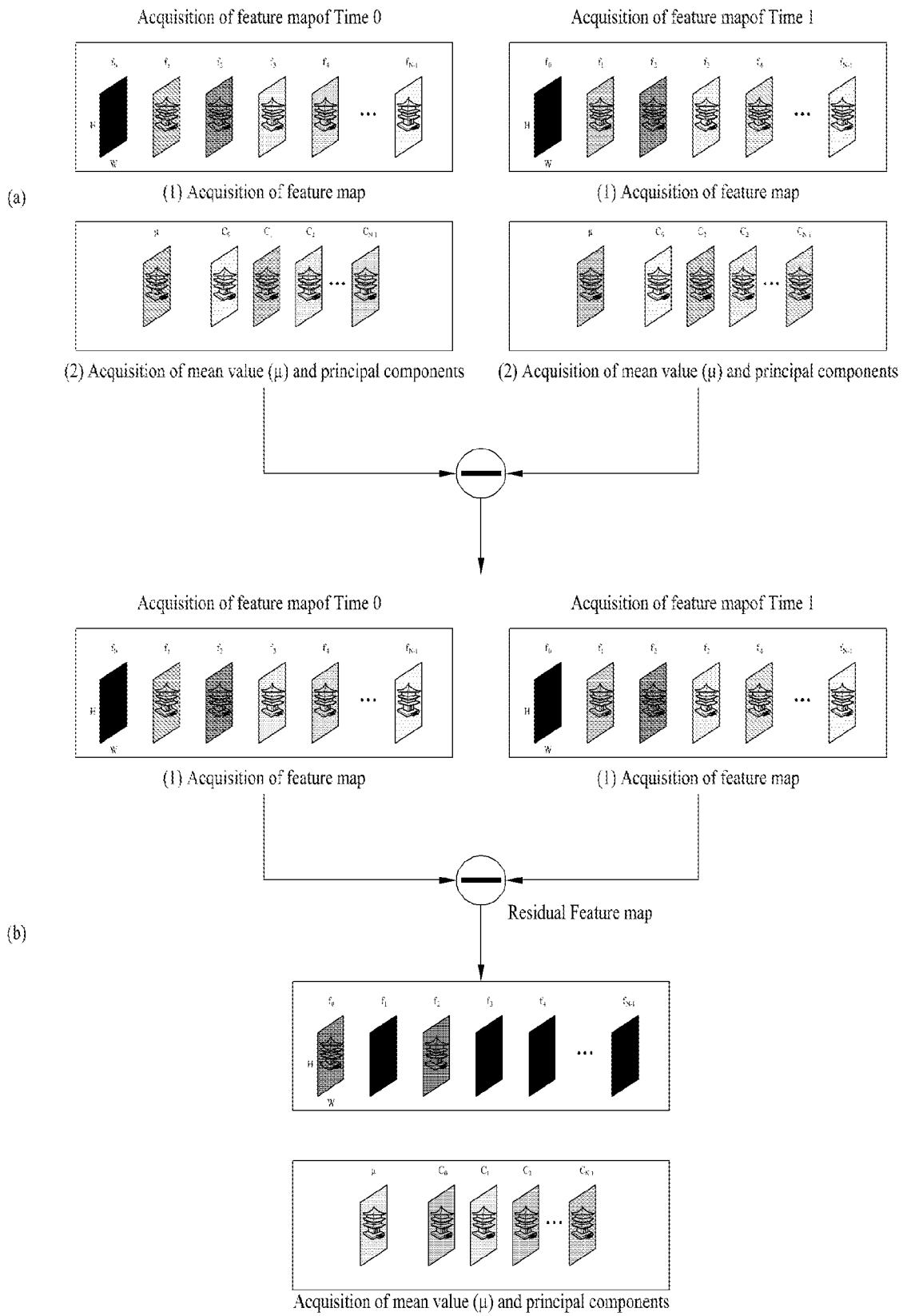
FIG. 43 illustrates an operation of removing temporal redundancy of feature levels according to embodiments.

FIG. 43 illustrates an operation of removing temporal redundancy of feature levels according to embodiments.

The method/device according to the embodiments of FIGS. 1 to 5, 30, 31, and 35 may extract and encode a factor using the temporal redundancy of the factor in order to increase coding performance and efficiency.

FIG. 43, Time 0 and Time 1 indicate a specific time interval. For example, when the time interval of Time 0 and Time 1 is 1 second, Time 0 and Time 1 may have a set of feature data for 1 second, respectively. For example, when the frame rate of the feature data is 30 fps, Time 0 and Time 1 may have features corresponding to 30 frames. On the other hand, when the time interval of Time 0 and Time 1 is ⅟₃₀ seconds, Time 0 and Time 1 may have features corresponding to 1 frame. An example of applying a factor extraction and encoding method using temporal redundancy is disclosed below.
1) Using the Correlation Between Factors
A. Encoding a Difference Between Factors (FIG. 43-(a))
  i. For example, the difference between the factor of Time 0 and the factor of Time 1 (e.g., mean, coefficient, etc.) is encoded and transmitted. The factor of Time 1 may be decoded using the difference value and the factor of Time 0. FIG. 44 illustrates an example applied to PCA. Not only PCA but also various methods such as a linear factor model, sparse coding, and ICA may be used according to embodiments, and the description of FIG. 44 may be applied.
B. Generating One Representative Factor Using Two Factors (FIG. 43(b))
  i. For example, the size of the dictionary of sparse coding may be increased.
  ii. For example, the values of the mean and principal component of PCA may be updated.
2) Using the Correlation Between Features
A. Extracting a Factor from the Difference Between Features
  i. For example, a factor may be extracted from the difference between the feature of Time 0 and the factor of Time 1. The pred signal of the residual of Time 0 and Time 1 may be generated using the extracted factor. FIG. 44 illustrates an example applied to PCA. Not only PCA but also various methods such as a linear factor model, sparse coding, and ICA may be used according to embodiments, and the description of FIG. 44 may be applied.

The above operations performed by the method/device according to the embodiments of FIGS. 1 to 5, 30, 31, and 35 will be described below.

The method/device according to the embodiments of FIGS. 1 to 5, 30, 31, and 35 may acquire and extract a feature map, which is a set of features for video/image input data, in the intervals of Time 0 and Time 1.

The method/device according to the embodiments of FIGS. 1 to 5, 30, 31, and 35 may generate prediction data for the feature data from the acquired feature data. For example, according to embodiments, the mean and principal components of the picture data may be generated for each time interval.

In order to improve coding performance, redundancy may be removed using the correlation between prediction data for Time 0 and prediction data for Time 1. For example, the value of a difference between the two data may be generated. As the correlation between the two data increases, encoding and transmitting the difference value may further increase the coding transmission efficiency.

The method/device according to the embodiments of FIGS. 1 to 5, 30, 31, and 35 may acquire and extract a feature map, which is a set of features for video/image input data, in the intervals of Time 0 and Time 1.

In addition, in order to use the correlation between the two feature maps, a difference value (residual) between the two feature maps may be generated.

Factor data (mean, projected component, etc. as a factor) may be generated from the residual feature map.

FIG. 44 illustrates a configuration of signaling information for factor extraction using temporal redundancy according to embodiments.

The methods/devices according to the embodiments of FIGS. 1 to 5, 30, 31, and 35 may extract a factor using temporal redundancy, and generate and transmit/receive signaling information as shown in FIG. 44.

FIG. 44-(a) shows definitions of signaling information needed to use temporal redundancy. The information may be encoded in different levels (sequence, group, frame) according to the coding unit.

The methods/devices according to the embodiments of FIGS. 1 to 5, 30, 31, and 35 may generate and transmit/receive the following information.

For example, Factor_prediction indicates whether factor extraction and encoding using temporal redundancy is applied.

Factor_prediction_method indicates a method applied to factor extraction and encoding using temporal redundancy. For example, the method includes linear factor models such as PCA and Sparse.

Factor_Reference_List indicates a factor list for using temporal redundancy.

For example, when the feature maps for Time 0, Time 1, Time 2, . . . , and Time N are sequentially encoded, the factor data is coded because there is no factor to be referenced for Time 0. The factor data may be added to and stored in the list. For example, data of Time⓪ is stored in Factor_referenece_list[0].

When encoding Time 1, there is factor data to be referenced. When it is efficient to use the factor data already stored, information that may signal that Factor_referenece_list[0] is used may be encoded and indicated. An example is the reference index.

When it is efficient to independently encode factor data, factor data may be independently encoded without using the information of Time 0 and the corresponding information may be added to the list.

Reference_Index specifies information for signaling a factor used in the factor list.

Factor_Prediction_Data_coding specifies information needed for factor decoding.

FIG. 44-(b) shows an example of PCA application. Not only PCA but also various methods such as a linear factor model, sparse coding, and ICA may be used according to embodiments, and the description of FIG. 44 may be applied. FIG. 44-(b) is an example of removing temporal redundancy at the factor level. As shown in the figure, as a factor of Factor_Prediction_Data_coding, the factor used as a reference and the current factor information may be delivered together. The operation of Factor_Prediction_Data_coding depends on Factor_prediction_method.

When FeaturePredMode is, for example, PCA, factor coding and factor prediction are performed, and a factor prediction method is a factor, Factor_Prediction_Data_coding according to Factor_Reference_List[Reference_Index], mean_feature, principal_components, projected, and the like may be delivered.

Alternatively, in order to increase the coding/compression performance by reducing the amount of additional information to be transmitted/received, the current feature coding information may carry Factor_Prediction_Data_coding according to projected only. In this case, the video reception method/device according to the embodiments may use the information received through the feature coding information of the previous level/unit and the currently received Factor_Prediction_Data_coding (projected) to efficiently perform feature reconstruction.

The video reception method/device according to the embodiments may receive data about the feature coding of FIG. 44, and generate a predicted value based on a representative value or prediction data, for example, a factor reference list, a mean, components, coefficients, or a coefficient in the case where factor coding is not used, and reconstruct video data by summing a feature (or residual) received for a feature channel and the predicted value.

Factor_prediction_method may be Factor or Feature level.

When Factor_prediction_method is Factor, the operation of FIG. 43-(a) is performed. When Factor_prediction_method is Feature level, the operation of FIG. 43-(b) is performed.

Figure 45:
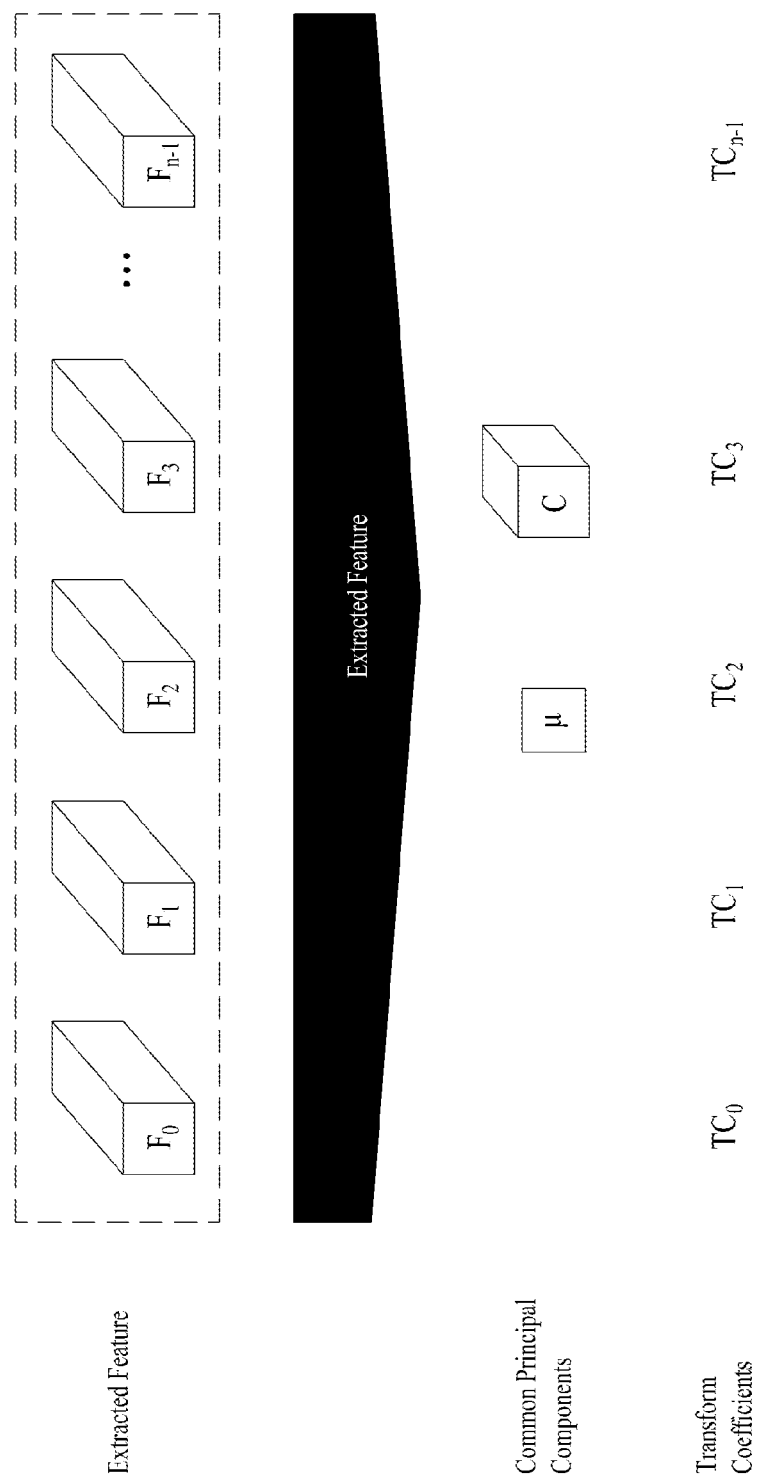
FIG. 45 illustrates a compression method for multiple input images according to embodiments.

FIG. 45 illustrates a compression method for multiple input images according to embodiments.

The methods/devices according to the embodiments of FIGS. 1 to 5, 30, 31, and 35 may efficiently code and transmit/receive a plurality of input data as shown in FIG. 45.

The method of FIG. 45 may enable more efficient compression by extracting common principal components from multiple feature data having the same resolution (width, height) and removing redundancy between feature data. That is, feature data may be transformed through a feature extraction process for multiple input images and a PCA operation.

The processing of multiple videos/images/pictures according to the embodiments means a multi-task process, multi-task neural network analysis, and multi-task machine learning. The extracted features of FIG. 45 represent feature data related to multi-tasks and tasks related to each other.

The method/device according to the embodiments of FIGS. 1 to 5, 30, 31, and 35 may perform video compression and decompression not only for a single task but also for multi-tasks.

Assuming that there are n feature data to be compressed, a common principal component may be extracted from the n feature data, and a transformed coefficients (TC) based on the same principal component may be generated for each feature map.

FIG. 46 illustrates signaling information for feature coding of multi-feature data according to embodiments.

The methods/devices according to the embodiments of FIGS. 1 to 5, 30, 31, and 35 may generate and transmit/receive the data structure shown in FIG. 46 for the operation of FIG. 45.

In FIG. 46, PCA Multi indicates a prediction method/mode for predicting multiple feature data with one principal component.

pca_feature_num means the number of features used to extract the principal component. When input images with similar characteristics (e.g., multitasks that are related to each other) continue, compression efficiency may be increased by increasing the value of pca_feature_num. Since the mean feature and principal component are shared when coding multiple feature maps, they are coded (PCA_Data_coding) first. Then, the transformed coefficient for each individual feature is coded (PCA_Coefficient_coding).

First, the coding (PCA_Data_coding) may be performed to generate PCA_Data_coding (mean_feature, principal_components) data. Then, the transformed coefficient for each individual feature may be coded (PCA_Coefficient_coding) to generate PCA_Coefficient_coding (Transformed_coeff) data.

The method/device according to the embodiments of FIGS. 1 to 5, 30, 31, and 35 may perform predictive coding (e.g., PCA) on a feature generated in a feature pyramid network (FPN).

FPN is a network structure exhibiting high performance in machine tasks such as object detection and object segmentation.

Unlike the single feature map method, which requires features generated in one specific layer in performing a task, the FPN may perform a task using features generated in multiple layers.

Figure 47:
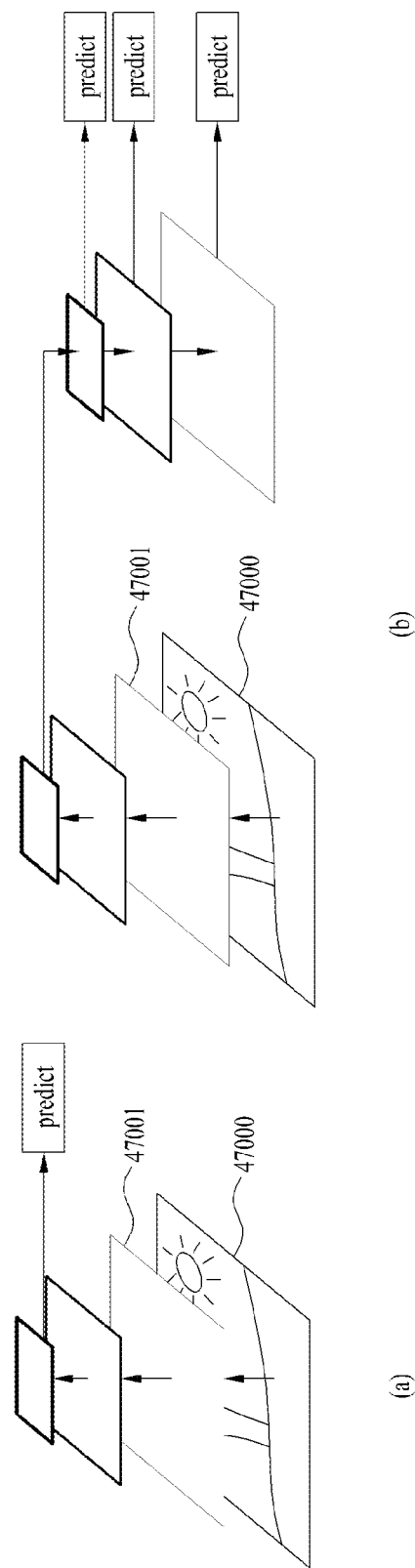
FIG. 47 illustrates a single feature map and a feature pyramid network according to embodiments.

FIG. 47 illustrates a single feature map and a feature pyramid network according to embodiments.

FIG. 47 compares the features used in the single feature map scheme (FIG. 47-(a)) according to the embodiment with the features used in the FPN scheme (FIG. 47-(b)).

Video/image/image data 47000 may be composed of one or more layers. A layer may be some data of the video data. The layers may have various sizes. For example, layer data may include more specific data in a process of enlarging a portion of the video data. Since the size and resolution of the video data for each layer may be hierarchical, a pyramid structure may be formed.

The single feature map scheme (FIG. 47(a)) according to the embodiments performs feature coding on a feature of a single layer among multiple layers.

In the FPN scheme (FIG. 47-(b)) according to the embodiments, a feature for each of several layers among the multiple layers may be feature-coded.

Features generated in a network having such a structure have different resolutions (width, height), and therefore independent predictive coding (PCA) may be performed for each layer.

Figure 48:
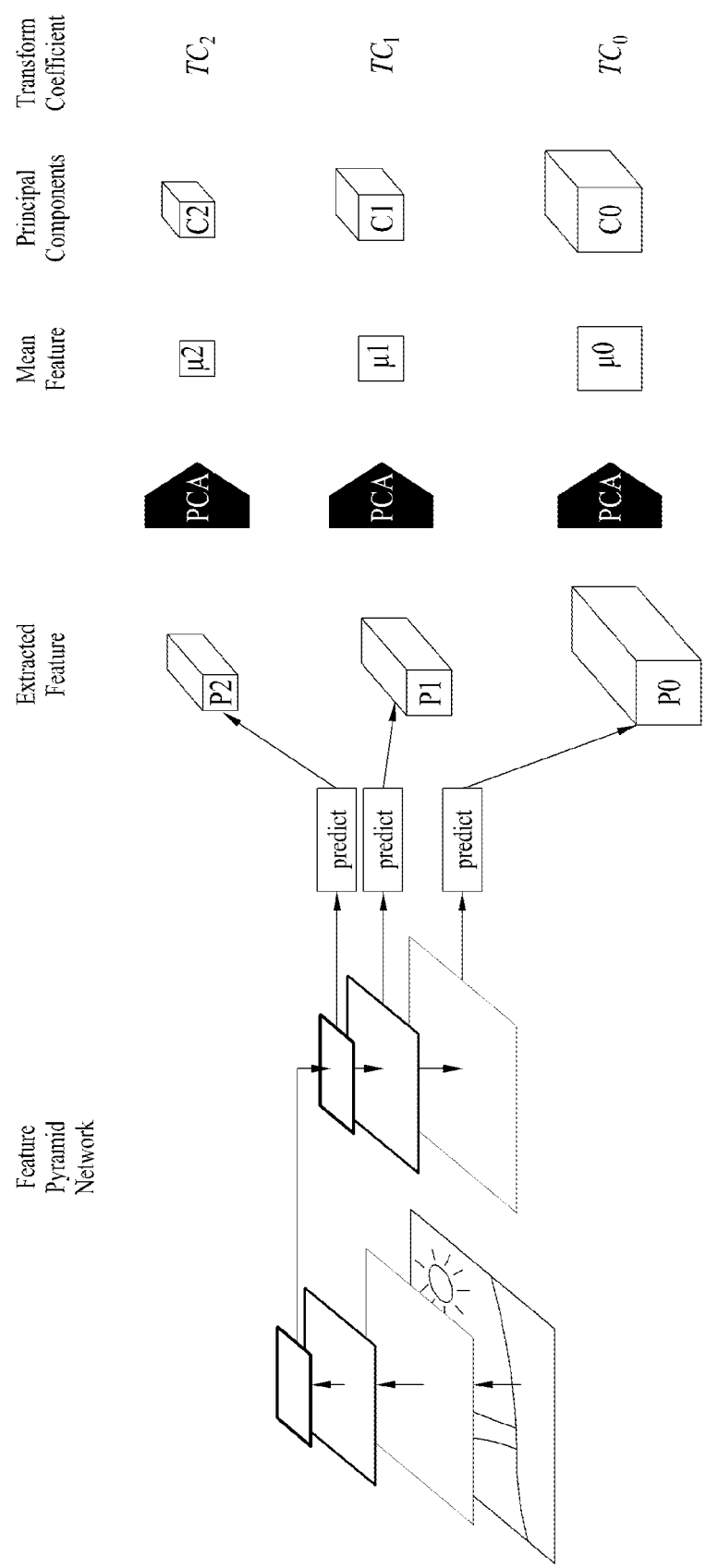
FIG. 48 illustrates feature extraction and calculation based on a feature pyramid network according to embodiments.

FIG. 48 illustrates feature extraction and calculation based on a feature pyramid network according to embodiments.

FIG. 48 illustrates a process in which the method/device according to the embodiments of FIGS. 1 to 5, 30, 31, and 35 extracts features in the FPN scheme of FIG. 47 and performs a PCA calculation.

The method/device according to the embodiments may acquire video/image data for multiple layers from input video/image data, and extract feature data from each layer. Various feature values, for example, data p0, p1, and p2 may be extracted.

As shown in FIGS. 32, 35, 36, 39, 41, 43, 45, 48, etc., the method/device according to the embodiments may generate prediction data, for example, a mean feature, principal components, a transform coefficient, and the like from each feature.

FIG. 49 shows an example of signaling information for feature coding according to embodiments.

FIG. 49 shows a data structure generated and transmitted/received by the methods/devices of the embodiments according to the feature coding of FIGS. 47 and 48.

The signaling information in FIG. 49 may correspond to the signaling information according to the embodiments of FIGS. 38, 40, 42, 44, and 46. Descriptions of FIGS. 38, 40, 42, 44, and 46 may be applied to FIG. 49 in the same or similar manner.

When FeaturePredMode is PCA FPN (see FIGS. 47 and 48), it indicates that the PCA prediction method is used for the FPN network.

feature_pyramid_num indicates the number of layers of features constituting a feature pyramid (see FIGS. 47-48).

The method/device according to the embodiments may transmit PCA_Prediction_Data_coding based on mean_feature, principal_components, and projected for each number of feature pyramids.

The method/device according to the embodiments may transmit resid_data_coding(resid[i]) residual data for a channel, for example, an i-th channel, depending on whether a channel skip is performed for each number of feature channels.

Figure 50:
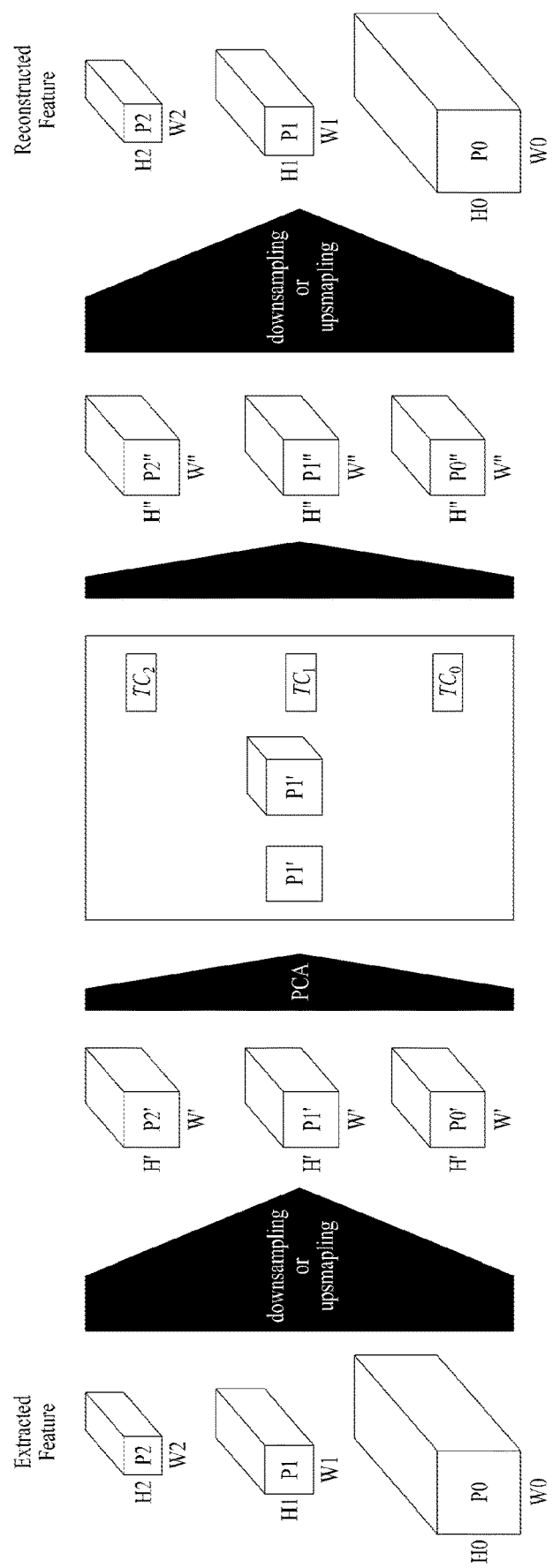
FIG. 50 illustrates a procedure of applying PCA to multiple feature data according to embodiments.

The video reception method/device according to embodiments may receive data about feature coding in FIG. 50, generate a predicted value based on a representative value or prediction data, for example, the mean, principal components, and coefficients, and reconstruct video data by adding the feature (or residual) received for the feature channel to the predicted value.

FIG. 50 illustrates a procedure of applying PCA to multiple feature data according to embodiments.

The figure illustrates that feature coding is performed on multiple features by the method/device according to the embodiments of FIGS. 1-5, 30-31, and 35.

As in the feature coding of features generated in the feature pyramid network as shown in FIG. 48, the method/device according to the embodiments of FIGS. 1 to 5, 30, 31, 35, etc. may further perform feature coding on multiple features.

That is, FIG. 50 illustrates a method of enabling principal component analysis for multiple feature data having different resolutions. When feature data to be compressed have different resolutions as in the example of FPN application as shown in FIG. 48, the method/device according to the embodiments may transforming the source features into the same resolution by increasing the resolutions (up-sampling) or lowering the resolutions (down-sampling). After principal component analysis on the features transformed into the same resolution is completed, the mean feature and principal component required for principal component reconstruction are transmitted, and the transform coefficient for each feature is transmitted. In the process of reconstructing the original features from the coded information, a process of lowering the resolution (down-sampling) or increasing the resolution (up-sampling) is performed again to obtain the resolutions of the original features.

The method/device according to the embodiments may extract a feature from input video/image data. The extracted features are, for example, P0 to P2, and each feature may have a different height and width. That is, multiple feature data having different resolutions may be efficiently feature-coded.

The method/device according to the embodiments may down-sample and/or up-sample the multiple feature data having different resolutions to generate feature data of the same/similar resolution (e.g., P0' to P2').

The method/device according to the embodiments may generate prediction data, for example, a mean feature, coefficients, principal components, etc. as shown in FIGS. 32, 35, 36, 39, 41, 43, 45, 48, 50, etc.

The method/device according to embodiments on the reception side may receive prediction data, inversely transforms the same, reconstruct the feature data, and perform up-sampling and/or down-sampling in the reverse process of the transmission to efficiently reconstruct multiple feature data having different resolutions.

FIG. 51 illustrates signaling information for feature coding of multiple feature data having different resolutions according to embodiments.

FIG. 51 shows a data structure related to the operation according to the embodiments of FIG. 50. The method/device according to the embodiments generates a data structure for feature coding as shown in FIG. 51 by performing the operation of FIG. 50 and transmits the same to the reception method/device according to the embodiments. The reception method/device may efficiently reconstruct multiple feature data having different resolutions based on the data structure of FIG. 51.

In addition, the method/device according to the embodiments may additionally transmit feature_width and feature_height for reconstruction of the original resolution of the feature data.

feature_width indicates the width of the source feature data. feature_height indicates the height of the source feature data.

When FeaturePredMode is the multi-resolution prediction mode (PCA_MultiRes), the method/device according to the embodiments may generate and deliver information on the number of features (pca_feature_num), and generate and delivered coding data (PCA_Data_coding) based on mean_feature and principal_components as shown in FIGS. 32, 35, 36, 39, 41, 43, 45, 48, 50, etc.

Furthermore, the method/device according to the embodiments may deliver the feature width and feature height as many as the number of features.

Prediction data for multiple feature data according to the embodiments may include one common mean feature and one common principal component, and may include a different coefficient (Transformed_coeff) for each feature.

The video reception method/device according to the embodiments may receive the data related to the feature coding of FIG. 51, and generate a predicted value based on representative values or prediction data, for example, a mean, a principal component, and a feature width, feature height, and coefficients according to the number of features, and reconstruct video data by summing the feature (or residual) received for the feature channel and the predicted value.

Figure 52:
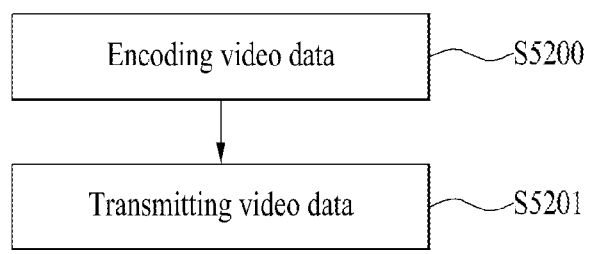
FIG. 52 illustrates a video transmission method according to embodiments.

FIG. 52 illustrates a video transmission method according to embodiments.

S5200: A video transmission method according to embodiments may include encoding video data.

The encoding operation according to the embodiments may include the encoding apparatus 1020 of FIG. 1, the encoding apparatus 200 of FIG. 2, the transform operation of FIG. 21, the encoding process of FIG. 25, the encoding process of FIG. 28, the operation of the source device of FIG. 30, the encoding operation of FIG. 31, the encoding apparatus 35000 of FIG. 35, the encoding apparatus of FIG. 39, and the encoding processing of FIGS. 45, 47 and 48.

S5201: The video transmission method according to the embodiments may further include transmitting the video data.

The transmission operation according to the embodiments may include the transmitter 1030 of FIG. 1, the bitstream transmission of FIG. 2, the data transmission/reception of FIGS. 4 and 5, the transmission of FIGS. 25 and 26, the transmission of FIG. 28, the data structure transmission of FIG. 29, the transmission/storage of FIG. 30, the bitstream transmission of FIGS. 35 and 39, and the data transmission of FIGS. 38, 40, 42, 44, 46, 49, and 51.

Figure 53:
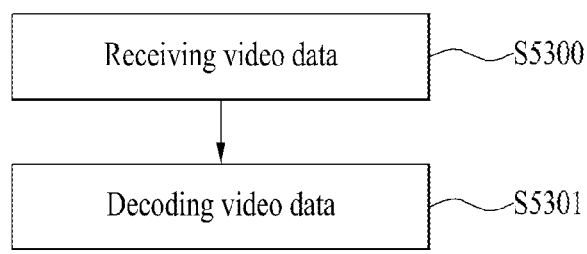
FIG. 53 illustrates a video reception method according to embodiments.

FIG. 53 illustrates a video reception method according to embodiments.

S5300: A video reception method according to embodiments may include receiving video data.

The reception operation according to the embodiments may include the receiver 1050 of FIG. 1, the bitstream reception of FIG. 3, the data transmission/reception of FIGS. 4 and 5, the reception of FIGS. 26 and 27, the reception of the data structure of FIG. 29, the transmission/storage of FIG. 30, the bitstream reception of FIGS. 35 and 39, and the data reception of FIGS. 38, 40, 42, 44, 46, 49, and 51.

S5301: The video reception method according to the embodiments may further include decoding the video data.

The decoding operation according to the embodiments may include the decoding apparatus 1060 of FIG. 1, the decoding apparatus 300 of FIG. 3, the inverse transform operation of FIG. 21, the decoding process of FIGS. 26 and 27, the operation of the receive device of FIG. 30, the decoding operation FIG. 31, the decoding apparatus 35005 of FIG. 35, the decoding apparatus of FIG. 39, and the data based decoding of FIGS. 38, 40, 42, 44, 46, 49 and 51.

Accordingly, the video transmission/reception method/device according to the embodiments may provide the following effects.

When it is necessary to use a complex deep neural network to carry out a specific purpose by receiving an image as an input, a case where the image acquired from the terminal needs to be transmitted to another device for processing due to the high complexity of the deep neural network and the limited performance of the terminal may be efficiently handled.

Thus, by using the method of compressing the feature data generated in the hidden layer of the deep neural network instead of the conventional image/video compression method, data transmission efficiency may be increased and the computational complexity required for image encoding/decoding in each device may be reduced.

Feature maps may be efficiently compressed and reconstructed based on various feature prediction techniques and a structure for generating a feature coding bitstream (see FIGS. 38, 40, 42, 44, 46, 49, and 51) according to embodiments.

The embodiments have been described in terms of a method and/or a device. The description of the method and the description of the device may complement each other.

Although embodiments have been described with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may also fall within the scope of the appended claims and their equivalents. The devices and methods may not be limited by the configurations and methods of the embodiments described above. The embodiments described above may be configured by being selectively combined with one another entirely or in part to enable various modifications. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." "A, B, C" may also mean "at least one of A, B, and/or C." Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or combinations thereof. The firmware, software, and/or combinations thereof may be stored in the processor or the memory.

The operations according to the above-described embodiments may be performed by the transmission device and/or the reception device according to the embodiments. The transmission/reception device may include a transmitter/receiver configured to transmit and receive media data, a memory configured to store instructions (program code, algorithms, flowcharts and/or data) for the processes according to the embodiments, and a processor configured to control the operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

MODE FOR DISCLOSURE

As described above, related details have been described in the best mode for carrying out the embodiments.

INDUSTRIAL APPLICABILITY

As described above, the embodiments are fully or partially applicable to a video/image transmission/reception device and system.

Those skilled in the art may change or modify the embodiments in various ways within the scope of the embodiments.

Embodiments may include variations/modifications within the scope of the claims and their equivalents.

The invention claimed is:
1. A method of encoding a video, the method comprising:
encoding video data, wherein the encoding of the video data includes:
acquiring a feature for the video data;
generating prediction data about the feature from the feature, wherein the prediction data includes a mean feature, a principal component, and a coefficient for the feature;
generating a predicted value from the prediction data;
generating residual data based on the feature and the predicted value; and
encoding the residual data, wherein the residual data is generated based on a value of a difference between the feature and the predicted value; and
transmitting the video data,
wherein the video data further includes prediction coding information about a mean feature, a principal component, and a coefficient for the video data,
wherein the video data further includes channel skip information for representing whether or not the residual data is transmitted.

2. The method of claim 1, wherein the video data further comprises:
prediction mode information related to the encoding of the video data; and
feature channel information related to the video data.

3. The method of claim 1, wherein the encoding of the video data comprises:
acquiring a feature for the video data;
generating a representative value representing the feature from the feature;
generating a predicted value from the representative value; and
generating residual data based on the predicted value and the feature.

4. The method of claim 3,
wherein the video data comprises:
a dictionary and code information for the video data based on the prediction mode information;
information on a number of feature channels for the video data.

5. The method of claim 3, wherein the encoding of the video data comprises:
generating the residual data based on a unit for the video data,
wherein, when the residual data is generated in the unit, the video data includes the representative value, and wherein, when the residual data is not generated in the unit, the video data includes a part of the representative value.

6. The method of claim 3, wherein the encoding of the video data comprises:
generating first prediction data from a feature of video data for a first time;
generating second prediction data from a feature of video data for a second time; and
generating a residual between the first prediction data and the second prediction data; or
generating a residual feature between the feature of the video data for the first time and the feature of the video data for the second time, and generating prediction data from the residual feature.

7. The method of claim 1, wherein the encoding of the video data comprises:
generating a common representative value from a plurality of features.

8. The method of claim 1, wherein the encoding of the video data comprises:
extracting a feature from a plurality of layers and generating a representative value for the feature.

9. The method of claim 1, wherein the encoding of the video data comprises:
sampling features having different resolutions and generating a representative value from the features.

10. A video encoding device comprising:
a processor; and
a memory connected to the processor,
wherein the processor is configured to:
encode video data, wherein the encoding of the video data includes:
acquiring a feature for the video data;
generating prediction data about the feature from the feature, wherein the prediction data includes a mean feature, a principal component, and a coefficient for the feature;
generating a predicted value from the prediction data;
generating residual data based on the feature and the predicted value; and
encoding the residual data, wherein the residual data is generated based on a value of a difference between the feature and the predicted value; and
transmit the video data,
wherein the video data further includes prediction coding information about a mean feature, a principal component, and a coefficient for the video data,
wherein the video data further includes channel skip information for representing whether or not the residual data is transmitted.

11. A method of decoding a video, the method comprising:
receiving video data; and
decoding the video data, wherein the decoding of the video data comprises:
acquiring a feature for the video data;
acquiring a representative value representing the feature from the feature;
generating a predicted value from the representative value; and
reconstructing the video data based on the predicted value and the feature,
wherein the video data further includes prediction coding information about a mean feature, a principal component, and a coefficient for the video data,
wherein the video data further includes channel skip information for representing whether or not the residual data is transmitted.

12. The method of claim 11, wherein the decoding of the video data comprises:
receiving a common representative value from a plurality of features.

13. A video decoding device comprising:
a memory; and
a processor connected to the memory,
wherein the processor is configured to:
receive video data;
decode the video data, wherein the decoding of the video data comprises:
acquiring a feature for the video data;
acquiring a representative value representing the feature from the feature;
generating a predicted value from the representative value; and
reconstructing the video data based on the predicted value and the feature,
wherein the video data further includes prediction coding information about a mean feature, a principal component, and a coefficient for the video data,
wherein the video data further includes channel skip information for representing whether or not the residual data is transmitted.

14. The video reception device of claim 13, wherein the processor is configured to:
acquire a feature for the video data;
acquire a representative value representing the feature;
generate a predicted value from the representative value; and
reconstruct the video data based on the predicted value and the feature.

* * * * *